United States Patent
Nishikawa et al.

(10) Patent No.: US 8,272,500 B2
(45) Date of Patent: Sep. 25, 2012

(54) SCREW DRIVEN CONVEYANCE DEVICE

(75) Inventors: Hiroshi Nishikawa, Gamo-gun (JP); Teruaki Nabeta, Gamo-gun (JP)

(73) Assignee: Daifuku Co., Ltd. (JP)

( * ) Notice: Subject to any disclaimer, the term of this patent is extended or adjusted under 35 U.S.C. 154(b) by 567 days.

(21) Appl. No.: 12/498,078

(22) Filed: Jul. 6, 2009

(65) Prior Publication Data

US 2010/0000843 A1  Jan. 7, 2010

(30) Foreign Application Priority Data

Jul. 4, 2008  (JP) .................................. 2008-175428
Jul. 4, 2008  (JP) .................................. 2008-175429
Jul. 4, 2008  (JP) .................................. 2008-175430
Jul. 4, 2008  (JP) .................................. 2008-175431
Jul. 4, 2008  (JP) .................................. 2008-175432

(51) Int. Cl.
*B65G 33/00* (2006.01)
(52) U.S. Cl. ...................... 198/657; 198/465.1; 198/625
(58) Field of Classification Search ............... 198/465.1, 198/465.2, 465.3, 465.4, 467.1, 468.1, 657, 198/666, 717, 722; 104/167
See application file for complete search history.

(56) References Cited

U.S. PATENT DOCUMENTS

| | | | | |
|---|---|---|---|---|
| 1,298,285 A * | 3/1919 | Bogaty | ........................... | 34/204 |
| 1,420,115 A * | 6/1922 | Lange et al. | ................ | 104/172.2 |
| 1,774,338 A * | 8/1930 | Sos | ................................. | 104/166 |
| 1,866,181 A * | 7/1932 | Turner | ........................... | 198/666 |
| 2,752,883 A * | 7/1956 | Curtis | ........................... | 118/316 |
| 2,942,742 A * | 6/1960 | Wilbur | ........................... | 414/158 |
| 3,119,348 A * | 1/1964 | Margiloff | ...................... | 104/173.1 |
| 3,238,893 A * | 3/1966 | Zuppiger | ........................ | 198/792 |
| 3,493,097 A * | 2/1970 | Karr | ................................ | 198/811 |
| 3,719,268 A * | 3/1973 | Koehnen | ....................... | 198/632 |
| 3,811,385 A * | 5/1974 | Johnson et al. | ................. | 104/167 |
| 3,866,538 A * | 2/1975 | Forsey, Jr. | ...................... | 104/167 |
| 4,358,999 A * | 11/1982 | Nagahori | ....................... | 104/166 |
| 4,615,274 A * | 10/1986 | Hoehn | ........................... | 104/167 |
| 4,638,740 A * | 1/1987 | Rhodes | ......................... | 104/172.2 |
| 4,646,629 A * | 3/1987 | Creed et al. | ...................... | 99/468 |
| 4,852,719 A * | 8/1989 | Lapeyre | ......................... | 198/666 |
| 5,549,050 A * | 8/1996 | Rhodes | ......................... | 104/172.3 |
| 6,070,534 A * | 6/2000 | Lehrieder | .................. | 104/172.3 |
| 6,170,632 B1 * | 1/2001 | Shimura et al. | ............... | 198/334 |

FOREIGN PATENT DOCUMENTS

JP  9058463 A  3/1997
JP  2001106462 A  4/2001

* cited by examiner

*Primary Examiner* — Gene Crawford
*Assistant Examiner* — William R Harp
(74) *Attorney, Agent, or Firm* — St. Onge Steward Johnston & Reens LLC

(57) ABSTRACT

A screw driven conveyance device has a conveyance carriage driven continuously and smoothly irrespective of the presence of an air space between adjacent screw shafts. Shorter auxiliary screw shafts have a pitch equal to a pitch of the screw shaft and are placed in juxtaposition with the screw shafts. The conveyance carriage has a follower roller engaged with the screw shaft and an auxiliary follower roller engaged with the auxiliary screw shaft by deviating a position in an axial direction of the screw shaft. While the follower roller moves through the air space, the auxiliary follower roller is engaged with the auxiliary screw shaft.

2 Claims, 29 Drawing Sheets

FIG. 22
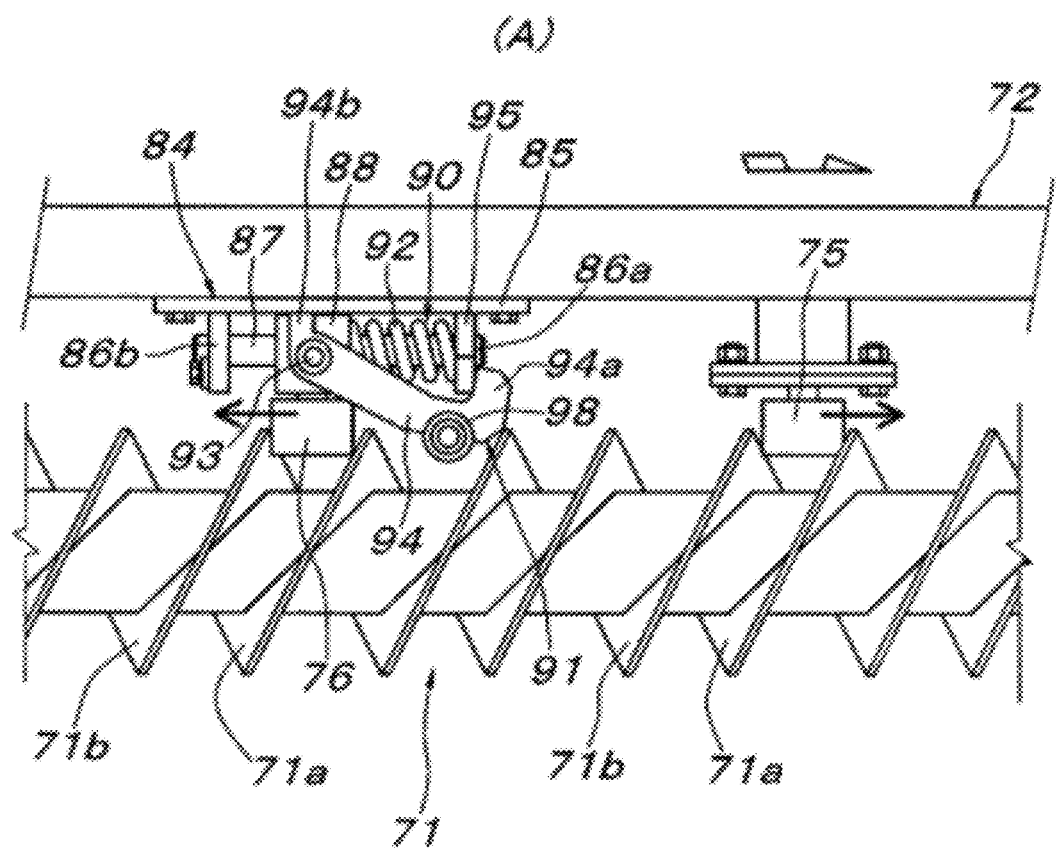
(A)
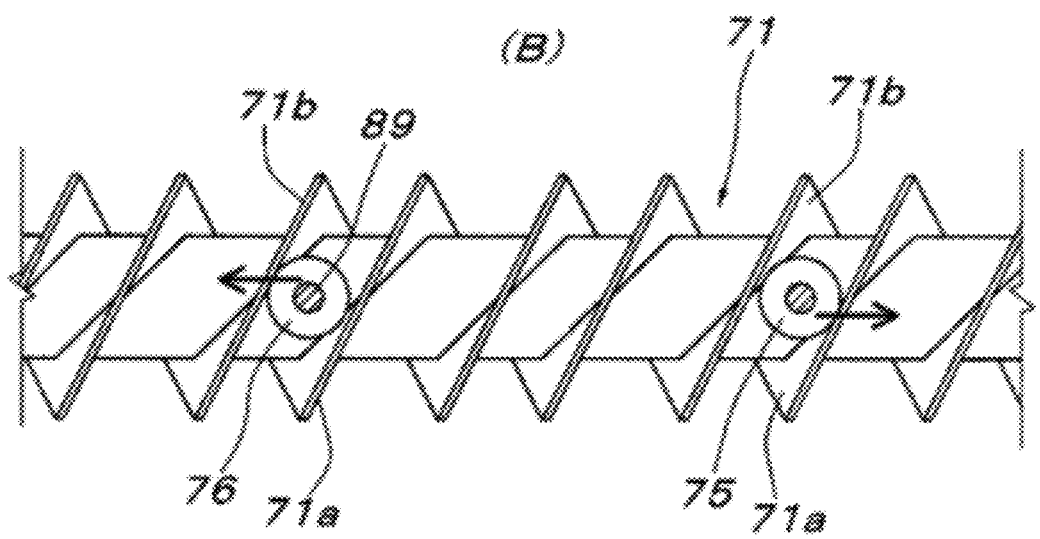
(B)

SCREW DRIVEN CONVEYANCE DEVICE

CROSS-REFERENCE TO RELATED APPLICATIONS

The present application claims priority of Japanese patent application Nos. JP2008-175428, JP2008-175429, JP2008-175430, JP2008-175431, and JP2008-175432 filed on Jul. 4, 2008. All applications are herein incorporated by reference in their entirety.

FIELD OF THE INVENTION

The present invention relates to a screw driven conveyance device for driving and propelling a conveyance carriage by engaging a screw shaft for driving a conveyance carriage that is on a traveling route side, with a follower roller that is on a conveyance carriage side.

BACKGROUND OF THE INVENTION

A screw driven conveyance device, i.e., that which is configured so that a rotation-driven screw shaft is placed along the traveling route of a conveyance carriage, the conveyance carriage is arranged with a follower roller engaged with the screw shaft, and the conveyance carriage is propelled by rotation-driving of the screw shaft is conventionally well known as described in Japanese Published Unexamined Patent Application No. 1997-58463 (hereinafter, referred to as Patent Document 1), etc. Moreover, in this type of conveyance device, when the traveling route length for the conveyance carriage is long, it is necessary that a plurality of screw shafts are concentrically placed in series to match phases of helical vanes of the respective screw shafts, and the respective screw shafts are operably coupled so that they are operably rotated in the same direction at constant speed. Between the respective screw shafts arranged in series, however, bearings at the both ends of each screw shaft and transmission means between the screw shafts need to be placed, and thus, a significantly long air space between the screw shafts is required. It is necessary to configure so that the follower roller on the conveyance carriage side is smoothly transferred to the downstream screw shaft from the upstream screw shaft so that irrespective of the presence of this air space, the conveyance carriage can be reliably traveled continuously rather than interrupting its traveling.

Further, the screw driven conveyance device described in the Patent Document 1 is configured so that the follower roller on the conveyance carriage side is pushed from behind by the helical vanes of the screw shafts in a conveyance carriage traveling direction. In this configuration, the follower roller on the conveyance carriage side is able to float in an axial direction of the screw shaft between the helical vanes of the screw shafts, and thus, there is a possibility that the traveling conveyance carriage swings back and forth by vibration, etc. As means for solving this problem, as described in Japanese Published Unexamined Patent Application No. 2001-106462 (hereinafter, referred to as Patent Document 2), etc., it is also known that helical vanes of screw shafts are rendered a double-blade structure in which a follower roller on a conveyance carriage side is sandwiched from the both sides of an axial direction of the screw shaft.

Further, the screw shafts shown in the Patent Document 1 are configured so that the helical vanes are appended to a single center shaft rod continued across the entire length in a manner so as to continue across the entire length of the center shaft rod. However, when the entire length of the single screw shaft is lengthened as much as possible, it is not practical to manufacture such a screw shaft in a manner that the helical vane continued across the entire length is appended to a long-scale center shaft rod, from the perspective of manufacturing costs, etc. Thus, as described in the Patent Document 2, it is conceivable that screw shaft single bodies in a unit length are connected in an axial direction to configure a screw shaft having a required length.

A conventionally and generally conceivable configuration to solve the foregoing problem is that in which a pair of front and rear follower rollers engaged with a screw shaft at an interval longer than an air space between the identical screw shafts are arranged on the conveyance carriage side and while the front-side follower roller is being moved within the air space between the screw shafts, the conveyance carriage is driven and propelled via the rear-side follower roller. Although it is certain that there is no problem with the foregoing configuration when the conveyance carriage is traveled at constant speed over the entire area of the conveyance carriage traveling route configured by all the screw shafts arranged in series, in other words, when forwarding pitches of the respective screw shafts are the same, when it is attempted to adopt a configuration such that the forwarding pitches of the screw shafts are changed in a specific region, i.e., when it is attempted to adopt a configuration such that the traveling speed of the conveyance carriage can be changed in a specific region while all the screw shafts are rotation-driven at constant speed, the pair of front and rear follower rollers are engaged over the two (front and rear) regions having a different forwarding pitch, and the conveyance carriage cannot be transferred between the regions having a different forwarding pitch. That is, with the configuration such that the pair of front and rear follower rollers engaged with the same screw shaft is utilized, it is not possible to adopt the configuration such that the forwarding pitches of the screw shafts can be changed in a specific region.

Moreover, as described in the Patent Document 2, even when the helical vanes of the screw shaft are rendered the double-blade structure, an appropriate space (play) is essential between the follower roller on the conveyance carriage side and the helical vanes sandwiching that follower roller. Even when a screw shaft is successfully manufactured with high accuracy so that this space is kept to the least required width, it is not possible to completely eliminate the floating (rattling) in the front and rear directions of the traveling conveyance carriage because of the presence of the least-required-width space. Therefore, when the thus configured conveyance device is utilized as a workpiece conveyance device on a coating line along which a workpiece on a conveyance carriage is automatically coated by a coater, there is a risk that spotty coating may result from even a small amount of rattling (due to vibration, etc.) in the back and forth directions in the conveyance carriage (workpiece).

Further, as described in the Patent Document 2, in the method in which a plurality of screw shaft single bodies manufactured so that the helical vanes are merely appended to the center shaft rod of a unit length are connected in the axial direction so as to configure the screw shaft having a required length, the bending strength of all the screw shaft bodies relies on the bending strength of a connection between the screw shaft single bodies. This necessitates skillful arrangement to increase the bending strength of the connection such as increasing a shaft-direction fitting depth of the screw shaft single bodies or by means of a similar technique. Even if the screw shaft single bodies are successfully connected by a connection having a required bending strength, it is practically impossible to lengthen the entire length of the assembled single screw shaft. Thus, along the lengthy conveyance carriage traveling route, a larger number of screw shafts thus configured need to be disposed in series.

SUMMARY OF THE INVENTION

A first object of the present application is to provide a screw driven conveyance device capable of solving the above-described conventional problem in that it is not possible to adopt a configuration such that the forwarding pitch of the screw shaft can be changed in a specific region. A screw driven conveyance device according to a first invention, which has been achieved to attain the first object, is configured so that (for reference, components are allotted with reference numerals and letters in the embodiments described below): screw shafts 1A, 1B, 1C . . . that are rotation-driven are placed along a traveling route of a conveyance carriage 2; the conveyance carriage 2 is arranged with a follower roller 14 engaged with the screw shafts 1A, 1B, 1C . . . ; and the conveyance carriage 2 is propelled by rotation-driving of the screw shafts 1A, 1B, 1C . . . , in which a plurality of screw shafts 1A, 1B, 1C . . . are concentrically placed in series with air spaces 5 between the respective screw shafts 1A, 1B, 1C . . . , at a lateral side of an end, adjacent to the air space 5, of one of the two screw shafts 1A, 1B, 1C . . . positioned before and after the air space 5 between the screw shafts, shorter auxiliary screw shafts 6A, 6B . . . are placed in juxtaposition with the screw shafts 1A, 1B, 1C . . . , the auxiliary screw shafts 6A, 6B . . . are rotation-driven operably to the screw shafts 1A, 1B, 1C . . . and have the same forwarding pitch as that of the juxtaposed screw shafts 1A, 1B, 1C . . . , the conveyance carriage 2 is arranged with, in addition to the follower roller 14, an auxiliary follower roller 16 engaged with the auxiliary screw shafts 6A, 6B . . . , and an interval D in an axial direction of the screw shaft between the follower roller 14 and the auxiliary follower roller 16 and a length of the auxiliary screw shafts 6A, 6B . . . are set so that while the follower roller 14 moves through the air space 5 between the screw shafts, the auxiliary follower roller 16 is engaged with the auxiliary screw shafts 6A, 6B . . . .

According to the configuration of the first invention, it is simply configured such that the shorter auxiliary screw shafts are additionally arranged in juxtaposition for each air space between the screw shafts on the conveying route side, and also only one auxiliary follower roller is merely added by deviating the position thereof in addition to the original follower roller on the conveyance carriage side. In spite of such a simple configuration, while the follower roller moves through the air space between the screw shafts, the conveyance carriage can be driven and propelled by the auxiliary follower roller and the auxiliary screw shaft. Thus, irrespective of the presence of the air space between the screw shafts, the conveyance carriage can be continuously traveled and driven. Moreover, in the transferring region stretching across the front and the rear of the air space between the screw shafts, i.e., in a region including one auxiliary screw shaft, one air space between the screw shafts, and an end region of the both front and rear screw shafts adjacent to the air space, the conveyance carriage needs to be configured to travel at a constant speed without changing the forwarding pitches of the respective screw shafts. However, if a region other than the transferring region is recognized, one follower roller is merely engaged with the screw shafts. Therefore, when a borderline between the two (front and rear) regions different in forwarding pitch of the screw shaft is placed in a location other than the transferring region, the traveling speed of the conveyance carriage in the middle of the traveling route can also be changed. In implementing the invention, the following specific configurations A and B can be adopted.

Specific Configuration A

Ends adjacent to the air spaces 5 between the screw shafts of the respective screw shafts 1A, 1B, 1C . . . can be operably coupled to each other by two transmission means 9 and 10 for relaying ends of a side of the air spaces 5 between the screw shafts of the auxiliary screw shafts 6A, 6B . . . .

Specific Configuration B

Further, in the configuration of the first invention, in a region other than the transferring regions B1 and B2 stretching across the front and the rear of the air space 5 between the screw shafts, i.e., the transferring regions B1 and B2 including one auxiliary screw shaft 6A, 6B . . . , one air space 5 between the screw shafts, and end regions of the both front and rear screw shafts 1A, 1B, 1C . . . adjacent to the air space 5, one follower roller 14 is merely engaged with the screw shafts 1A, 1B, 1C . . . . Thus, it may be configured so that the forwarding pitch P1 or P2 of the screw shafts 1A, 1B, 1C . . . within the transferring regions B1 and B2 do not change. In a location other than the transferring regions B1 and B2, a borderline between the two (front and rear) regions A1 to A2 . . . different in forwarding pitch of the screw shafts 1A, 1B, 1C . . . can be placed, and the forwarding pitches P1 and P2 of the screw shafts 1A, 1B, 1C . . . in the transferring regions B1 and B2 can be set to an integer fraction of the interval D in the axial direction of the screw shaft between the follower roller 14 and the auxiliary follower roller 16.

According to the specific configuration A, the auxiliary screw shaft can be utilized for a relay intermediate shaft for interlocking the respective screw shafts, and all the screw shafts and auxiliary screw shafts can be operably coupled by the transmission means relatively simply configured.

According to the specific configuration B, in the configuration arranged with a plurality of transferring regions including one auxiliary screw shaft, one air space between the screw shafts, and end regions of the both front and rear screw shafts adjacent to the air space, it is not necessary that the forwarding pitches are rendered the same in all the transferring regions, and if the forwarding pitches are set to an integer fraction of the interval between the follower roller and the auxiliary follower roller in the axial direction of the screw shaft, the forwarding pitches in the transferring regions can be changed where necessary. Therefore, in combination with the placement of the borderline between the two (front and rear) regions different in forwarding pitch of the screw shaft in a location other than the transferring regions, a plurality of regions different in traveling speed of the conveyance carriage in the middle of the traveling route, including the respective transferring regions, can be arbitrarily set.

Further, a screw driven conveyance device according to a second invention, which has been achieved to attain the first object, is configured so that (for reference, components are allotted with reference numerals and letters in the embodiments described below): screw shafts that are rotation-driven are placed along a traveling route of a conveyance carriage; the conveyance carriage is arranged with a follower roller engaged with the screw shafts; and the conveyance carriage is propelled by rotation-driving of the screw shafts, in which a plurality of screw shafts are concentrically placed in series with air spaces 33 between the respective screw shafts 21A, 21B, 21C . . . , in the conveyance carriage 22, a pair of front and rear follower rollers 25 and 26 fitted between helical vanes 21a and 21b at two locations, which are front and rear locations, in the axial direction of the screw shafts 21A, 21B, 21C . . . are pivotally supported at an interval D wider than a length of the air space 33 between the screw shafts, one follower roller is a position-fixed follower roller 26, the other follower roller is a movable follower roller 25 configured to move freely between an active position fitted between the helical vanes 21a and 21b of the screw shafts 21A, 21B, 21C . . . and a non-active position separated from between the helical vanes 21a and 21b, first holding means 40 for holding the movable follower roller 25 at the non-active position is arranged, in the air space 33 between the screw shafts, first switching means 43 for temporarily switching the movable follower roller 25 from the non-active position to the active position is provided, and while the position-fixed follower roller 26 is transferred from the screw shafts 21A, 21B, 21C . . . upstream of the air space 33 to the screw shafts 21B, 21C . . . downstream thereof, the movable follower roller 25 that has been temporarily switched to the active position is fitted to the screw shafts 21A, 21B, 21C . . . upstream or downstream of the air space 33.

According to the configuration of the second invention, on the conveying route side, the screw shaft does not need to be added with special drive means for driving and traveling the conveyance carriage in the air space other than a plurality of screw shafts concentrically placed in series with the air space. Moreover, one movable follower roller may be only added which is capable of selectively switching the two locations, on the conveyance carriage side. In spite of the fact that the whole configuration is simple and can be implemented very inexpensively, while the position-fixed follower roller moves through the air space between the screw shafts, the conveyance carriage can be driven and propelled by the added movable follower roller and screw shaft. Thus, irrespective of the presence of the air space between the screw shafts, the conveyance carriage can be continuously traveled and driven. Moreover, within the transferring region stretching across the front and the rear of the air space between the screw shafts, i.e., the transferring region including one air space between the screw shaft and the switching means provided therewith, the conveyance carriage needs to be configured to travel at a constant speed without changing the forwarding pitches of the respective screw shafts. However, if a region other than the transferring region is recognized, one position-fixed follower roller is merely engaged with the screw shafts. Therefore, when a borderline between the two (front and rear) regions different in forwarding pitch of the screw shaft is placed in a location other than the transferring region, the traveling speed of the conveyance carriage in the middle of the traveling route can also be changed.

In implementing the second invention, the following specific configurations C to F can be adopted.

Specific Configuration C

The movable follower roller 25 can be pivotally supported by the movable body 37 supported movably within a certain range in a straight line direction parallel to the shaft center of the movable follower roller 25, the first holding means 40 can be configured by a spring 41 that urges the movable body 37 in a direction to keep away from the screw shafts 21A, 21B, 21C . . . so as to hold the movable follower roller 25 at the non-active position, and the first switching means 43 can be configured by a cam rail 44a for holding the movable follower roller 25 by acting on a cam follower roller 42a arranged in the movable body 37 to move the movable follower roller 25 to the active position.

Specific Configuration D

When the specific configuration C is adopted, in the movable body 37, a pair of cam follower rollers 42a and 42b positioned on both sides of the screw shafts 21A, 21B, 21C . . . are pivotally supported. As the cam rail, a pair of cam rails 44a and 44b placed in juxtaposition to respectively act on the pair of cam follower rollers 42a and 42b can be arranged.

Specific Configuration E

When the specific configuration C or D is adopted, a forcibly restoring cam rail 45a for forcing a return of the cam follower roller 42a back to the non-active position can be provided when the cam follower roller 42a leaves the cam rail 44a.

Specific Configuration F

Moreover, in the configuration of the second invention, in a region other than the transferring regions B1, B2 . . . stretching across the front and the rear of the air space 33 between the screw shafts, only one position-fixed follower roller 26 is engaged with the screw shafts 21A, 21B, 21C . . . . Thus, it may be configured so that the forwarding pitch P1 or P2 of the screw shafts 21A, 21B, 21C . . . within the transferring regions B1, B2 . . . do not change. In a location other than the transferring regions B1, B2 . . . , a borderline between the two (front and rear) regions A1 to A3 . . . different in forwarding pitch of the screw shafts 21A, 21B, 21C . . . can be placed, and the forwarding pitch P1 or P2 of the screw shafts 21A, 21B, 21C . . . in the transferring regions B1, B2 . . . can be set to an integer fraction of the interval D in the axial direction of the screw shafts between the position-fixed follower roller 26 and the movable follower roller 25.

According to the specific configuration C, the movable follower roller is to move in a straight line direction parallel to the shaft center of the movable follower roller, and thus, as compared to a case where the movable follower roller is pivotally supported by a swing arm that swings, the movable follower roller can be drawn and inserted in an orientation at a right angle to the axial direction of the screw shafts between the helical vanes of the screw shafts, and therefore, the rattling of the conveyance carriage that is traveled and driven can also be made smaller by configuring the helical vanes of the screw shafts in a manner that a play of the follower roller in the axial direction of the screw shaft is lessened.

When the specific configuration C is adopted, as compared to a case where the movable follower roller is pivotally supported in the swing arm that swings, the frictional resistance of a linear slide guide portion of the movable follower roller (movable body) becomes larger. However, according to the specific configuration D, the movable body (movable follower roller) can be linearly and smoothly slid and the switching of positions of the movable follower roller can be smoothly and reliably performed. Further, the specific configuration E can solve the inconvenience that due to the large frictional resistance between the movable follower roller at the active position and the helical vane of the screw shaft, the urging force of the spring alone cannot return the movable follower roller (movable body) back to the original non-active position in spite of the cam rail kept apart from the cam follower roller. As a result, the expected operation can be reliably performed.

According to the specific configuration F, in a configuration such that a plurality of transferring regions stretching across the front and the rear of the air space between the screw shafts are arranged, it is not necessary that the forwarding pitches are not rendered the same in all the transferring regions, and if the forwarding pitches are set to an integer fraction of the interval between the position-fixed follower roller and the movable follower roller in the axial direction of the screw shafts, the forwarding pitches in the transferring regions can be changed where necessary. Therefore, in combination with the placement of the borderline between the two (front and rear) regions different in forwarding pitch of the screw shaft in a location other than the transferring regions, a plurality of regions different in traveling speed of the conveyance carriage in the middle of the traveling route, including the respective transferring regions, can be arbitrarily set.

A screw driven conveyance device according to a third invention, which has been achieved to attain the first object, is configured so that (for reference, components are allotted with reference numerals and letters in the embodiments described below): screw shafts that are rotation-driven are placed along a traveling route of a conveyance carriage; the conveyance carriage is arranged with a follower roller engaged with the screw shafts; and the conveyance carriage is propelled by rotation-driving of the screw shafts, in which a plurality of screw shafts 51A, 51B, 51C . . . arrayed in the traveling route direction are arrayed in two lines in a zigzag manner so that the screw shafts sequentially differ in line, the conveyance carriage 52 is arranged with two follower rollers 55 and 56, each of which can be respectively fitted to two lines of the screw shafts 51A, 51C . . . and 51B . . . concentrically arranged in series for each line, and with respect to the screw shafts 51A, 51C . . . and 51B . . . in two lines and the two follower rollers 55 and 56, the two follower rollers 55 and 56 are alternately engaged with the screw shafts 51A, 51B, 51C . . . in the respective lines in a region other than the transferring regions B1, B2, B3 between the two screw shafts 51A and 51B and between 51B and 51C adjacent before and after and different in line, and also are placed so that in the transferring regions B1, B2, and B3, before one follower roller 56 is separated from the upstream screw shafts 51A and 51B of one line, the other follower roller 55 is engaged with the downstream screw shafts 51B and 51C of the other line.

According to the configuration of the third invention, it is not necessary to arrange conveyance carriage drive means dedicated to transferring, such as an auxiliary screw shaft for transferring a follower roller of a conveyance carriage between the respective screw shafts arrayed in the traveling route direction of the conveyance carriage, and the two follower rollers may only be arranged in a position-fixed state on the conveyance carriage side, a movable follower roller capable of switching the positions relative to the screw shaft and means for switching the positions of the movable follower roller are not required. Thus, the structure of the whole device becomes very simple, and the device can be implemented inexpensively. Moreover, by the screw shafts arrayed in a zigzag manner so that the screw shafts are arranged concentrically in series for each line and the two follower rollers on the conveyance carriage side, the conveyance carriage can be continuously traveled and driven without interruption even in the transferring region between the two screw shafts adjacent before and after and different in line. Further, the conveyance carriage needs to be configured to travel at a constant speed without changing the forwarding pitches of the respective screw shafts within the transferring region. However, if a region other than the transferring region is recognized, one follower roller is merely engaged with the screw shafts. Therefore, when a borderline between the two (front and rear) regions different in forwarding pitch of the screw shaft is placed in a location other than the transferring region, the traveling speed of the conveyance carriage in the middle of the traveling route can also be changed.

In implementing the third invention of the configuration, the following specific configurations G to J can be adopted.

Specific Configuration G

As the transferring region, a first transferring region B1 in which the two screw shafts 51A and 51B adjacent before and after and different in line are respectively kept apart in the axial direction of the screw shaft and a second transferring region B2 in which ends of the two screw shafts 1B and 1C adjacent before and after and different in line are respectively overlapped are alternately arranged, and the two follower rollers 55 and 56 can be disposed by deviating a position thereof in the axial direction of the screw shaft by a distance (interval D) longer than an interval in the axial direction of the screw shaft between the two screw shafts 51A and 51B adjacent before and after and different in line in the first transferring region B1 and shorter than an overlapping length of the ends of the two screw shafts 51B and 51C in the second transferring region B2.

Specific Configuration H

When the specific configuration G is adopted, within the first and second transferring regions B1 and B2, the forwarding pitches of the screw shafts 51A, 51B, 51C . . . do not change, and in a location other than the first and second transferring regions B1 and B2, a borderline between the two (front and rear) regions different in forwarding pitch of the screw shafts 51A, 51B, 51C . . . can be placed, and the forwarding pitches of the screw shafts 51A, 51B, 51C . . . in the first and second transferring regions B1 and B2 can be set to an integer fraction of the interval D in the axial direction of the screw shafts between the two follower rollers 55 and 56.

Specific Configuration I

As the transferring region, a transferring region B3 in which ends of the two screw shafts 51A, 51B and 51B, 51C adjacent before and after and different in line are respectively overlapped can be arranged, and the two follower rollers 55 and 56 can be placed in juxtaposition symmetrically relative to a direction perpendicular to the axial direction of the screw shaft so as to be simultaneously fitted to the ends of the two screw shafts 51A, 51B or 51B, 51C adjacent before and after the transferring region B3 and different in line.

Specific Configuration J

When the specific configuration I is adopted, within the transferring region B3, the forwarding pitches of the screw shafts 1A, 1B, 1C . . . do not change, and in a location other than the transferring region B3, a borderline between the two (front and rear) regions different in forwarding pitch of the screw shafts 1A, 1B, 1C . . . can be placed.

The third invention can be implemented by adopting the specific configuration G and the specific configuration I. In particular, according to the specific configuration G, the third invention can be easily implemented by suppressing a total extension of the screw shafts. According to the specific configuration I, the two follower rollers on the conveyance carriage side can be placed in juxtaposition in a direction perpendicular to the traveling direction of the conveyance carriage, and thus, the third invention can also be easily implemented for a small conveyance carriage having a short length.

Further, according to the specific configuration H or the specific configuration J, in a configuration such that a plurality of transferring regions are arranged, it is not necessary that the forwarding pitches in all the transferring regions are rendered the same, and the forwarding pitches in the transferring regions can be changed where necessary. Therefore, in combination with the placement of the borderline between the two (front and rear) regions different in forwarding pitch of the screw shaft in a location other than the transferring regions, a plurality of regions different in traveling speed of the conveyance carriage in the middle of the traveling route, including the respective transferring regions, can be arbitrarily set. In particular, when according to the specific configuration J, if the forwarding pitches are set in the transferring regions, there is no constraint incurred because of the relationship with the follower roller.

A second object of the present application is to provide a screw driven conveyance device capable of solving the conventional problem in that due to a play between the helical vane of the screw shaft and the follower roller on the conveyance carriage side, the conveyance carriage (workpiece) is rattled back and forth, as described above. A screw driven conveyance device according to a fourth invention, which has been achieved to attain the second object, is configured so that (for reference, components are allotted with reference numerals and letters in the embodiments described below): a screw shaft 71 that is rotation-driven is placed along a traveling route of a conveyance carriage 72; the conveyance carriage 72 is arranged with a follower roller 75 engaged with the screw shaft 71; and the conveyance carriage 72 is propelled by rotation-driving of the screw shaft 71, in which in the conveyance carriage 72, a pair of front and rear follower rollers 75 and 76 fitted between helical vanes 71a and 71b at two locations, which are front and rear locations, in the axial direction of the screw shaft are pivotally supported, one follower roller is a position-fixed follower roller 75, the other follower roller is a movable follower roller 76 supported movably within a certain range in the axial direction of the screw shaft, urging means 90 for urging the movable follower roller 76 in one orientation of a moving direction of the movable follower roller 76 is provided, and when the pair of front and rear follower rollers 75 and 76 are press-contacted in an opposite orientation to each other to the helical vanes 71a and 71b of the screw shaft 71 positioned on one side of the respective follower rollers 75 and 76, a position of the conveyance carriage 72 relative to the screw shaft 71 is determined.

According to the configuration of the fourth invention, when the a pair of front and rear follower rollers on the conveyance carriage side are press-contacted in an orientation opposite to each other to the helical vanes of the screw shaft positioned on the one side of the respective follower rollers, the position of the conveyance carriage relative to the screw shaft is determined. This configuration eliminates a need for manufacturing the screw shaft with high accuracy so that a gap (play) between the follower roller on the conveyance carriage side and the helical vane (of the screw shaft) that sandwiches the follower roller is minimized. Although it is possible to lower the cost of manufacturing the screw shaft, the position of the conveyance carriage relative to the screw shaft can be reliably determined by press-contact between the position-fixed follower roller and the helical vane of the screw shaft, and thus, it becomes possible to reliably prevent the traveling conveyance carriage from being rattled forward and backward in the traveling direction due to vibration etc. Therefore, the present invention can be sufficiently utilized for conveyance of a workpiece on a coating line, which has not conventionally permitted the use of this type of conveyance device.

When the fourth invention is implemented, when the length of the traveling route of the conveyance carriage 72 is short, the entire length of the conveyance carriage traveling route can be covered with a single screw shaft 71. When the length of the traveling route of the conveyance carriage 72 is long, it becomes necessary to place a plurality of screw shafts 71 concentrically in series and to operably couple the respective screw shafts 71 to each other. In this case, between the screw shafts 71, bearings 82 at the both ends of the screw shaft 71 and transmission means 78 and 79 between the screw shafts 71 need to be placed, and because of this, a significantly long air space 83 is required between the screw shafts 71. When the fourth invention is implemented in such a situation, the following specific configurations K and L can be adopted.

Specific Configuration K

It may be configured so that a plurality of screw shafts 71 are concentrically placed in series with an air space 83 not wider than an interval between a pair of front and rear follower rollers 75 and 76, the movable follower roller 76 is provided with second holding means 91 for positioning the movable follower roller 76 at a position when the pair of front and rear follower rollers 75 and 76 are fitted between the helical vanes 71a and 71b of a single screw shaft 71 (expected active position) so as to be respectively press-contacted to the helical vanes 71a and 71b on one side, the air space 83 between the screw shafts 71 is provided with second switching means 96 for switching the second holding means 91 from a non-positioned state to a positioned state upstream of the air space 83 and returning the second holding means 91 from the positioned state back to the non-positioned state downstream of the air space 83, and while the pair of front and rear follower rollers 75 and 76 are transferred from upstream to downstream of the air space 83 between the screw shafts 71, the movable follower roller 76 is positioned by the second holding means 91.

Specific Configuration L

When the specific configuration K is adopted, it may be configured so that the movable follower roller 76 is pivotally supported by a movable body 88 supported movably within a certain range in the axial direction of the screw shaft, the urging means 90 is configured by a spring 92 for urging the movable body 88 in one direction, the second holding means 91 is configured by a locked portion 95 arranged on a side of the conveyance carriage 72, and a lock member 94 that is pivotally supported by the movable body 88 in a manner to be releasably engaged with the locked portion 95 and that is urged and held in a non-positioned state pulled off from the locked portion 95, the second switching means 96 is provided with a cam rail 97 arranged on a side of the traveling route of the conveyance carriage 72 so as to act on the cam follower roller 98 arranged in the lock member 94, and while the pair of front and rear follower rollers 75 and 76 are transferred from upstream to downstream of the air space 83 between the screw shafts 71, the cam rail 97 holds the lock member 94 via the cam follower roller 98 in a positioned state engaged with the locked portion 95.

In a case where a plurality of screw shafts need to be concentrically placed in series because the length of the traveling route of the conveyance carriage is long, when the pair of front and rear follower rollers pass through the air space, e.g., when the position-fixed follower rollers pass through the air space, while securing a necessary air space between the screw shafts because of the placement of the bearing of the screw shaft and placement of the transmission means between the screw shafts, the conveyance carriage moves relatively to the movable follower roller by the urging force of the urging means for urging the movable follower roller, and as a result, an interval between the position-fixed follower roller and the movable follower roller is changed. Alternatively, when the movable follower roller passes through the air space, the movable follower roller moves in the urging direction by the urging force of the urging means, and as a result, the interval between the position-fixed follower roller and the movable follower roller is changed. However, according to the specific configuration K, such an instance can be eliminated, and the pair of front and rear follower rollers can be smoothly and reliably fitted between the helical vanes of the screw shaft downstream of the air space. That is, while the configuration of the fourth invention is adopted, the transferring between the screw shafts can be smoothly and reliably performed. This specific configuration K can be easily implemented by adopting the specific configuration L.

A third object of the present application is to provide a screw driven conveyance device provided with a screw shaft structure, which can be utilized in a case where the screw driven conveyance device according to the first to fourth inventions is implemented. A screw driven conveyance device according to a fifth invention, which has been achieved to attain the third object, is configured so that (for reference, components are allotted with reference numerals and letters in the embodiments described below): a screw shaft 101 that is rotation-driven is placed along a traveling route of a conveyance carriage 102; the conveyance carriage 102 is arranged with a follower roller 105 engaged with the screw shaft 101; and the conveyance carriage 102 is propelled by rotation-driving of the screw shaft 101, in which the screw shaft 101 is composed of: a center shaft rod 112 of which the both ends are supported to permit revolution by a bearing 123; and a plurality of cylindrical screw single bodies 113 fixed in an externally fitted manner to the center shaft rod 112 so as to be arranged in series in an axial direction of the center shaft rod 112, and the respective cylindrical screw single bodies 113 are composed of a cylindrical main body 117 and a helical vane 118 protrudingly arranged outside of the cylindrical main body 117, and are each fixed in an externally fitted manner to the center shaft rod 112 so that the helical vane 118 is continued in an axial direction of the center shaft rod 112.

According to the configuration of the fifth invention, even if the respective cylinder screw single bodies do not have a mutually fitting portion fitted in the axial direction, the bending strength of all the screw shaft bodies assembled with the center shaft rod and a required number of axial-direction cylinder screw single bodies externally fitted to the center shaft rod can be secured by the center shaft rod continued across the entire length of the screw shaft. In other words, the respective cylinder screw single bodies may be fixed to the center shaft rod by a phase by which the helical vane continues across the entire length of the screw shaft. Even if the fitting portion to be fitted in the axial direction is arranged at the end of the respective cylinder screw single bodies, the fitting depth can be decreased to the required minimum, and the whole device can be made light by reducing an amount of material to be used, and also the structure can be simplified so as to facilitate cost reduction.

In implementing the fifth invention, the following specific configurations M to Q can be adopted.

Specific Configuration M

The respective cylindrical screw single bodies 113 are provided with a protruded cylinder shaft 117a arranged in a manner to concentrically protrude from the one end, and the cylindrical screw single bodies 113 adjacent in the axial direction are configured so that the protruded cylinder shaft 117a of one cylindrical screw single body 113 is fitted concentrically to inside the end (annular recess 117b) of the other cylindrical screw single body 113, and also can be connected in a state where a relative rotation in a circumferential direction and a relative movement in an axial direction of the both screw single bodies 113 are inhibited by a coupling tool 122 attached in a radial direction in a fitting location of the both screw single bodies 113.

According to the specific configuration M, the respective cylindrical screw single bodies are connected to each other in a state where the relative rotation in a circumferential direction and the relative movement in an axial direction are inhibited by these cylindrical screw single bodies alone. Thus, as a method of fixing a required number of cylindrical screw single bodies externally fitted to the center shaft rod, to the center shaft rod, for example, only the cylindrical screw single bodies (or body) positioned at the both ends or one end can be fixed to the center shaft rod by appropriate means. In this way, the assembly is significantly simplified.

Specific Configuration N

The respective cylindrical screw single bodies 113 are provided with a protruded cylinder shaft 117a arranged in a manner to concentrically protrude from the one end, and the cylindrical screw single bodies 113 adjacent in the axial direction fit the protruded cylinder shaft 117a of one cylindrical screw single body 113 concentrically to inside the end (annular recess 117b) of the other cylindrical screw single body 113, and also can be connected in a state where a relative rotation in a circumferential direction of the both screw single bodies 113 is inhibited by an shaft-direction key 124 set between the both screw single bodies 113 at a fitting location thereof. In this case, the key 124 can be protrudingly arranged by integrated molding on one of the outer circumferential surface of the protruded cylinder shaft 117a and the inner side surface of the end of the cylindrical screw single body 113 to which this protruded cylinder shaft 117a is internally fitted, and a key groove 125 fitted with the key 124 can be formed on the other surface. In addition, the key grooves 125a and 125b are formed on the both surfaces, i.e., the outer circumferential surface of the protruded cylinder shaft 117a and the inner side surface of the end of the cylindrical screw single body 113 to which the protruded cylinder shaft 117a is internally fitted, and between the key grooves 125a and 125b of the both surfaces, the key 124, which is a separate component, can be fitted.

Specific Configuration O

The respective cylindrical screw single bodies 113 are provided with a protruded square shaft 126 arranged in a manner to concentrically protrude from the one end, and a square hole 127 formed concentrically at the other end, and the cylindrical screw single bodies 113 adjacent in the axial direction can be connected in a state where a relative rotation of the both screw single bodies 113 in a circumferential direction is inhibited as a result of the protruded square shaft 126 of one cylindrical screw single body 113 being fitted concentrically to the square hole 127 of the other cylindrical screw single body 113.

Specific Configuration P

In a center shaft rod 112, a key groove 128 is formed continuously in an axial direction, the respective cylindrical screw single bodies 113 are formed with a key groove 129 inside of at least one end of each screw single body 113, and the respective cylindrical screw single bodies 113 can be attached to a center shaft rod 112 in a state where a relative rotation in a circumferential direction is inhibited by a key 130 fitted across the key groove 129 on a side of the respective cylindrical screw single bodies 113 and the key groove 128 on a side of the center shaft rod 112.

Specific Configuration Q

When the specific configurations M to P are adopted, a plurality of cylindrical screw single bodies 113 in an axial direction externally fitted to the center shaft rod 112 can be fastened in the axial direction by nuts 116a and 116b fitted by screwing to the end of the center shaft rod 112. As a matter of course, a method of fixing the cylindrical screw single body 113 to the center shaft rod 112 is not limited. For example, in the specific configuration M, all the cylindrical screw single bodies 113 externally fitted to the center shaft rod 112 are coupled by a coupling tool 122 in the axial direction also. Thus, only the cylindrical screw single bodies (or body) 113 positioned at the both ends or one end can be fixed to the center shaft rod 112 by appropriate means. In the specific configurations N to P, the cylindrical screw single bodies 113 are able to move relatively freely in the axial direction, and thus, only the two cylindrical screw single bodies 113 positioned at the both ends may be fixed to the center shaft rod 112 by the appropriate means.

According to the specific configurations N to P, the cylindrical screw single bodies adjacent in the axial direction are connected in a state where the relative rotation in the circumferential direction is inhibited. Thus, as compared to a case where the respective cylindrical screw single bodies need to be individually fixed to the center shaft rod by determining the phase so that the helical vanes of the respective cylindrical screw single bodies are continued in the axial direction, the assembly work is further simplified. Alternatively, by the fitting between the key and the key groove, and by the fitting between the square shaft and the square hole, transmission of the rotating force between the respective cylindrical screw single bodies can be performed reliably and strongly.

Further, when the specific configurations M to P are adopted, when the specific configuration Q is adopted, a required number of cylindrical screw single bodies in the axial direction connected in a state where the relative movement at least in the circumferential direction is inhibited can be fixed to the center shaft rod only by an operation of fastening the nut at the end of the center shaft rod. Thus, the assembly work becomes further simplified. In particular, when the screw shafts thus assembled are placed in the conveyance carriage traveling route direction and coupled operably to each other by a chain or a gear, the phase alignment of the helical vanes between the respective screw shafts can be easily and simply performed only by rotating all the cylindrical screw single bodies by loosening the nuts.

BRIEF DESCRIPTION OF THE DRAWINGS

FIG. 22A is a side view of relevant parts in a state where a conveyance carriage is driven and propelled on a single screw shaft of the fourth embodiment;

FIG. 22B is a horizontal plain view of the relevant parts;

DETAILED DESCRIPTION OF THE INVENTION

First Embodiment

Figure 1:
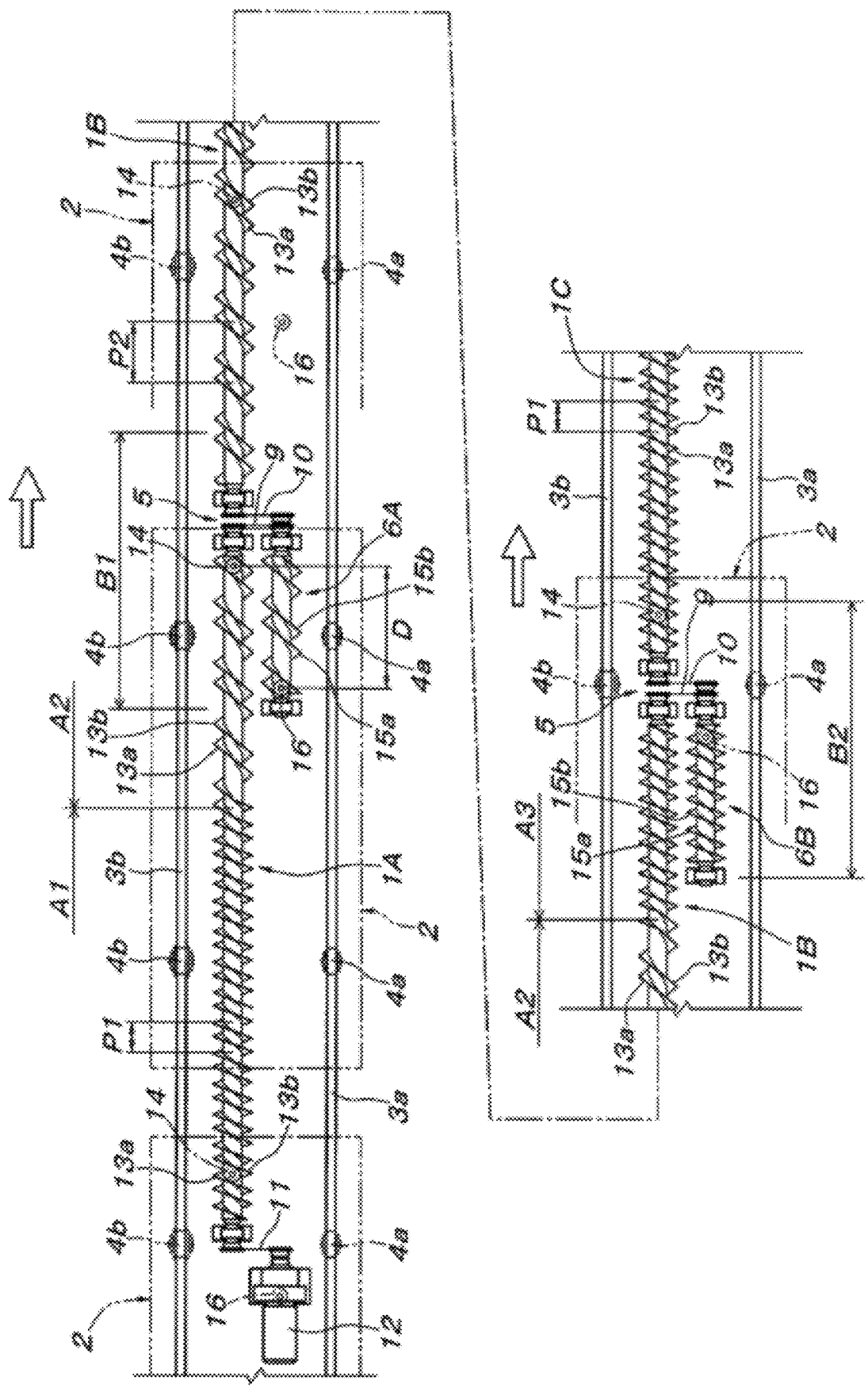
FIG. 1 is a schematic plain view of relevant parts, showing a first embodiment according to the first invention.
Figure 2:
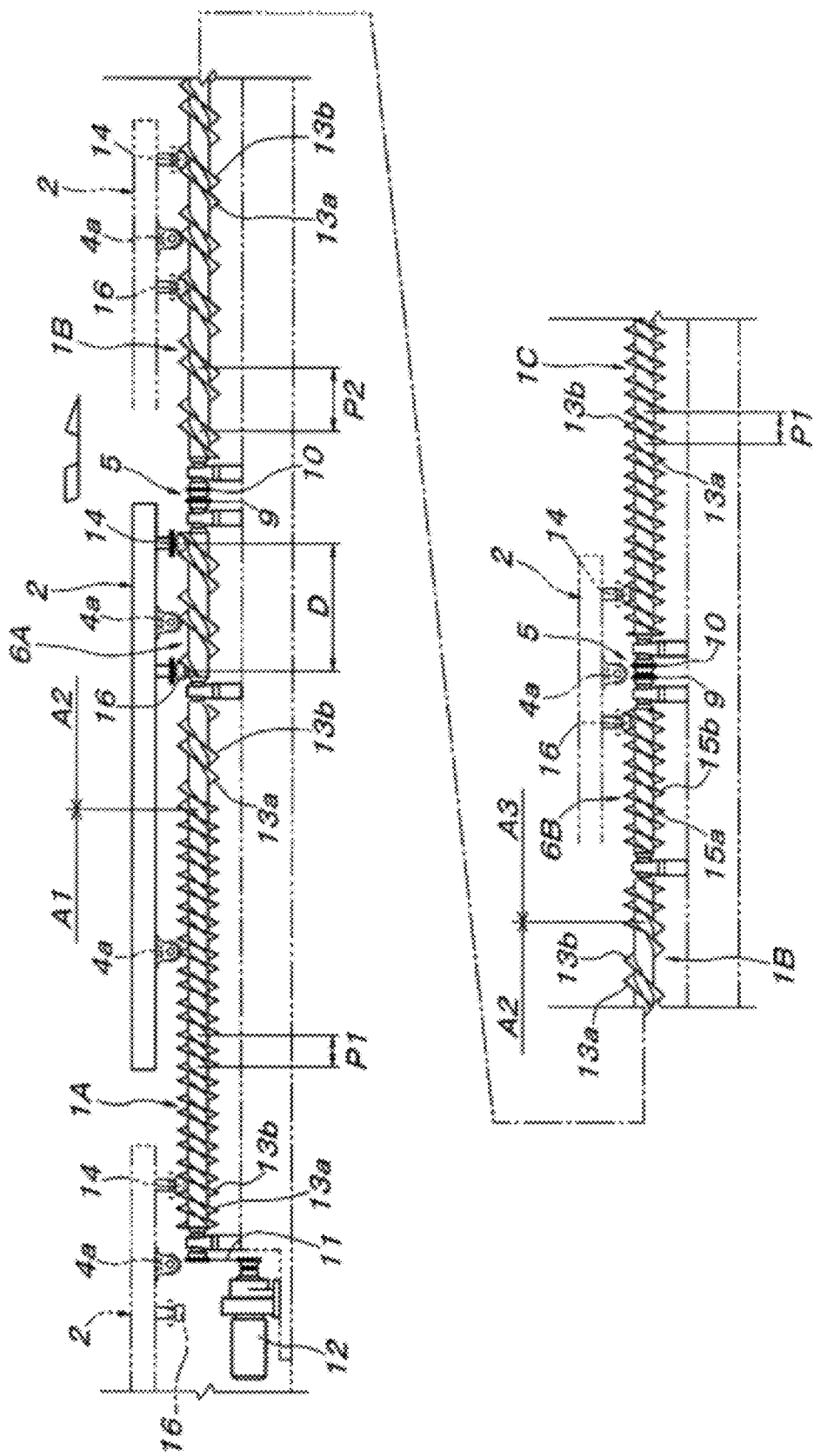
FIG. 2 is a schematic side view of the relevant parts.

FIG. 1 and FIG. 2 are views each showing a part of a conveyance device. A conveyance carriage 2 driven and propelled by screw shafts 1A, 1B, 1C . . . is provided with: a pair of front and rear flangeless wheels 4a rolling on one guide rail 3a, out of a pair of right and left guide rails 3a and 3b; a pair of front and rear flanged wheels 4b rolling on the other guide rail 3b and sandwiching the guide rail 3b from both right and left sides. A required number of screw shafts 1A, 1B, 1C . . . are disposed concentrically in series with air spaces 5 parallel to the guide rails 3a and 3b at an intermediate position of the pair of right and left guide rails 3a and 3b. At lateral side positions of the end on the same direction side of the respective screw shafts 1A, 1B, 1C . . . , which is the end adjacent to air spaces 5 between the screw shafts, auxiliary screw shafts 6A, 6B . . . which are shorter than the respective screw shafts 1A, 1B, 1C . . . but sufficiently longer than lengths of the air spaces 5 between the screw shafts and all of which are the same in length are placed in juxtaposition in a parallel manner. The ends of the respectively juxtaposed screw shafts 1A, 1B, 1C . . . and auxiliary screw shafts 6A, 6B . . . on a side adjacent to the air spaces 5 between the screw shafts are aligned in position relative to an axial direction of the screw shaft.

Figure 3:
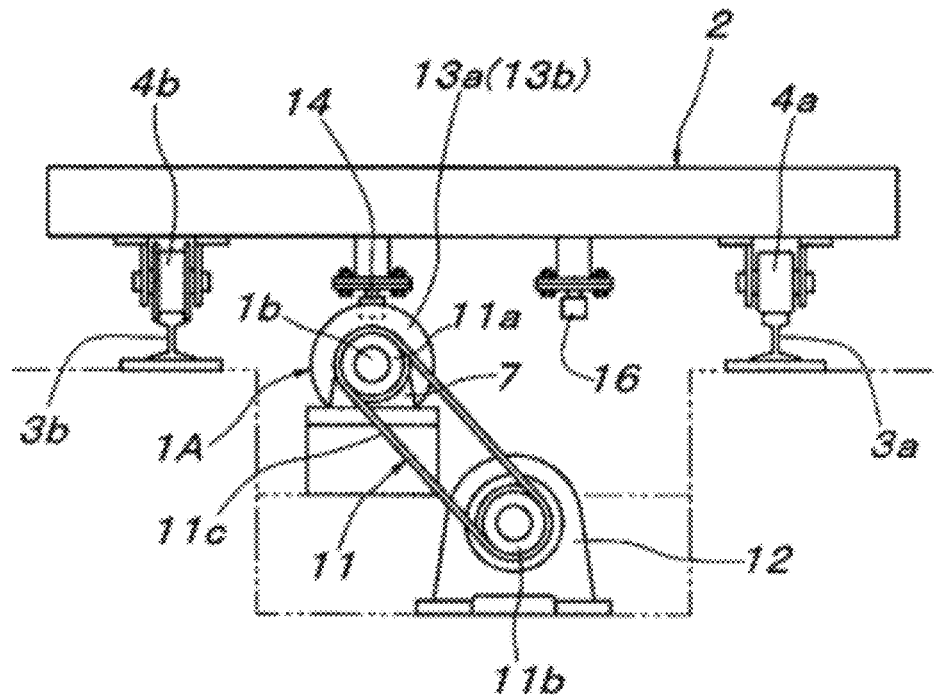
FIG. 3 is a back view showing a start end of a conveyance carriage traveling route of the first embodiment.
Figure 4:
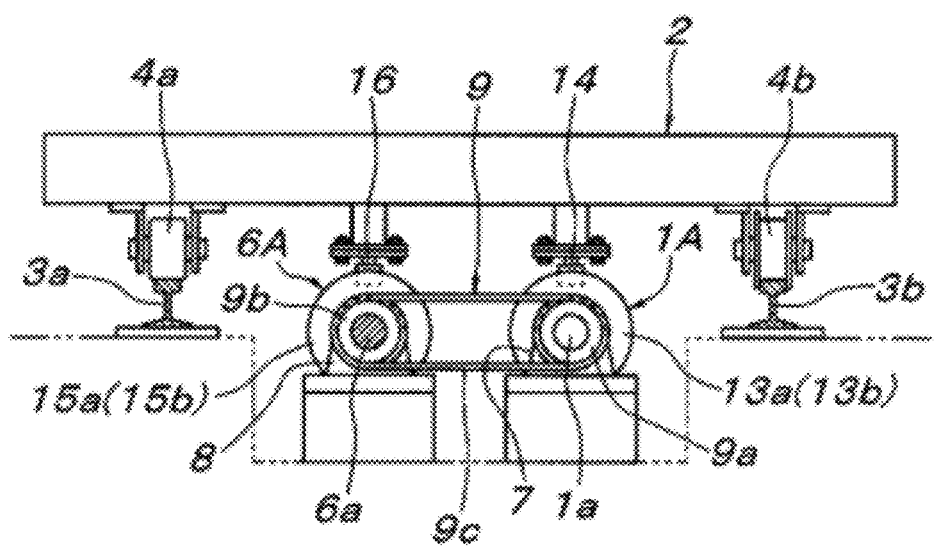
FIG. 4 is a longitudinal front view of a mid-portion of the conveyance carriage traveling route of the first embodiment.
Figure 5:
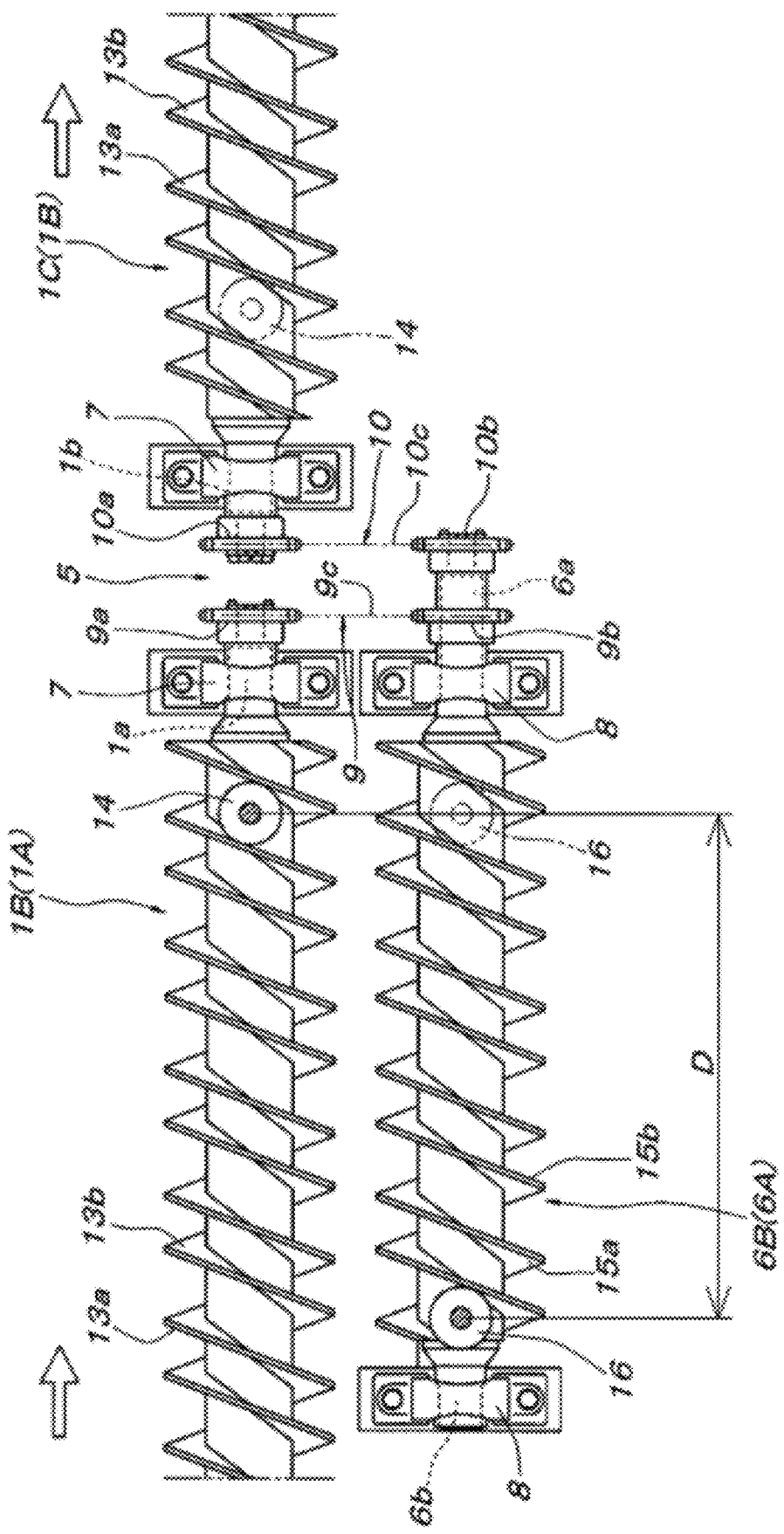
FIG. 5 is an enlarged plain view of relevant parts showing an operable structure between a screw shaft and an auxiliary screw shaft of the first embodiment.

As shown in FIG. 4 and FIG. 5, the respective screw shafts 1A, 1B, 1C . . . and the respective auxiliary screw shafts 6A, 6B . . . are supported by bearings 7 and 8 at protruded shafts 1a, 1b and 6a, 6b protruding from the both ends of these screw shafts 1A, 1B, 1C . . . . The protruded shafts 1a and 1b of the respective screw shafts 1A, 1B, 1C . . . adjacent to one another within the air spaces 5 between the screw shafts and the protruded shaft 6a protruding within the air spaces 5 between the screw shafts of the respective auxiliary screw shafts 6A, 6B . . . are operably coupled to each other by transmission means 9 and 10 configured by toothed gears 9a and 9b and toothed gears 10a and 10b attached to the protruded shafts 1a, 1b, and 6a and chains 9c and 10c suspended between the toothed gears 9a and 9b and between the toothed gears 10a and 10b. As shown in FIG. 1 to FIG. 3, the screw shaft 1A positioned at one end of a traveling route of the conveyance carriage 2 is operably coupled to a reducer-equipped motor 12 via transmission means 11 that utilizes, similar to the transmission means 9 and 10, toothed gears 11a and 11b and a chain 11c. Moreover, when the screw shaft 1A is rotation-driven by the reducer-equipped motor 12, all the screw shafts 1A, 1B, 1C . . . and auxiliary screw shafts 6A, 6B . . . can be operably rotated at constant speed in the same direction. In addition, the respective air spaces 5 between the screw shafts are utilized as a spacing for setting up the respective screw shafts 1A, 1B, 1C . . . , or the bearings 7 and 8 for supporting one end of the auxiliary screw shafts 6A, 6B . . . , or the transmission means 9 and 10.

The screw shafts 1A, 1B, 1C . . . , or the auxiliary screw shafts 6A, 6B . . . may be driven by way of any method. For example, it may be configured so that one of the screw shafts 1B, 1C . . . at the intermediate appropriate positions of the traveling route of the conveyance carriage 2 or the auxiliary screw shafts 6A, 6B . . . interlocked with the respective screw shafts 1A, 1B, 1C . . . is driven by a reducer-equipped motor. Further, the transmission means utilizing a chain has been described as the transmission means 9 to 11. However, transmission means utilizing a gear may also be utilized.

In the conveyance carriage 2, there are arranged a follower roller 14 fitted between the helical vanes 13a and 13b of the respective screw shafts 1A, 1B, 1C . . . , and an auxiliary follower roller 16 fitted between the helical vanes 15a and 15b of the respective auxiliary screw shafts 6A, 6B . . . . The follower roller 14 and the auxiliary follower roller 16 are placed as shown in FIG. 5. That is, in order that when the follower roller 14 is fitted between the helical vanes 13a and 13b at the end on a side juxtaposed with the auxiliary screw shafts 6A, 6B . . . , out of the both ends of the screw shafts 1A, 1B, 1C . . . , the auxiliary follower roller 16 is fitted between the helical vanes 15a and 15b at the end on a side further away from the follower roller 14 (end on a side not adjacent to the air space 5 between the screw shafts), out of the both ends of the auxiliary screw shafts 6A, 6B . . . , the follower roller 14 and the auxiliary follower roller 16 are placed to be kept apart in an axial direction of the screw shaft by an interval D which is shorter than the length of the auxiliary screw shafts 6A, 6B . . . but is longer than the length of the air space 5 between the screw shafts.

The screw shafts 1A, 1B, 1C . . . are provided with the helical vanes 13a and 13b of a double-blade system which sandwiches the follower roller 14 from the both sides of the axial direction of the screw shaft, and the auxiliary screw shafts 6A, 6B . . . are provided with the helical vanes 15a and 15b of a double-blade system which sandwiches the auxiliary follower roller 16 from the both sides of the axial direction of the screw shaft. The forwarding pitch is not constant. In the illustrated embodiment, as shown in FIG. 1 and FIG. 2, a low-speed driving region A1 from the free end to the intermediate position of the screw shaft 1A, a high-speed driving region A2 from the low-speed driving region A1 to the intermediate position of the next screw shaft 1B, and a low-speed driving region A3 following the high-speed driving region A2 are provided. The high-speed driving region A2 and the next low-speed driving region A3 include single transferring regions B1 and B2, respectively. The transferring regions B1 and B2 correspond to regions extending from the auxiliary follower roller 16 at a position slightly before the auxiliary screw shafts 6A, 6B . . . to the follower roller 14 that forms a pair when the auxiliary follower roller 16 enters onto the downstream screw shafts 1B, 1C . . . beyond the air space 5 between the screw shafts. These transferring regions B1 and B2 each include one of the auxiliary screw shafts 6A, 6B . . . , one air space 5 between the screw shafts adjacent by the auxiliary screw shafts 6A, 6B . . . , and the end regions of the screw shafts 1A, 1B, 1C . . . adjacent before and after the air space 5.

A forwarding pitch P1 of the helical vanes 13a and 13b or 15a and 15b of a portion included in the low-speed driving regions A1 and A3 of the screw shafts 1A, 1B, 1C . . . and the auxiliary screw shafts 6A, 6B . . . is smaller than a forwarding pitch P2 of the helical vanes 13a and 13b or 15a and 15b of a portion included in the high-speed driving region A2. Both the forwarding pitches P1 and P2 are an integer fraction of the interval D in the axial direction of the screw shaft between the follower roller 14 and the auxiliary follower roller 16. In the illustrated example, the forwarding pitch P1 is ¼ the interval D, and the forwarding pitch P2 is ½ the interval D.

According to the above-described configuration, when the reducer-equipped motor 12 is run to rotation-drive all the screw shafts 1A, 1B, 1C . . . and auxiliary screw shafts 6A, 6B . . . at constant speed in the same direction, e.g., a direction in which the conveyance carriage 2 is propelled in a forward direction indicated by arrows in FIG. 1 and FIG. 2, the conveyance carriage 2 which has been waiting at the start end position of the traveling route on the screw shaft 1A side in a state where the follower roller 14 is fitted between the helical vanes 13a and 13b of the screw shaft 1A within the low-speed driving region A1 starts traveling forward at low speed equivalent to the forwarding pitch P1 of the screw shaft 1A within the low-speed driving region A1. When the traveling of the conveyance carriage 2 allows the follower roller 14 to move in from between the helical vanes 13a and 13b in the low-speed driving region A1 of the screw shaft 1A to between the helical vanes 13a and 13b in the next high-speed driving region A2, the traveling speed of the conveyance carriage 2 is switched to high speed equivalent to the forwarding pitch P2 of the screw shaft 1A in the high-speed driving region A2. At this time, the auxiliary follower roller 16 is in a free state, and thus, the speed switching of the conveyance carriage 2 is performed without obstruction. As a result, the conveyance carriage 2 traveling at high speed within the high-speed driving region A2 enters in the transferring region B1 included within the high-speed driving region A2, and travels within the transferring region B1 while keeping the high speed equivalent to the forwarding pitch P2. Slightly before the front-side follower roller 14 reaches the terminal end of the screw shaft 1A, the rear-side auxiliary follower roller 16 enters between the helical vanes 15a and 15b of the auxiliary screw shaft 6A within the transferring region B1.

By the action, even if the follower roller 14 is pulled off from the screw shaft 1A along with the traveling of the conveyance carriage 2, the conveyance carriage 2 continues traveling at high speed without interruption as a result of the auxiliary follower roller 16 receiving the thrust force from the auxiliary screw shaft 6A. At this time, the follower roller 14 moves within the air space 5 between the screw shafts 1A and 1B. Moreover, when the auxiliary follower roller 16 is pulled off from the auxiliary screw shaft 6A along with the traveling of the conveyance carriage 2, the front-side follower roller 14 that has been moved within the air space 5 has already entered between the helical vanes 13a and 13b of the downstream screw shaft 1B, and as a result, the conveyance carriage 2, which ongoingly receives the thrust force from the screw shaft 1B via the follower roller 14, is to continue traveling at high speed.

When the follower roller 14 of the conveyance carriage 2 moves in between the helical vanes 13a and 13b within the next low-speed driving region A3 from between the helical vanes 13a and 13b within the high-speed driving region A2 of the screw shaft 1B, the traveling speed of the conveyance carriage 2 is switched from the high speed equivalent to the forwarding pitch P2 of the screw shaft 1B in the high-speed driving region A2 to the low speed equivalent to the forwarding pitch P1 of the screw shaft 1B in the low-speed driving region A3. At this time, the auxiliary follower roller 16 is in a free state, and thus, the speed switching of the conveyance carriage 2 is performed without obstruction. Thereafter, the follower roller 14 of the conveyance carriage 2 enters the transferring region B2 included within the low-speed driving region A3, and travels within the transferring region B2 while keeping the low speed equivalent to the forwarding pitch P1. However, slightly before the front-side follower roller 14 reaches the terminal end of the screw shaft 1B, the rear-side auxiliary follower roller 16 enters between the helical vanes 15a and 15b of the auxiliary screw shaft 6B within the transferring region B2.

By the action, even if the follower roller 14 is pulled off from the screw shaft 1B along with the traveling of the conveyance carriage 2, the conveyance carriage 2 continues traveling at low speed without interruption as a result of the auxiliary follower roller 16 receiving the thrust force from the auxiliary screw shaft 6B. At this time, the follower roller 14 moves within the air space 5 between the screw shafts 1B and 1C. Moreover, when the auxiliary follower roller 16 is pulled off from the auxiliary screw shaft 6B along with the traveling of the conveyance carriage 2, the front-side follower roller 14 that has been moved within the air space 5 has already entered between the helical vanes 13a and 13b of the downstream screw shaft 1C. As a result, the conveyance carriage 2, which ongoingly receives the thrust force from the screw shaft 1C via the follower roller 14, is to continue traveling at low speed.

Thus, the conveyance carriage 2 sequentially undergoes the low-speed driving region A1, the high-speed driving region A2, and the low-speed driving region A3, and is to continuously travel while being automatically switched to the low speed or the high speed equivalent to the forwarding pitch P1 or P2 in the respective regions. At this time, in order that in the respective transferring regions B1, B2 . . . , the rear-side auxiliary follower roller 16 of the conveyance carriage 2 propelled by the screw shafts 1A, 1B, 1C . . . via the front-side follower roller 14 is able to enter between the helical vanes 15a and 15b of the auxiliary screw shafts 6A, 6B . . . without obstruction, the screw shafts 1A, 1B, 1C . . . and the respective auxiliary screw shafts 6A, 6B . . . juxtaposed therewith are not only the same in forwarding pitches of the helical vanes 13a and 13b and the helical vanes 15a and 15b but also are exactly aligned in phase. Further, in order that the follower roller 14 that is pulled off from the respective upstream screw shafts 1A, 1B, 1C . . . is able to enter between the helical vanes 13a and 13b of the respective downstream screw shafts 1B, 1C . . . without obstruction, the helical vanes 13a and 13b at the ends of the (front and rear) two screw shafts 1A, 1B, 1C . . . that are concentrically faced with one another in the respective transferring regions B1, B2 . . . are not only the same in their forwarding pitches but also are exactly aligned in phase.

In addition, when the traveling route of the conveyance carriage 2 is configured to be a rectangular endless circulating route by a turntable-equipped traverser for laterally forwarding the conveyance carriage 2 and inverting the back-and-forth orientation thereof between a going route and a returning route provided respectively with the screw shafts 1A, 1B, 1C . . . and the auxiliary screw shafts 6A, 6B . . . and between the terminal end and the start end of the both routes, the traveling direction of the conveyance carriage 2 can be rendered constant by rotation-driving the respective screw shafts 1A, 1B, 1C . . . and the auxiliary screw shafts 6A, 6B . . . in a constant direction. When the conveyance carriage 2 is reciprocated on a single straight route, the screw shafts 1A, 1B, 1C . . . and the auxiliary screw shafts 6A, 6B . . . may be reversely rotated. In the embodiment of FIG. 1 and FIG. 2, when the screw shafts 1A, 1B, 1C . . . and the auxiliary screw shafts 6A, 6B . . . are counter-rotated to travel the conveyance carriage 2 backward, the auxiliary follower roller 16 moving ahead of the follower roller 14 enters between the helical vanes 15a and 15b of the auxiliary screw shafts 6B and 6A arranged in juxtaposition with the downstream screw shafts 1B and 1A so as to receive the thrust force before the follower roller 14 (that is the rear side) is pulled off from the screw shafts 1C and 1B, and before the auxiliary follower roller 16 is pulled off from the auxiliary screw shafts 6B and 6A, the rear-side follower roller 14 enters between the helical vanes 13a and 13b of the downstream screw shafts 1B and 1A so as to receive the thrust force. Thus, similar to the case of traveling forward as described above, the conveyance carriage 2 can be continuously traveled at a predetermined speed set to the respective regions, without being effected by the respective air spaces 5 between the screw shafts.

The conveyance carriage driving device utilizing the screw shafts in the foregoing first invention cannot only be utilized as means for driving and propelling the conveyance carriage of a carriage type conveyor traveling on the guide rails laid on the floor surface but also be utilized as means for driving and propelling the conveyance carriage of an overhead conveyor traveling and being supported on a guide rail bridged at an appropriate height above the floor surface. Alternatively, the position of the screw shafts relative to these types of conveyance carriages is not limited to a lower side of the conveyance carriage, and can be arbitrarily set at a lateral side and on an upper side, for example, of the conveyance carriage, according to a support structure of the conveyance carriage, a loading structure of a load, or a similar structure. Therefore, a juxtaposing direction of the screw shafts and the auxiliary screw shafts provided to the screw shafts is not limited to a (right and left) horizontal lateral direction but can be placed in juxtaposition to a (up and down) vertical direction. Alternatively, also the follower roller and the auxiliary follower roller can be supported pivotally so that their shaft centers are not orientated toward the (up and down) vertical direction but toward the (right and left) horizontal direction.

Second Embodiment

Figure 6:
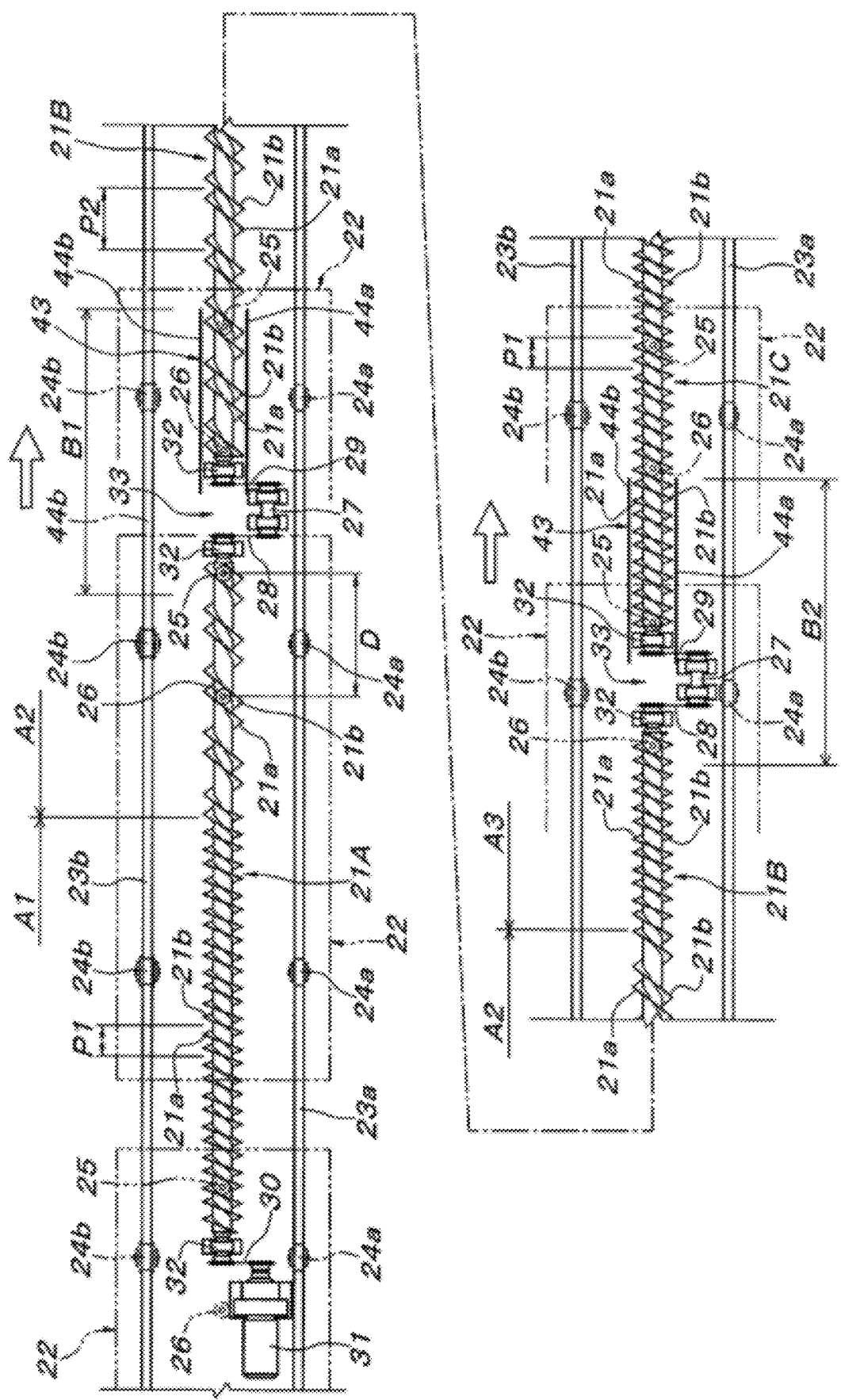
FIG. 6 is a schematic plain view of relevant parts, showing a second embodiment according to the second invention.
Figure 7:
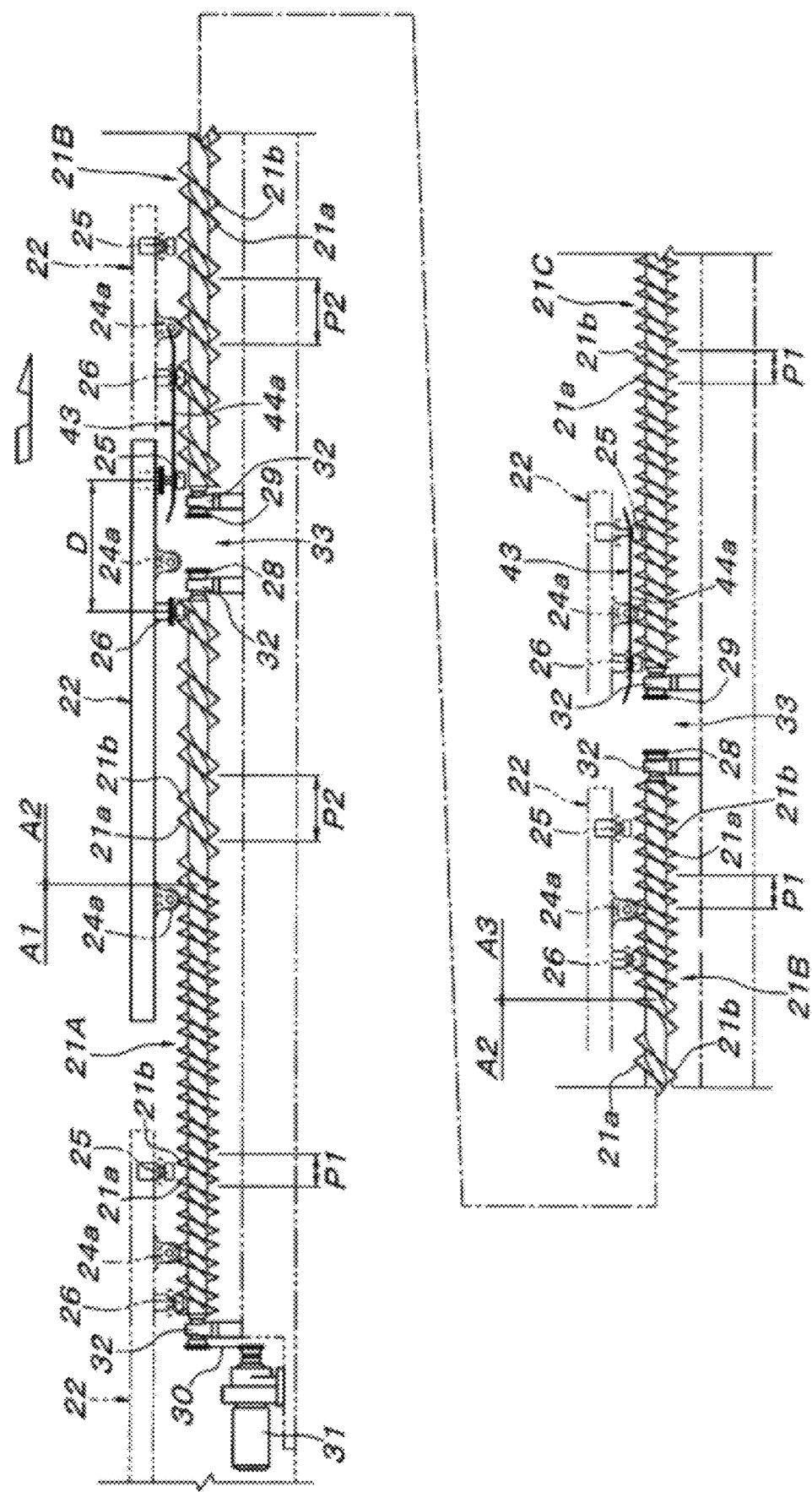
FIG. 7 is a schematic side view of the relevant parts.

FIG. 6 and FIG. 7 are views each showing a part of a conveyance device configured by utilizing a screw shaft for driving a conveyance carriage. A conveyance carriage 22 driven and propelled by screw shafts 21A, 21B, 21C . . . is provided with a pair of front and rear flangeless wheels 24a rolling on one guide rail 23a, out of a pair of right and left guide rails 23a and 23b; a pair of front and rear flanged wheels 24b rolling on the other guide rail 23b and sandwiching the guide rail 23b from both right and left sides. A required number of screw shafts 21A, 21B, 21C . . . are concentrically disposed in series parallel to the guide rails 23a and 23b at an intermediate position of the pair of right and left guide rails 23a and 23b. At the bottom of the conveyance carriage 22, there are provided a pair of front and rear follower rollers 25 and 26 capable of revolution about a vertical support shaft at a position freely fitted between helical vanes of the screw shafts 21A, 21B, 21C . . . .

Ends concentrically adjacent to one another of the respective screw shafts 21A, 21B, 21C . . . are operably coupled so as to operably rotate in the same direction at mutually constant speed via relay shafts 27 supported at the lateral side of ends and transmission means 28 and 29 each utilizing a chain (or a gear), and also a reducer-equipped motor 31 is arranged which is for rotation-driving the screw shaft 21A positioned at one end of the traveling route of the conveyance carriage 22 in an arbitrary direction (positive or negative direction) via transmission means 30 utilizing a chain (or a gear). As a matter of course, it may also be configured such that the screw shafts 21B, 21C . . . at the intermediate appropriate position of the traveling route of the conveyance carriage 22 or the relay shaft 27 interlocked with the screw shafts 21B, 21C . . . are driven by the reducer-equipped motor. Reference numeral 32 denotes bearings that respectively support the both ends of the screw shafts 21A, 21B, 21C . . . . Between the screw shafts 21A, 21B, 21C . . . , there are secured air spaces 33 in which the bearings 32 and the transmission means 28 and 29 are placed.

Out of the pair of front and rear follower rollers 25 and 26, the follower roller 25 on a forward direction side indicated by an arrow is the movable follower roller 25 that can freely move between an active position fitted between the helical vanes 21a and 21b of the screw shafts 21A, 21B, 21C . . . and a non-active position separated from between the helical vanes 21a and 21b. The rear-side follower roller 26 is the position-fixed follower roller 26 attached to a fixed position of the conveyance carriage 22, i.e., a position (in the illustrated embodiment, the height) fitted between the helical vanes 21a and 21b of the screw shafts 21A, 21B, 21C . . . . An interval D in the axial direction of the screw shaft between the movable follower roller 25 and the position-fixed follower roller 26 is longer than the length of each of the air spaces 33 between the screw shafts. Therefore, when the conveyance carriage 22 passes through the air space 33 between the screw shafts, there is no instance that both the pair of front and rear follower rollers 25 and 26 are pulled off from the screw shafts 21A, 21B, 21C . . . on their both sides as a result of being positioned within the air space 33.

Figure 8:
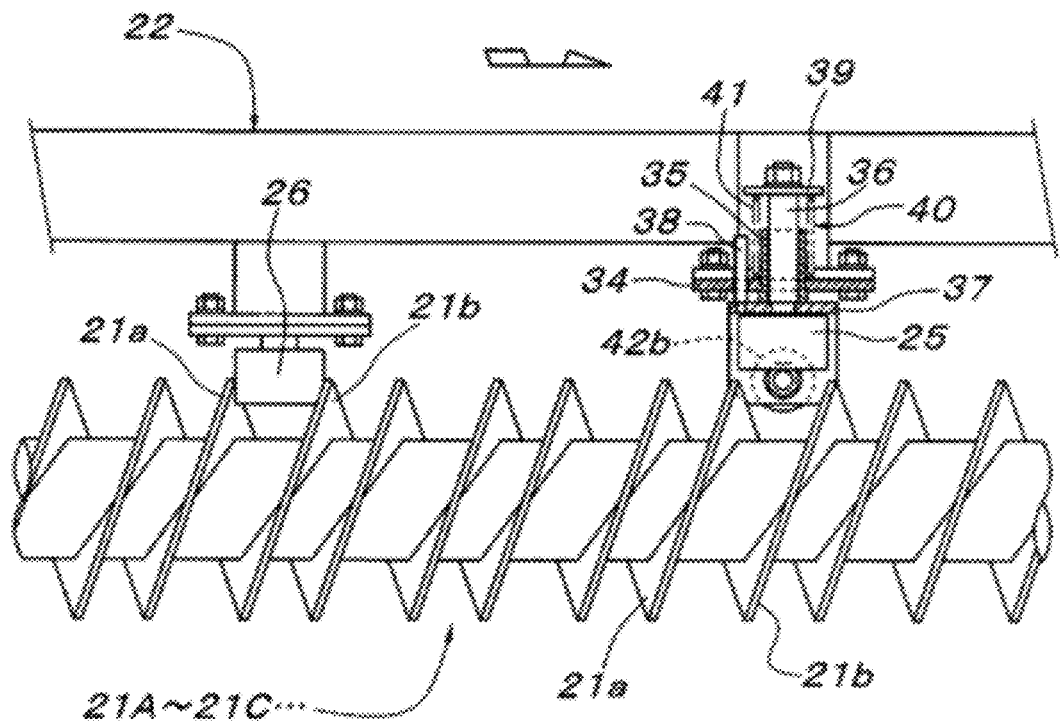
FIG. 8 is a partial longitudinal side view showing a screw shaft and a pair of front and rear follower rollers on a conveyance carriage side of the second embodiment.
Figure 9:
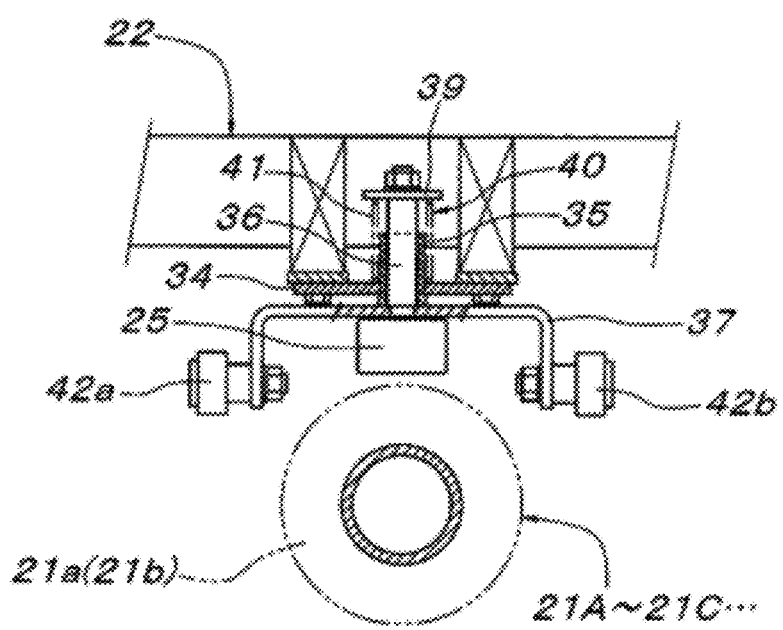
FIG. 9 is a longitudinal front view of relevant parts in FIG. 8.
Figure 10:
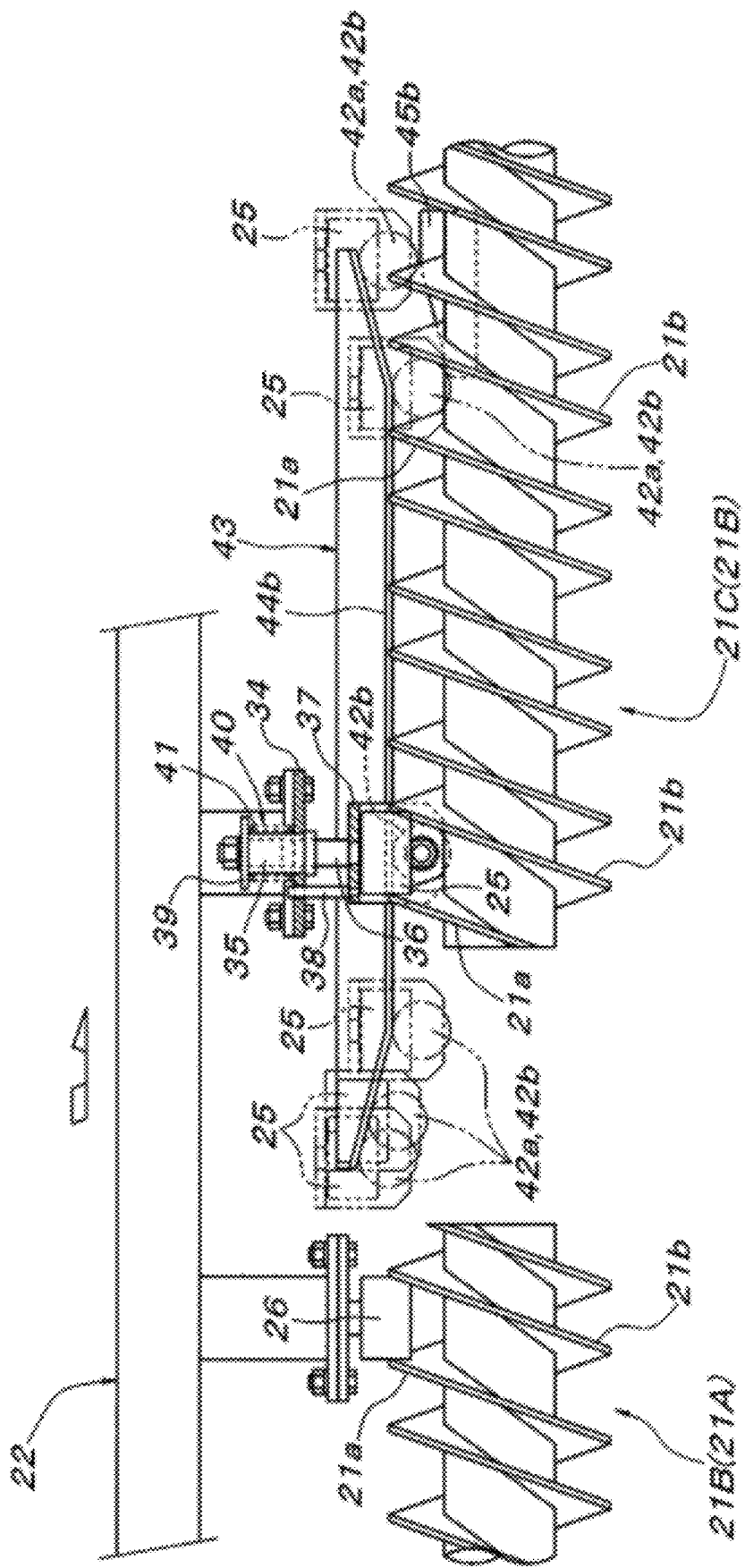
FIG. 10 is a partial longitudinal side view showing a state when passing through an air space between screw shafts of the second embodiment.
Figure 11:
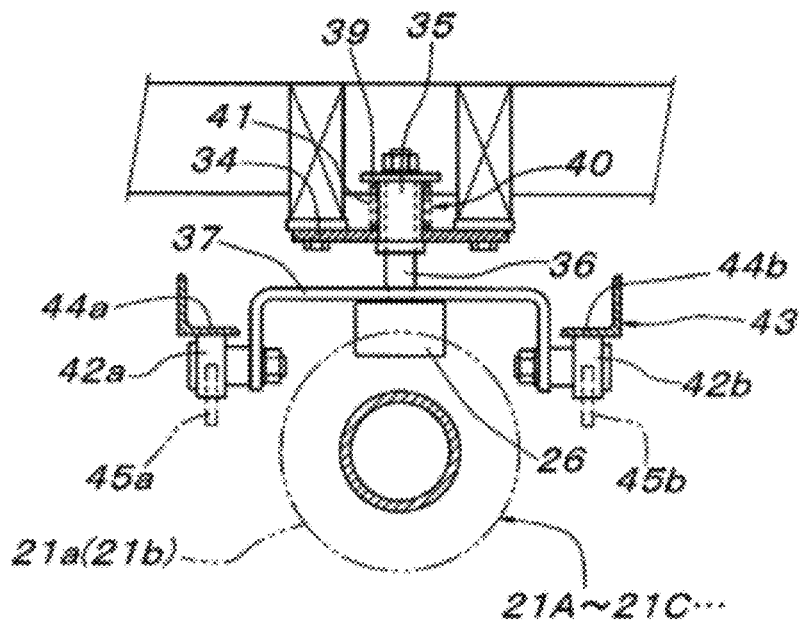
FIG. 11 is a longitudinal front view of relevant parts in FIG. 10.

Next, it will be described in detail below. As shown in FIG. 8 and FIG. 9, at the position attached with the movable follower roller 25 at the bottom of the conveyance carriage 22, a support plate 34 is attached horizontally. The support plate 34 is attached with a cylindrical slide guide 35 in a vertical (up and down) direction at a position immediately above the shaft center of the screw shafts 21A, 21B, 21C . . . . At the lower end of an elevatable shaft rod 36 that elevatably penetrates the cylindrical slide guide 35, there is attached a gate-shaped movable body 37 orientated toward a direction striding over the screw shafts 21A, 21B, 21C . . . . By utilizing a lower end portion of the elevatable shaft rod 36 protruding downward of the gate-shaped movable body 37, the movable follower roller 25 is supported pivotally to permit revolution about the vertical shaft center of the elevatable shaft rod 36. The gate-shaped movable body 37 can rotate about the elevatable shaft rod 36, together with the elevatable shaft rod 36 (or about the vertical shaft center of the elevatable shaft rod 36). To stop the rotation of the gate-shaped movable body 37, a vertical pin 38 of which the lower end is fixed to the gate-shaped movable body 37 is penetrated to enable movement in the vertical (up and down) direction through a through hole arranged on the support plate 34. Also, between a spring holder 39 attached to the upper end of the elevatable shaft rod 36, and the support plate 34, the movable follower roller 25 is interposed in a state to be externally fitted to the cylindrical slide guide 35 and the elevatable shaft rod 36 by a compressed coil spring 41 being first holding means 40 for holding the movable follower roller 25 by urging it against the non-active position (position shown in FIG. 8 and FIG. 9) separated above from between the helical vanes 21a and 21b of the screw shafts 21A, 21B, 21C . . . . Also, outside of the plates on both right and left sides of the gate-shaped movable body 37, cam follower rollers 42a and 42b capable of revolution about the right and left horizontal shaft center are concentrically supported pivotally, respectively.

As shown in FIG. 6, FIG. 7, FIG. 10, and FIG. 11, first switching means 43 are provided for each air space 33 between the screw shafts. Each first switching means 43 is configured by: a pair of right and left cam rails 44a and 44b for pushing down the pair of right and left cam follower rollers 42a and 42b (gate-shaped movable body 37) over a constant route length; and a pair of right and left forcibly restoring cam rails 45a and 45b for forcibly pushing up the pair of right and left cam follower rollers 42a and 42b (gate-shaped movable body 37) that pull off from these cam rails 44a and 44b. The position and the length of the cam rails 44a and 44b and the forcibly restoring cam rails 45a and 45b of the first switching means 43 are set so that action described later is performed.

The screw shafts 21A, 21B, 21C . . . are provided with the helical vanes 21a and 21b of a double-blade system in which the follower rollers 25 and 26 are sandwiched from the both sides in the axial direction of the screw shaft, the forwarding pitches, however, are not constant. In the illustrated embodiment, as shown in FIG. 6 and FIG. 7, a low-speed driving region A1 from the free end of the screw shaft 21A to the intermediate position thereof, a high-speed driving region A2 from the low-speed driving region A1 to the intermediate position of the next screw shaft 21B, and a low-speed driving region A3 following the high-speed driving region A2 are provided. The high-speed driving region A2 and the next low-speed driving region A3 include single transferring regions B1 and B2, respectively. The transferring regions B1 and B2 correspond to regions extending from the position-fixed follower roller 26 when the movable follower roller 25 is within the air space 33 between the screw shafts to movable follower roller 33 when the position-fixed follower roller 26 enters onto the screw shafts 21B, 21C . . . downstream of the air space 33. These transferring regions B1 and B2 each include end regions of one air space 33 between the screw shafts and the screw shafts 21A, 21B, 21C . . . adjacent before and after the air space 33.

A forwarding pitch P1 of the helical vanes 21a and 21b of a portion included in the low-speed driving regions A1 and A3 of the screw shafts 21A, 21B, 21C . . . is smaller than a forwarding pitch P2 of the helical vanes 21a and 21b of a portion included in the high-speed driving region A2. Both the forwarding pitches P1 and P2 are an integer fraction of the interval D in the axial direction of the screw shaft between the both front and rear follower rollers 25 and 26. In the illustrated example, the forwarding pitch P1 is ¼ the interval D, and the forwarding pitch P2 is ½ the interval D.

According to described-above the configuration, when the reducer-equipped motor 31 is run to rotation-drive all the screw shafts 21A, 21B, 21C . . . at constant speed in the same direction, e.g., a direction in which the conveyance carriage 22 is propelled in a forward direction indicated by arrows in FIG. 6 and FIG. 7, the conveyance carriage 22 which has been waiting at the start end position of the traveling route on the screw shaft 21A side in a state where the rear-side position-fixed follower roller 26 is fitted between the helical vanes 21a and 21b of the screw shaft 21A within the low-speed driving region A1 starts traveling forward at low speed equivalent to the forwarding pitch P1 of the screw shaft 21A within the low-speed driving region A1. When the traveling of the conveyance carriage 22 allows the position-fixed follower roller 26 to move in from between the helical vanes 21a and 21b in the low-speed driving region A1 of the screw shaft 21A to between the helical vanes 21a and 21b in the next high-speed driving region A2, the traveling speed of the conveyance carriage 22 is switched to high speed equivalent to the forwarding pitch P2 of the screw shaft 21A in the high-speed driving region A2. At this time, the front-side movable follower roller 25 is held all the time at the non-active position separated above from the screw shafts 21A, 21B, 21C . . . by the first holding means 40 (compressed coil spring 41), and thus, the speed switching of the conveyance carriage 22 is performed without obstruction.

As a result, the conveyance carriage 22 traveling at high speed within the high-speed driving region A2 enters within the transferring region B1 included within the high-speed driving region A2 while keeping the high speed equivalent to the forwarding pitch P2. However, when the front-side movable follower roller 25 fully enters within the air space 33 included in the transferring region B1, as indicated by a virtual line in FIG. 10, the cam follower rollers 42a and 42b provided to the movable follower roller 25 fully enter the lower side of the cam rails 44a and 44b of the first switching means 43 provided to the air space 33, and along with the traveling of the conveyance carriage 22, the cam rails 44a and 44b push down the gate-shaped movable body 37 via the cam follower rollers 42a and 42b against the urging force of the compressed coil spring 41. As a result, the movable follower roller 25 descends from the non-active position to the active position and moves within the air space 33. Consequently, as indicated by actual lines in FIG. 10, the movable follower roller 25 at the active position enters within the helical vanes 21a and 21b of the screw shaft 21B downstream of the air space 33, along with the traveling of the conveyance carriage 22, and shortly after this time, the rear-side position-fixed follower roller 26 is pulled off from the screw shaft 21A upstream of the air space 33 and enters within the air space 33. However, the front-side movable follower roller 25 is receiving the thrust force from the screw shaft 21B, and thus, the conveyance carriage 22 continues traveling at high speed and is able to pass through the transferring region B1 to the downstream side.

The conveyance carriage 22 continues to travel forward by the screw shaft 21B and the front-side movable follower roller 25 held at the active position by the cam rails 44a and 44b. As a result, the rear-side position-fixed follower roller 26 that has set in the air space 33 upstream of the screw shaft 21B enters between the helical vanes 21a and 21b of the downstream screw shaft 21B. This brings the position-fixed follower roller 26 into a state of receiving the thrust force from the screw shaft 21B. Shortly after this time, the cam follower rollers 42a and 42b reach the terminal ends of the cam rails 44a and 44b. At this time, between the helical vanes 21a and 21b of the screw shaft 21B and the movable follower roller 25 at the active position, a great frictional force acts, and thus, by means only by the urging force of the compressed coil spring 41, it may be not possible to reliably elevate and restore the cam follower rollers 42a and 42b so as to set back the movable follower roller 25 to the non-active position. However, as indicated by virtual lines in FIG. 10, the cam follower rollers 42a and 42b that have reached the terminal ends of the cam rails 44a and 44b are then forcibly pushed up by the forcibly restoring cam rails 45a and 45b. Thus, the movable follower roller 25 is reliably separated above from the helical vanes 21a and 21b of the screw shaft 21B, and thereafter, by the urging force of the compressed coil spring 41, the movable follower roller 25 is elevated and restored to the original non-active position, and then, held in that state. After the movable follower roller 25 is separated from the screw shaft 21B, the screw shaft 21B is to ongoingly travel and drive at high speed the conveyance carriage 22 via the rear-side position-fixed follower roller 26.

When the position-fixed follower roller 26 of the conveyance carriage 22 moves in between the helical vanes 21a and 21b within the next low-speed driving region A3 from between the helical vanes 21a and 21b within the high-speed driving region A2 of the screw shaft 21B, the traveling speed of the conveyance carriage 22 is switched from the high speed equivalent to the forwarding pitch P2 of the screw shaft 21B in the high-speed driving region A2 to the low speed equivalent to the forwarding pitch P1 of the screw shaft 21B in the low-speed driving region A3. At this time also, the movable follower roller 25 is not functioning as it is placed at the non-active position. Thus, the speed switching of the conveyance carriage 22 is performed without obstruction. Thereafter, the position-fixed follower roller 26 of the conveyance carriage 22 is to enter the transferring region B2 included within the low-speed driving region A3 while keeping at the low speed equivalent to the forwarding pitch P1. Similar to the action in the transferring region B1, before the position-fixed follower roller 26 is pulled off from the screw shaft 21B, the front-side movable follower roller 25 that is switched from the non-active position to the active position by the first switching means 43 within the air space 33 is to enter between the helical vanes 21a and 21b of the screw shaft 21C downstream of the air space 33 so as to receive the thrust force. Then, the position-fixed follower roller 26 moves beyond the air space 33 and enters between the helical vanes 21a and 21b of the downstream screw shaft 21C so as to receive the thrust force. Thereafter, the movable follower roller 25 is set back to the original non-active position from the active position by the first switching means 43, and following this, the screw shaft 21C is to travel the conveyance carriage 22 at low speed via only the position-fixed follower roller 26.

Thus, the conveyance carriage 22 sequentially undergoes the low-speed driving region A1, the high-speed driving region A2, and the low-speed driving region A3, and is to continuously travel while being automatically switched to the low speed or the high speed equivalent to the forwarding pitch P1 or P2 in the respective regions. At this time, in order that in the respective transferring regions B1, B2 . . . , the front-side movable follower roller 25 that is switched from the non-active position to the active position by the first switching means 43 within the respective air spaces 33 can enter between the helical vanes 21a and 21b of the screw shafts 21B, 21C . . . downstream of the respective air spaces 33 without obstruction, and also in order that the position-fixed follower roller 26 can enter between the helical vanes 21a and 21*b* of the downstream screw shafts 21B, 21C ... from within the respective air spaces 33 without obstruction, the helical vanes 21*a* and 21*b* at the end of the (front and rear) two screw shafts 21A, 21B, 21C ... that are concentrically faced with one another in the respective transferring regions B1, B2 ... are not only the same in their forwarding pitches but also are exactly aligned in phase.

Figure 12:
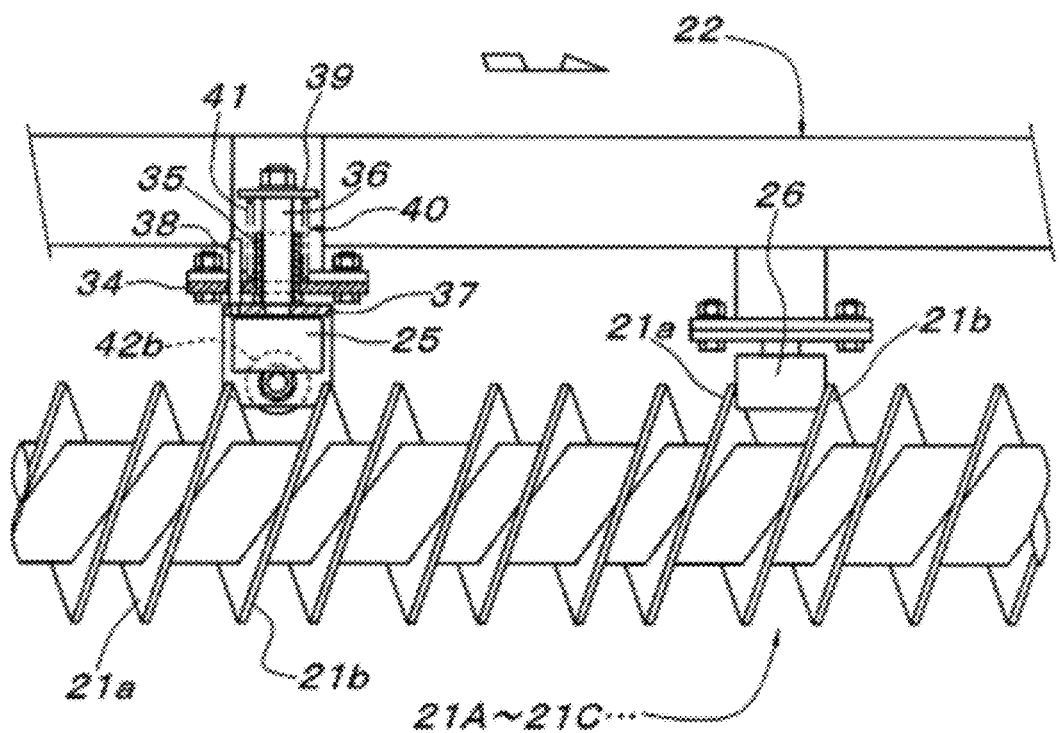
FIG. 12 is a partial longitudinal side view of relevant parts showing a modified example of the second embodiment.

In addition, when the traveling route of the conveyance carriage 22 is configured to be a rectangular endless circulating route by a turntable-equipped traverser for laterally forwarding the conveyance carriage 22 and inverting the back-and-forth orientation thereof between a going route and a returning route provided respectively with the screw shafts 21A, 21B, 21C ... and the auxiliary screw shafts 26A, 26B ... and between the terminal end and the start end of the both routes, the traveling direction of the conveyance carriage 22 can be rendered constant by rotation-driving the respective screw shafts 21A, 21B, 21C ... in a constant direction. When the conveyance carriage 22 is reciprocated on a single straight route, the screw shafts 21A, 21B, 21C ... may be reversely rotated. In the embodiment in FIG. 6 and FIG. 7, also when the screw shafts 21A, 21B, 21C ... are counter-rotated so as to travel the conveyance carriage 22 backward, if the conveyance carriage 22 travels and passes through the respective transferring regions B1 and B2, before the position-fixed follower roller 26 (that is the front side) is pulled off from the screw shafts 21C and 21B, the movable follower roller 25 (that is the rear side) is switched from the non-active position to the active position by the first switching means 43 so as to receive the thrust force, and the position-fixed follower roller 26 (that is the front side) passes through the air space 33 so as to enter between the helical vanes 21*a* and 21*b* of the downstream screw shafts 21B and 21A. Thereafter, the movable follower roller 25 (that is the rear side) can be restored from the active position to the original non-active position by the first switching means 43. Thus, similar to the case of traveling forward as described above, the conveyance carriage 22 can be continuously traveled at a predetermined speed set for each region, irrespective of the presence of the respective air spaces 33 between the screw shafts. In other words, as shown in FIG. 12, it may also be configured so that the front-side follower roller is the position-fixed follower roller 26 and the rear-side follower roller is the movable follower roller 25 by reversing the placement of the pair of front and rear follower rollers 25 and 26 arranged in the conveyance carriage 22.

Moreover, it is configured so the movable follower roller 26 switched from the non-active position to the active position by the first switching means 43 within the air space 33 enters between the helical vanes 21*a* and 21*b* of the screw shafts 21A, 21B, 21C ... downstream of the air space 33. However, the following configuration is also possible: only before the position-fixed follower roller 25 is pulled off from the screw shafts 21A, 21B, 21C ... to within the air space 33, if the movable follower roller 26 is placed at a position facing between the helical vanes 21*a* and 21*b* of the screw shafts 21A, 21B, 21C ... downstream of the air space 33, the movable follower roller 26 is switched from the non-active position to the active position by the first switching means 43 so that the movable follower roller 26 is directly fitted between the helical vanes 21*a* and 21*b* of the screw shafts 21A, 21B, 21C ... downstream of the air space 33.

Moreover, the conveyance carriage driving device utilizing the screw shaft in the foregoing second invention cannot only be utilized as means for driving and propelling the conveyance carriage of a carriage type conveyor traveling on the guide rails laid on the floor surface but also be utilized as means for driving and propelling the conveyance carriage of an overhead conveyor traveling and being supported on a guide rail bridged at an appropriate height above the floor surface. Also, the position of the screw shaft relative to these types of conveyance carriages is not limited to a lower side of the conveyance carriage, and can be arbitrarily set at a lateral side and on an upper side, for example, of the conveyance carriage, according to a support structure of the conveyance carriage, a loading structure of a load, or a similar structure. Further, also the position-fixed follower roller and the movable follower roller can be supported pivotally so that their shaft centers are not orientated toward the (up and down) vertical direction but toward the (right and left) horizontal direction.

Third Embodiment

Figure 13:
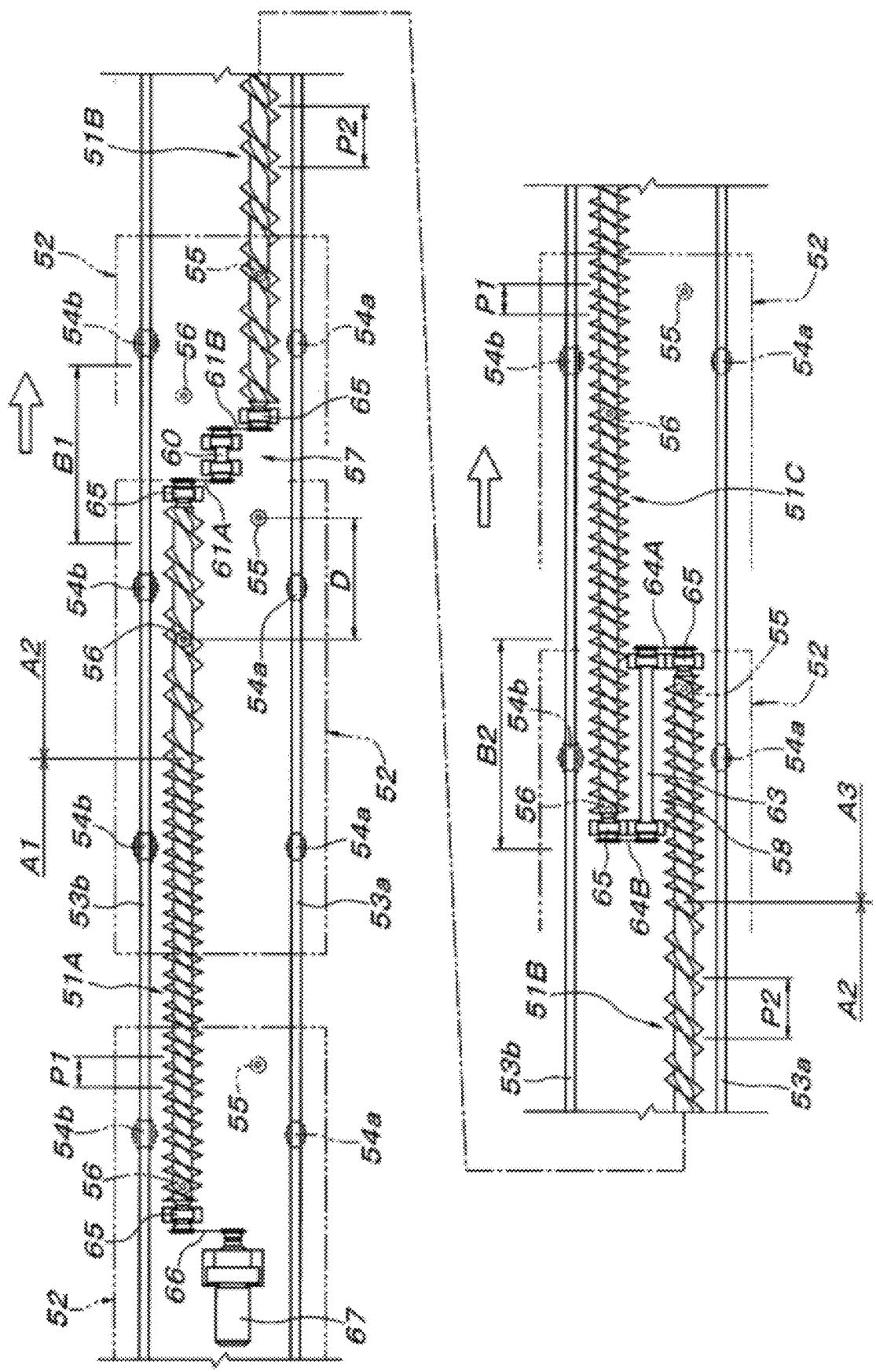
FIG. 13 is a schematic plain view of relevant parts, showing a third embodiment according to the third invention.
Figure 14:
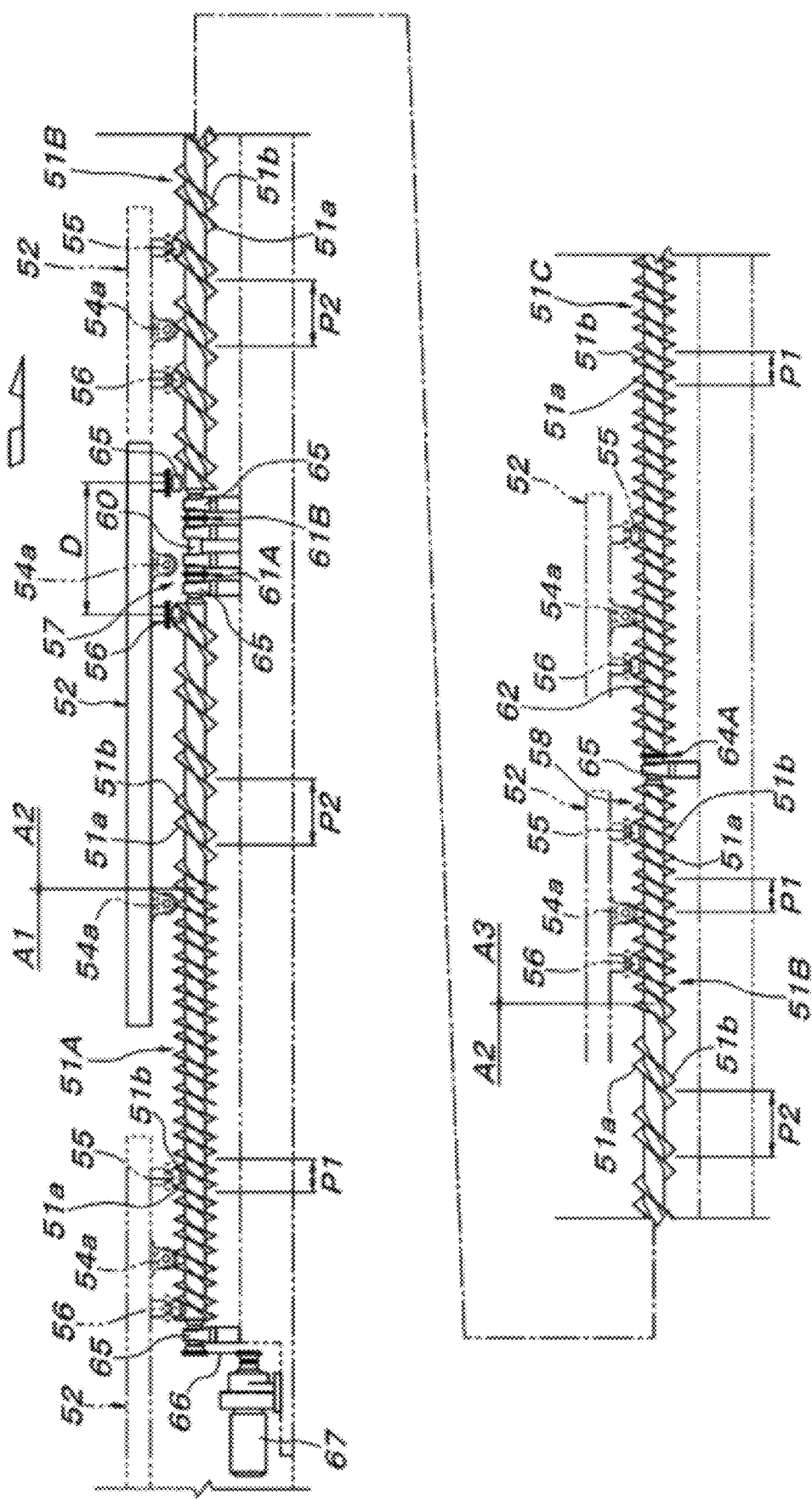
FIG. 14 is a schematic side view of the relevant parts.

In FIG. 13 and FIG. 14, a conveyance carriage 52 driven and propelled by screw shafts 51A, 51B, 51C ... is provided with a pair of front and rear flangeless wheels 54*a* rolling on one guide rail 53*a*, out of a pair of right and left guide rails 53*a* and 53*b*; a pair of front and rear flanged wheels 54*b* rolling on the other guide rail 53*b* and sandwiching the guide rail 53*b* from both right and left sides. The respective screw shafts 51A, 51B, 51C ... are placed parallel to the traveling route (guide rails 53*a* and 53*b*) of the conveyance carriage 52 by alternately (to right or left) changing its position relative to a center line between the both guide rails 53*a* and 53*b* so that these screw shafts 51A, 51B, 51C ... are arrayed concentrically in series for every other screw shaft. Therefore, although the screw shafts 51D, 51E, 51F ... following the screw shaft 51C are not illustrated, the screw shafts 51A, 51C, 51E ... (for every other screw shaft) on one side and the screw shafts 51B, 51D, 51F ... (for every other screw shaft) on the opposite side are arranged concentrically in series, respectively. On the other hand, at the bottom of the conveyance carriage 52, there are arranged: a follower roller 55 capable of revolution about the vertical support shaft at a position freely fitted between the helical vanes of the respective screw shafts 51A, 51C ... of the screw shaft line on one side; and a follower roller 56 capable of revolution about the vertical support shaft at a position freely fitted between the helical vanes of the respective screw shafts 51B ... of the screw shaft line on the opposite side.

Figure 15:
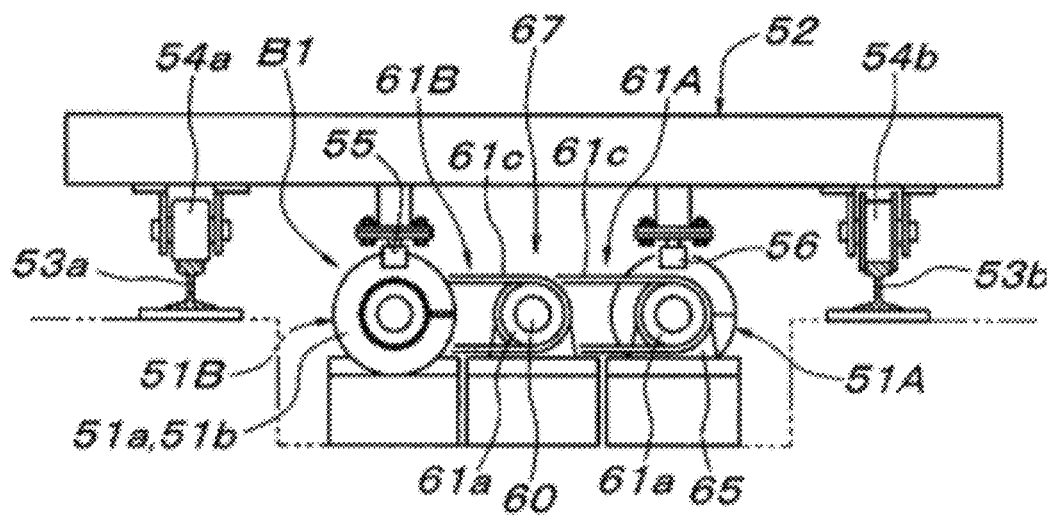
FIG. 15 is a longitudinal front view showing a first transferring region of the third embodiment.
Figure 16:
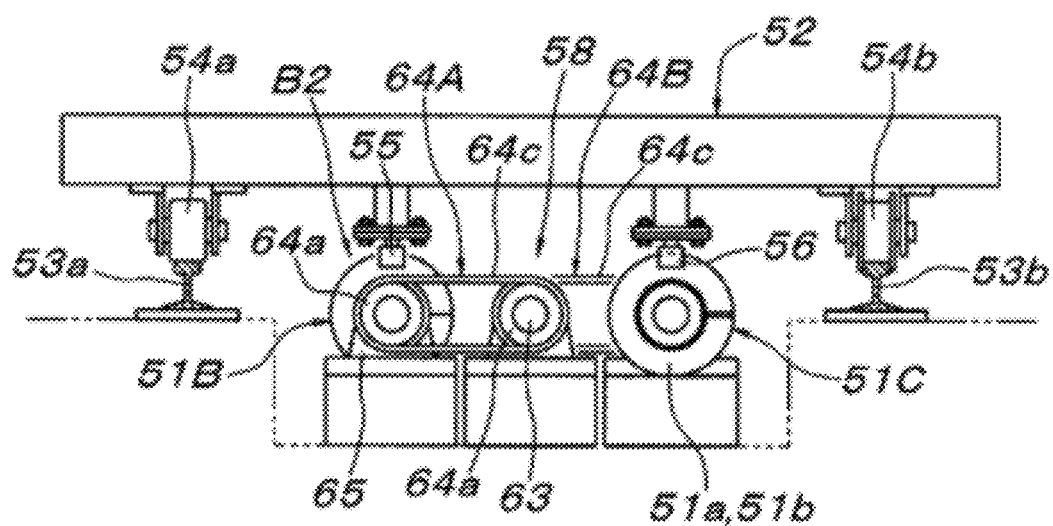
FIG. 16 is a longitudinal front view showing a second transferring region of the third embodiment.
Figure 17:
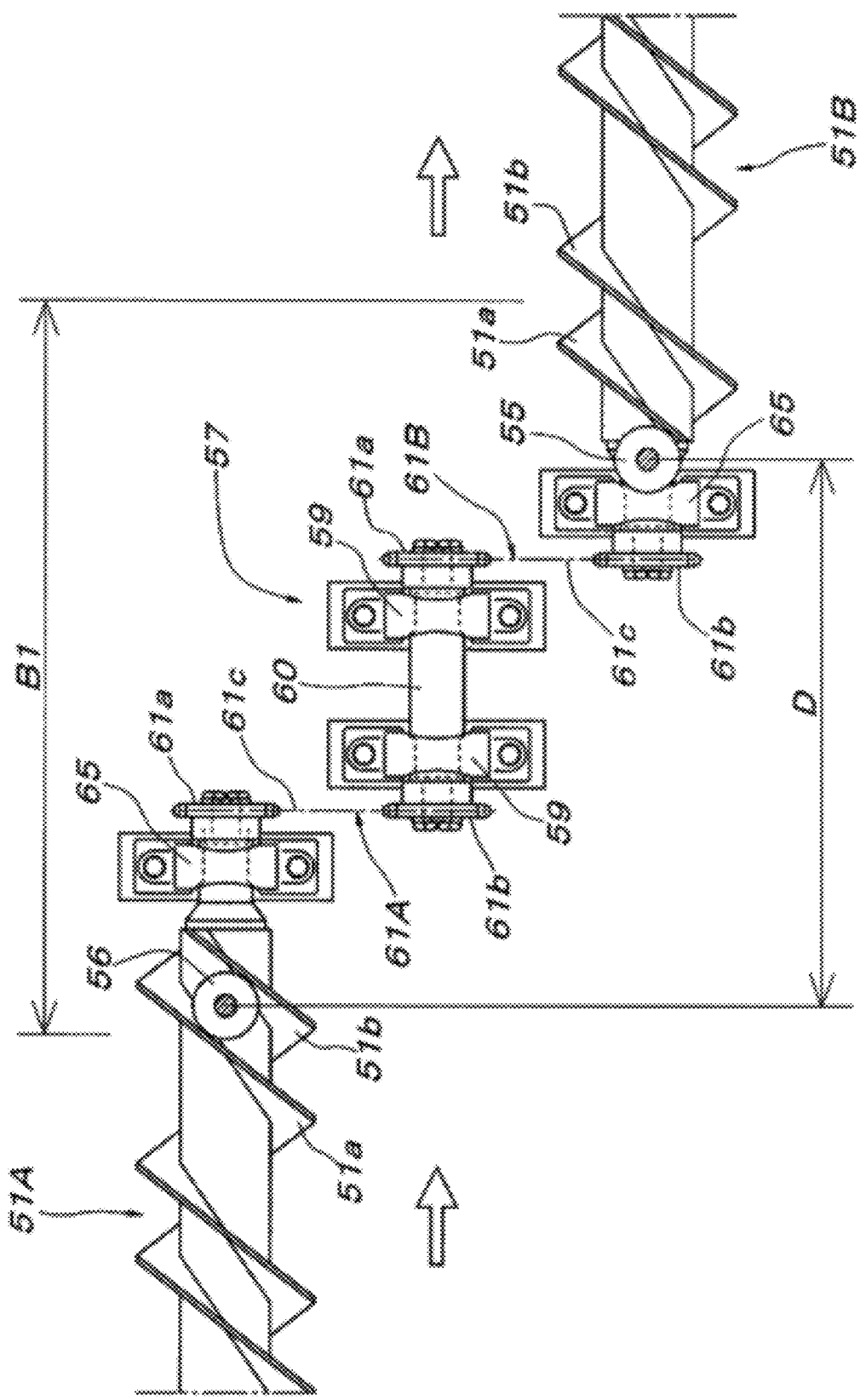
FIG. 17 is a plain view showing the first transferring region of the third embodiment.

Between the two screw shafts adjacent before and after and different in line, i.e., between the screw shafts 51A and 51B, between the screw shafts 51B and 51C, between the screw shafts 51C and 51D (not shown) following these screw shafts, between the screw shafts 51D and 51E ... , two types of transferring regions B1 and B2 different in configuration are alternately arranged. In the first transferring region B1 on one side, as shown in FIG. 15 and FIG. 17, in order that ends of the two screw shafts, e.g., the screw shafts 51A and 51B, are positioned with a spacing in the axial direction of the screw shaft, the both screw shafts 51A and 51B are placed, and also the ends of the both screw shafts 51A and 51B are operably coupled to each other by interlocking means 57. In the second transferring region B2 on the other side, as shown in FIG. 16 and FIG. 18, in order that ends of the two screw shafts, e.g., the screw shafts 51B and 51C, are overlapped on top of each other in the (right and left) lateral direction (juxtaposing direction of the both screw shafts 51B and 51C), the both screw shafts 51B and 51C are placed, and also the ends of the both screw shafts 51B and 51C are operably coupled to each other by interlocking means 58.

The interlocking means 57 in the first transferring region B1 is configured by: a relay shaft 60 supported by a bearing 59 parallel to the screw shafts 51A and 51B at the intermediate position (on the center line) in the juxtaposing direction of the two screw shafts, e.g., the screw shafts 51A and 51B, the relay shaft 60 being shorter in length than a spatial length between the ends in the axial direction of the screw shaft of the both screw shafts 51A and 51B; and two transmission means 61A and 61B, each comprised of toothed gears 61*a* and 61*b* and a chain 61*c*, for operably coupling to each other the both ends of the relay shaft 60 and the ends of the both screw shafts 51A and 51B positioned immediately lateral to the relay shaft 60. The interlocking means 58 in the second transferring region B2 is configured by: a relay shaft 63 supported by a bearing 62 parallel to the screw shafts 51B and 51C at the intermediate position (on the center line) in the juxtaposing direction of the two screw shafts, e.g., the screw shafts 51B and 51C, the relay shaft 63 having the substantially the same length as an overlapping length of the ends in the both screw shafts 51B and 51C; two transmission means 64A and 64B, each comprised of toothed gears 64*a* and 64*b* and a chain 64*c*, for operably coupling to each other the both ends of the relay shaft 63 and the ends of the both screw shafts 51B and 51C positioned immediately lateral to the relay shaft 63. As a matter of course, the transmission means 61A, 61B, 64A, and 64B can be chosen from that which utilizes a gear. In addition, reference numeral 65 denotes a bearing of the both ends of the respective screw shafts 51A, 51B, 51C . . . .

As shown in FIG. 13 and FIG. 14, the screw shaft 51A positioned at one end of the traveling route of the conveyance carriage 52 is operably coupled with a reducer-equipped motor 67 via the transmission means 66 that utilizes a chain (or gear). As a matter of course, it may also be configured so that the reducer-equipped motor is operably coupled to one component selected from the screw shafts 51B, 51C . . . at the intermediate appropriate position of the traveling route of the conveyance carriage 52 and the relay shafts 60 and 63 provided in the transferring regions B1 and B2.

Figure 18:
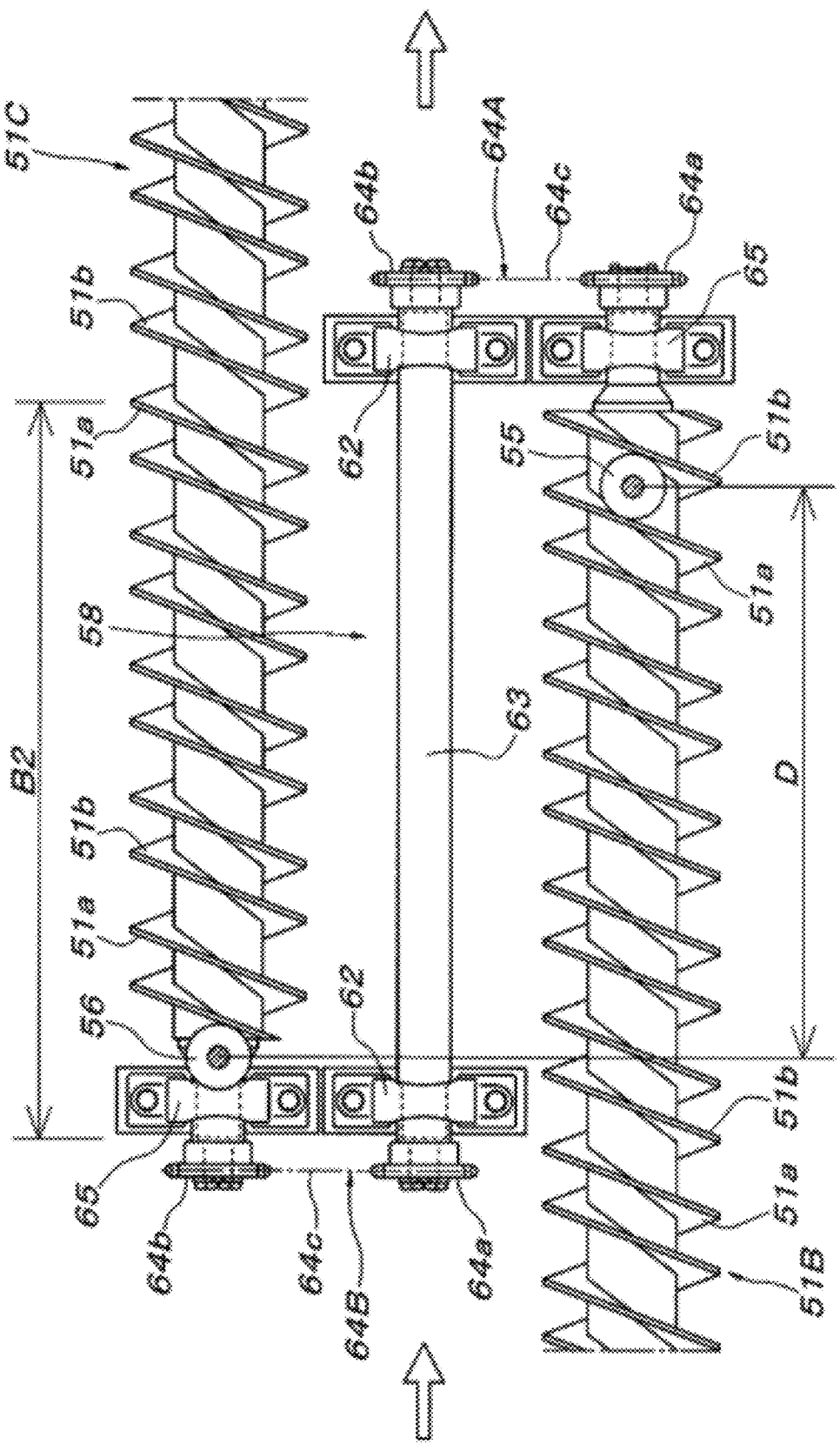
FIG. 18 is a plain view showing the second transferring region of the third embodiment.

The two follower rollers 55 and 56 on the conveyance carriage 52 side are spaced apart by a predetermined distance in the axial direction of the screw shaft, as shown in FIG. 17 and FIG. 18. An interval D in the axial direction of the screw shaft between the both follower rollers 55 and 56 is set to be longer than a separation distance in the axial direction of the screw shaft between the ends of the two screw shafts adjacent before and after and different in line in the first transferring region B1, e.g., the screw shafts 51A and 51B, but set to be shorter than an overlapping length in the axial direction of the screw shaft of the ends of the two screw shafts adjacent before and after and different in line in the second transferring region B2, e.g., the screw shafts 51B and 51C.

The screw shafts 51A, 51B, 51C . . . are provided with helical vanes 51*a* and 51*b* of a double-blade system in which the follower rollers 55 and 56 are sandwiched from the both sides in the axial direction of the screw shaft, and the forwarding pitches, however, are not constant. In the illustrated embodiment, as shown in FIG. 13 and FIG. 14, a low-speed driving region A1 from the free end to the intermediate position of the screw shaft 51A, a high-speed driving region A2 from the low-speed driving region A1 to the intermediate position of the next screw shaft 51B, and a low-speed driving region A3 following the high-speed driving region A2 are provided. The high-speed driving region A2 includes the first transferring region B1, and the next low-speed driving region A3 includes the second transferring region B1.

A forwarding pitch P1 of the helical vanes 51*a* and 51*b* of a portion included in the low-speed driving regions A1 and A3 of the screw shafts 51A, 51B, 51C . . . is smaller than a forwarding pitch P2 of the helical vanes 51*a* and 51*b* of a portion included in the high-speed driving region A2. Both the forwarding pitches P1 and P2 are an integer fraction of the interval D in the axial direction of the screw shaft between the both front and rear follower rollers 55 and 56. In the illustrated example, the forwarding pitch P1 is ¼ the interval D, and the forwarding pitch P2 is ½ the interval D.

According to the above-described configuration, when the reducer-equipped motor 67 is run to rotation-drive all the screw shafts 51A, 51B, 51C . . . at constant speed in the same direction, e.g., a direction in which the conveyance carriage 52 is propelled in a forward direction indicated by arrows in FIG. 13 and FIG. 14, via the interlocking means 57 and 58 provided in the respective transferring regions B1 and B2, the conveyance carriage 52 which has been waiting at the start end position of the traveling route on the screw shaft 51A side in a state where the rear-side follower roller 56 is fitted between the helical vanes 51*a* and 51*b* of the screw shaft 51A within the low-speed driving region A1 starts traveling forward at low speed equivalent to the forwarding pitch P1 of the screw shaft 51A within the low-speed driving region A1. When the traveling of the conveyance carriage 52 allows the rear-side follower roller 56 to move in from between the helical vanes 51*a* and 51*b* in the low-speed driving region A1 of the screw shaft 51A to between the helical vanes 51*a* and 51*b* in the next high-speed driving region A2, the traveling speed of the conveyance carriage 52 is switched to high speed equivalent to the forwarding pitch P2 of the screw shaft 51A in the high-speed driving region A2. At this time, the front-side follower roller 55 is in a free state, i.e., not fitted to any screw shafts, and thus, the speed switching of the conveyance carriage 52 is performed without obstruction.

As a result, the conveyance carriage 52 traveling at high speed within the high-speed driving region A2 enters the first transferring region B1 included within the high-speed driving region A2 while keeping the high speed equivalent to the forwarding pitch P2. However, slightly before the rear-side follower roller 56 leaves the upstream screw shaft 51A within this transferring region B1, as shown in FIG. 17, the front-side follower roller 55 is to enter between the helical vanes 51*a* and 51*b* of the downstream screw shaft 51B. Therefore, the conveyance carriage 52 is automatically switched from a state to receive the thrust force from the screw shaft 51A via the rear-side follower roller 56 to a state to receive the thrust force from the screw shaft 51B via the front-side follower roller 55. Thereby, the conveyance carriage 52 can continue traveling at high speed without interrupting the traveling, and to pass through the first transferring region B1 to the downstream side.

When the conveyance carriage 52 traveling at high speed within the high-speed driving region A2 in a state to receive the thrust force from the screw shaft 51B via the front-side follower roller 55 reaches a position bordering the next low-speed driving region A3, the front-side follower roller 55 moves in from between the helical vanes 51*a* and 51*b* in the high-speed driving region A2 of the screw shaft 51B to between the helical vanes 51*a* and 51*b* of the next low-speed driving region A3, and the traveling speed of the conveyance carriage 52 is switched to the low speed equivalent to the forwarding pitch P1 of the screw shaft 51B in the low-speed driving region A3. At this time, the rear-side follower roller 56 is in a free state, i.e., not fitted to any screw shafts, and thus, the speed switching of the conveyance carriage 52 is performed without obstruction.

Thereafter, the front-side follower roller 55 of the conveyance carriage 52 enters the second transferring region B2 included within the low-speed driving region A3 and travels within the second transferring region B2 while keeping the low speed equivalent to the forwarding pitch P1. However, similar to the action in the first transferring region B1, before the front-side follower roller 55 is pulled off from the screw shaft 51B, the rear-side follower roller 56 is to enter between the helical vanes 51a and 51b of the downstream screw shaft 51C so as to receive the thrust force. In this state, the front-side follower roller 55 is pulled off from the screw shaft 51B into a free state, and by the thrust force received from the screw shaft 51C via the rear-side follower roller 56, the conveyance carriage 52 is to continue the low-speed traveling equivalent to the forwarding pitch P1 set to the screw shaft 51C within the low-speed driving region A3.

Thus, the conveyance carriage 52 sequentially undergoes the low-speed driving region A1, the high-speed driving region A2, and the low-speed driving region A3, and is to continuously travel while being automatically switched to the low speed or the high speed equivalent to the forwarding pitch P1 or P2 in the respective regions. In order that in the respective first and second transferring regions B1 and B2, the follower roller 55 or 56 that has been in a free state can enter between the helical vanes 51a and 51b of the downstream screw shafts 51B, 51C . . . , without obstruction, the helical vanes 51a and 51b at the ends of the two screw shafts 51A, 51B and 51B, 51C . . . adjacent before and after and different in line in the first transferring region B1 or the second transferring region B2 are not only the same in their forwarding pitches but also are exactly aligned in phase.

In addition, when the traveling route of the conveyance carriage 52 is configured to be a rectangular endless circulating route by a turntable-equipped traverser for laterally forwarding the conveyance carriage 52 and inverting the back-and-forth orientation thereof between a going route and a returning route provided respectively with the screw shafts 51A, 51B, 51C . . . in this order, and between the terminal ends and the start ends of the both routes, the traveling direction of the conveyance carriage 52 can be rendered constant by rotation-driving the respective screw shafts 51A, 51B, 51C . . . in a constant direction. When the conveyance carriage 52 is reciprocated on a single straight route, the screw shafts 51A, 51B, 51C . . . may be reversely rotated. In the embodiment in FIG. 13 and FIG. 14, when the screw shafts 51A, 51B, 51C . . . are counter-rotated so as to travel the conveyance carriage 52 backward, when the conveyance carriage 52 travels and passes through the respective first and second transferring regions B1 and B2, before the follower roller 56 (that is the front side) is pulled off from the screw shafts 51C and 51B, the follower roller 55 (that is the rear side) can be entered between the helical vanes 51a and 51b of the downstream screw shafts 51B and 51A. Thus, similar to the case of traveling forward as described above, the conveyance carriage 52 can be continuously traveled at a predetermined speed set to the respective regions, irrespective of the presence of the respective first and second transferring regions B1 and B2.

Figure 19:
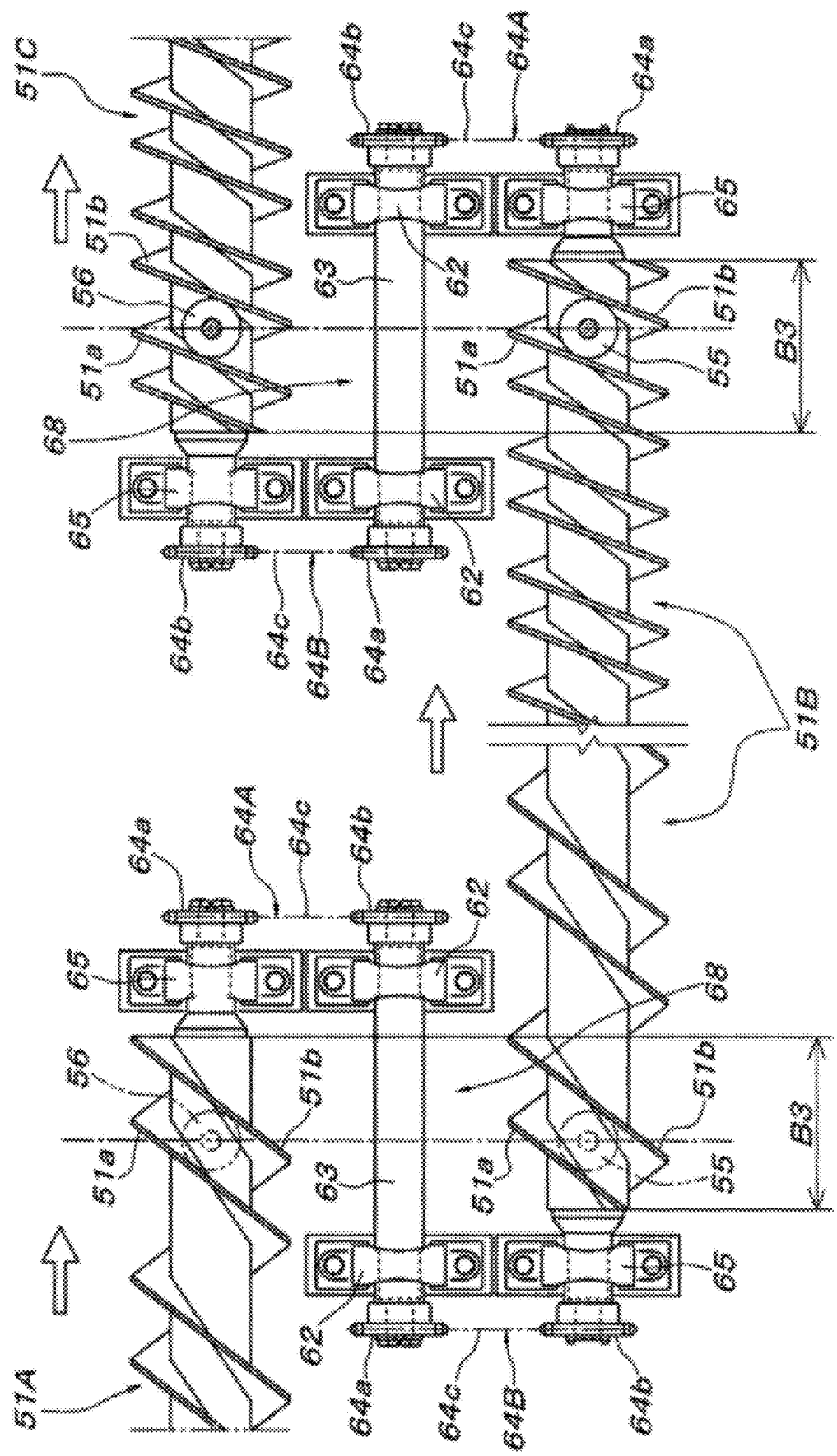
FIG. 19 is a partially cutaway plain view showing a modified example of the third embodiment.

In the embodiment, the two types of transferring regions B1 and B2 are combined to configure the traveling route of the conveyance carriage 52. However, one type of transferring region B3 shown in FIG. 19 may also be used to configure the traveling route of the conveyance carriage 52. In the transferring region B3 shown in FIG. 19, the ends of the upstream screw shafts 51A and 51B and the ends of the downstream screw shafts 51B and 51C are juxtaposed so that these ends are overlapped in the (right and left) lateral direction over a certain length, and also the ends of the both screw shafts are operably coupled to each other by interlocking means 68 (the relay shaft 63 is short) that is the same as the interlocking means 58 used in the second transferring region B2. In the embodiment, the two follower rollers 55 and 56 arranged in the conveyance carriage 52 are not deviated in position in the axial direction of the screw shaft, but placed in juxtaposition at a position symmetric (in terms of right and left directions) relative to the center line (the shaft center of the relay shaft 68).

Also in the transferring region B3 of the configuration, immediately before the follower roller 56 or 55 that is fitted to the upstream screw shaft 51A or 51B so as to propel the conveyance carriage 52 is pulled off from the screw shaft 51A or 51B, the follower roller 55 or 56 that has been in a free state is fitted to the downstream screw shaft 51B or 51C so as to propel the conveyance carriage 52. Immediately after that, the follower roller 56 or 55 is pulled off from the upstream screw shaft 51A or 51B into a free state. Therefore, the conveyance carriage 52 can continuously travel at a predetermined speed by receiving the thrust force via the follower roller 55 or 56 from the respective screw shafts 51A, 51B, 51C . . . while passing through the respective transferring regions B3 without any problem.

In addition, the conveyance carriage driving device utilizing the screw shaft in the third invention cannot only be utilized as means for driving and propelling the conveyance carriage of a carriage type conveyor traveling on the guide rails laid on the floor surface but also be utilized as means for driving and propelling the conveyance carriage of an overhead conveyor traveling and being supported on a guide rail bridged at an appropriate height above the floor surface. Further, the position of the screw shaft relative to these types of conveyance carriages is not limited to a lower side of the conveyance carriage, and can be arbitrarily set at a lateral side and on an upper side, for example, of the conveyance carriage, according to a support structure of the conveyance carriage, a loading structure of a load, or a similar structure. Therefore, the juxtaposing direction of the screw shafts arrayed in a zigzag manner in the conveyance carriage traveling direction can be configured not only in the (right and left) horizontal direction but also in the (up and down) vertical direction. Also, the two follower rollers can be supported pivotally so that its shaft center is not orientated toward the (up and down) vertical direction but toward the (right and left) horizontal direction.

Fourth Embodiment

Figure 20:
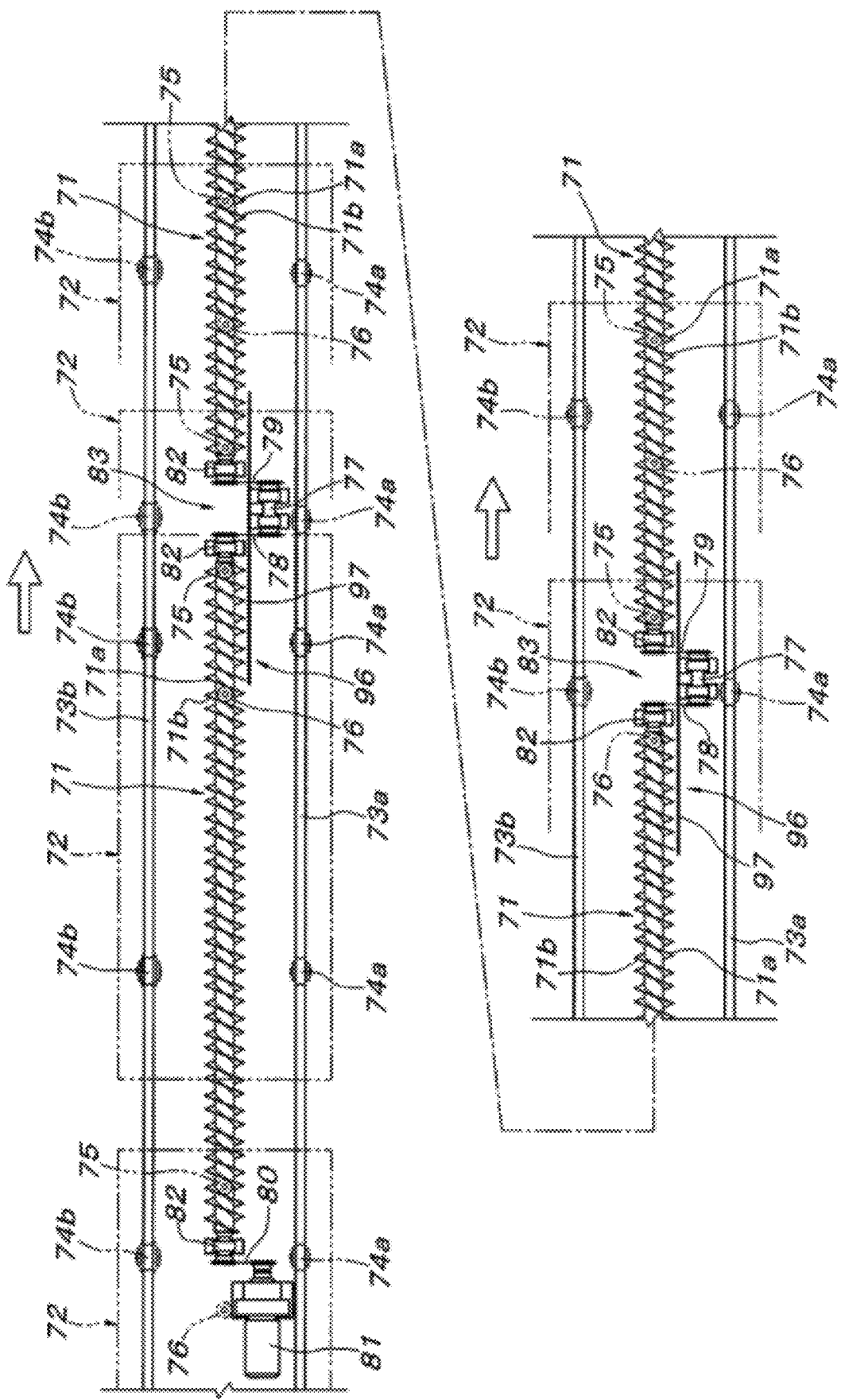
FIG. 20 is a schematic plain view of relevant parts, showing a fourth embodiment according to the fourth invention.
Figure 21:
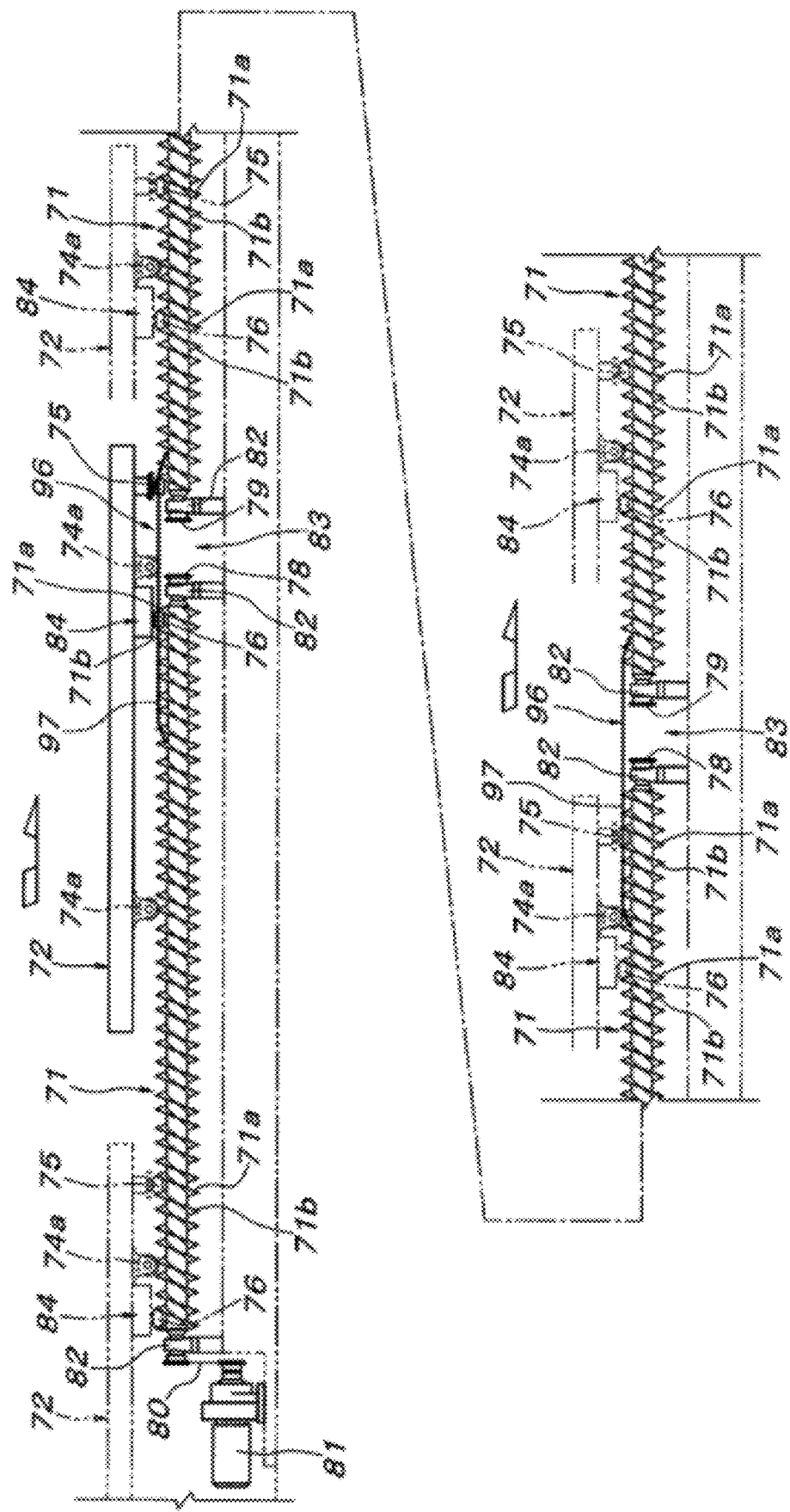
FIG. 21 is a schematic side view of the relevant parts.

FIG. 20 and FIG. 21 are views showing a part of a conveyance system configured by utilizing screw shafts for driving a conveyance carriage 71. A conveyance carriage 72 driven and propelled by the screw shafts 71 is provided with: a pair of front and rear flangeless wheels 74a rolling on one guide rail 73a, out of a pair of right and left guide rails 73a and 73b; and a pair of front and rear flanged wheels 74b rolling on the other guide rail 73b and sandwiching the guide rail 73b from both right and left sides. A required number of screw shafts 71 are disposed concentrically in series parallel to the guide rails 73a and 73b at an intermediate position of the pair of right and left guide rails 73a and 73b. At the bottom of the conveyance carriage 72, there are arranged a pair of front and rear follower rollers 75 and 76 capable of revolution about a vertical support shaft at a position freely fitted between helical vanes of the screw shafts 71. The screw shafts 71 are provided with helical vanes 71a and 71b configured of a double-blade system which sandwiches the respective follower rollers 75 and 76 from the both sides in the axial direction of the screw shaft.

Ends concentrically adjacent to one another of the respective screw shafts 71 are operably coupled so as to operably rotate in the same direction at mutually constant speed via a relay shaft 77 supported at the lateral side of the ends and transmission means 78 and 79 that utilize a chain (or a gear), respectively, and also a reducer-equipped motor 81 is arranged which is for rotation-driving the screw shafts 71 positioned at one end of the traveling route of the conveyance carriage 72 in an arbitrary direction (positive or negative direction) via transmission means 80 utilizing a chain (or a gear). As a matter of course, it may be configured so that the screw shaft 71 at the intermediate appropriate position of the traveling route of the conveyance carriage 72 or the relay shaft 77 interlocked with the screw shaft 71 is driven by the reducer-equipped motor 77. Each reference numeral 82 denotes bearings for supporting the both ends of the screw shafts 71, and between the screw shafts 71, an air space 83 in which the bearing 82 and transmission means 78 and 79 are placed is secured.

Out of the pair of front and rear follower rollers 75 and 76, the follower roller 75 on a forward direction side indicated by an arrow is a position-fixed follower roller that is attached to a fixed position of the conveyance carriage 72, and the rear-side follower roller 76 is a movable follower roller configured to move freely within a certain range in the axial direction of the screw shafts 71. An interval between the both follower rollers 75 and 76 in a state where the movable follower roller 76 is brought closest to the position-fixed follower roller 75 is longer than the interval between the screw shafts 71, i.e., the length of the air space 83. Therefore, when the conveyance carriage 72 passes through the air space 83 between the screw shafts 71, there is no instance that both the pair of front and rear follower rollers 75 and 76 are pulled off from the screw shafts 71 on their both sides as a result of being positioned within the air space 83.

Figure 23:
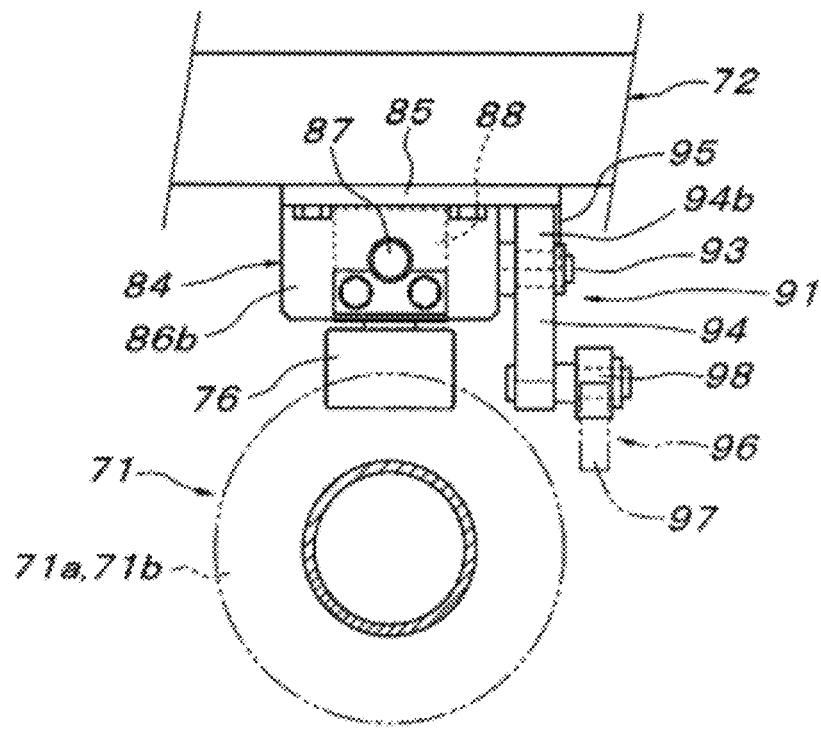
FIG. 23 is an enlarged left side view of FIG. 22A.
Figure 24:
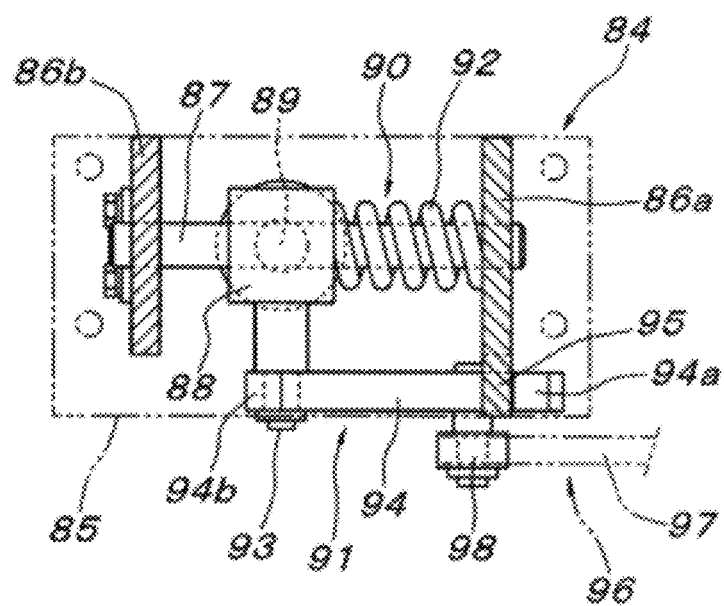
FIG. 24 is a horizontal plain view of a movable follower roller unit of the fourth embodiment.

Next, it will be described in detail below. As shown in FIG. 22 to FIG. 24, the bottom of the conveyance carriage 72 is attached with a movable follower roller unit 84. The movable follower roller unit 84 is provided with: an attaching plate 85 attached to the bottom of the conveyance carriage 72; a pair of front and rear bearing plates 86a and 86b attached to the attaching plate 85; one guide shaft 87 bridged parallel to the screw shafts 71 between the both bearing plates 86a and 86b; a movable body 88 that is slidably supported to this guide shaft 87 in its axial direction and is positioned adjacently to the attaching plate 85 so as to prevent the movable body 88 from rotating about the guide shaft 87; the movable follower roller 76 that is supported pivotally to permit revolution by a vertical support shaft 89 at the lower side of the movable body 88; and urging means 90 for urging the movable follower roller 76 in a direction to keep away from the position-fixed follower roller 75. In addition, second holding means 91 is provided. The urging means 90 is configured by a compressed coil spring 92, externally fitted to the guide shaft 87 between the movable body 88 and the bearing plate 86a, for urging the movable body 88 in a direction to keep away from the position-fixed follower roller 75.

The second holding means 91 is configured by: a lock member 94 of which the one end is pivotally supported vertically swingably on one side surface of the movable body 88 by a horizontal support shaft 93 that is oriented to a direction perpendicular to the screw shafts 71; a locked portion 95 releasably engaged with a hook portion 94a that is protrudingly arranged toward a lateral side from one lateral side of the bearing plate 86a and is arranged protrudingly upward from the distal end of the lock member 94. The lock member 94 is provided with a stopper 94b protrudingly arranged upward from the pivot-side end. When the lock member 94 that is urged and turned downward by gravity is in a non-positioned state, i.e., its hook portion 94a is pulled off downward from the locked portion 95, the stopper 94b comes into contact with the bottom surface of the attaching plate 85, and then, the lock member 94 is held in a non-positioned state.

As shown in FIG. 20, FIG. 21, and FIG. 25 to FIG. 27, aside of the air space 83 between the screw shafts 71, second switching means 96 is provided. The second switching means 96 is provided with a cam rail 97 laid parallel to the screw shafts 71 on the traveling route side of the conveyance carriage 72. A distal end lateral side of the lock member 94 is supported pivotally with a cam follower roller 98 that climbs over the cam rail 97 and rolls and passes therethrough. The second switching means 96 and the second holding means 91 provided in the movable follower roller 76 are configured so that the action described below is performed.

That is, the lock member 94 of the second holding means 91 is held in a non-positioned state that is swung to the swing limit downward by gravity, and the hook portion 94a of the lock member 94 is in a state of being pulled off downward from the locked portion 95. Thus, by the urging force received from the compressed coil spring 92 of the urging means 90, the movable follower roller 76 can move in a direction to keep away from the position-fixed follower roller 75. At this time, the urging force that the movable follower roller 76 receives from the compressed coil spring 92 is larger than a traveling resistance on the guide rails 73a and 73b of the conveyance carriage 72 on which a workpiece is mounted. Therefore, as shown in FIG. 22, the conveyance carriage 72 is pressed forward by a reaction force obtained when the movable follower roller 76 pressed backward by the urging force press-contacts the rear-side helical vane 71b of the screw shaft 71, and the position-fixed follower roller 75 is to press-contact the front-side helical vane 71a of the screw shafts 71. By the press-contact of this position-fixed follower roller 75 and the front-side helical vane 71a of the screw shaft 71, the position of the conveyance carriage 72 is determined, and the conveyance carriage 72 is in a state where there is no play (rattling) at all in the axial direction of the screw shafts 71. The position of the movable follower roller 76 at this time is an expected active position, and the lock member 94 is configured so that at this time, when the lock member 94 of the second holding means 91 moves upward against gravity, the hook portion 94a at its distal end is in a state positioned to be engaged with a slight gap immediately before the locked portion 95. When the reducer-equipped motor 81 is run in such a state to operably rotate all the screw shafts 71 operably coupled to each other via the transmission means 78 and 79 in the same direction at constant speed, the rotating screw shafts 71 can drive and propel forward the conveyance carriage 72 via the movable follower roller 76 backwardly press-contacted to the rear-side helical vane 71b.

Figure 25:
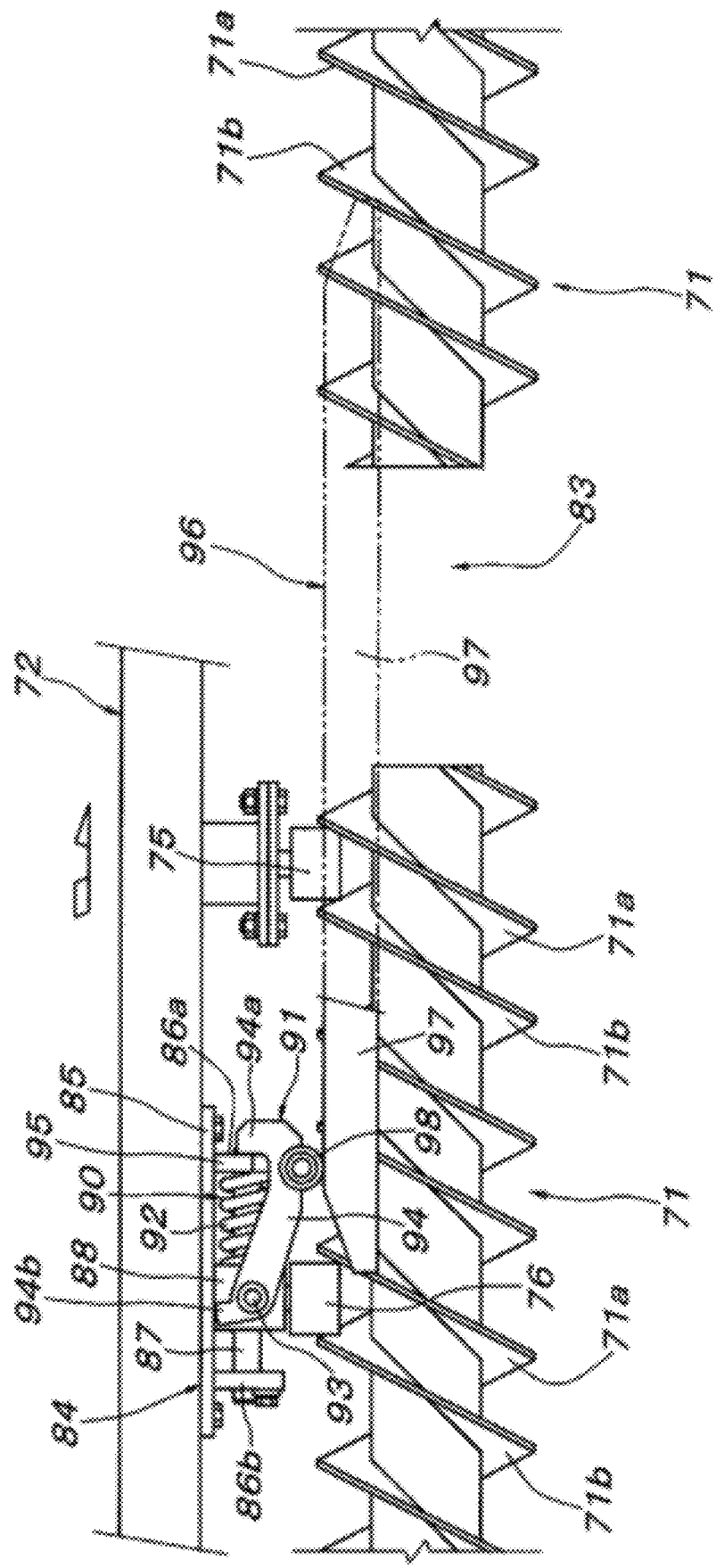
FIG. 25 is a partially cutaway side view of relevant parts showing a state immediately before passing through an air space between screw shafts of the fourth embodiment.

When the conveyance carriage 72 is traveled in a forward direction as a result of the rotation-driving of the screw shafts 71 to allow the front-side position-fixed follower roller 75 to reach immediately before the air apace 83 between the screw shafts 71, i.e., the terminal end position of the upstream screw shafts 71 of the air space 83, as shown in FIG. 25, along with the traveling of the conveyance carriage 72, the cam follower roller 98 of the second holding means 91 (lock member 94) provided to the rear-side movable follower roller 76 climbs over the cam rail 97 of the second switching means 96 provided to the air space 83, and the lock member 94 is pushed up from the non-positioned state against gravity. As a result, the lock member 94 is switched to a positioned state where the hook portion 94a is engaged with the locked portion 95. At this time, there is a slight gap between the hook portion 94a and the locked portion 95, and thus, the lock member 94 can be reliably switched, without interference, to the positioned state with the locked portion 95.

When the front-side position-fixed follower roller 75 is pulled off from the terminal end of the upstream screw shaft 71 of the air space 83 along with the traveling of the conveyance carriage 72, the restraint by the helical vane 71a of the screw shaft 71 on the position-fixed follower roller 75 is resolved. However, the lock member 94 of the second holding means 91 is switched to the positioned state as described above, and the backward movement of the movable follower roller 76 by the urging force of the urging means 90 (compressed coil spring 92) is prevented by contact between the hook portion 94a and the locked portion 95, and the movable follower roller 76 is held at the expected active position. Therefore, after the position-fixed follower roller 75 is pulled off from the terminal end of the upstream screw shaft 71 of the air space 83, the movable follower roller 76 in a position-fixed state relative to the conveyance carriage 72 is pushed backward by the rear-side helical vane 71b of the screw shaft 71, and thereby, the conveyance carriage 72 is to ongoingly continue traveling forward. In addition, when the position-fixed follower roller 75 is pulled off from the terminal end of the screw shaft 71, the conveyance carriage 72, in reality, is to move forward by the urging force of the urging means 90 by a slight gap between the locked portion 95 and the hook portion 94a of the lock member 94. In other words, even though there is a slight difference between the expected active position of the movable follower roller 76 when the both follower rollers 75 and 76 are fitted between the helical vanes 71a and 71b of the screw shaft 71 and the expected active position of the movable follower roller 76 when held by the lock member 94 of the second holding means 91, this difference is so slight that it is almost negligible.

Figure 26:
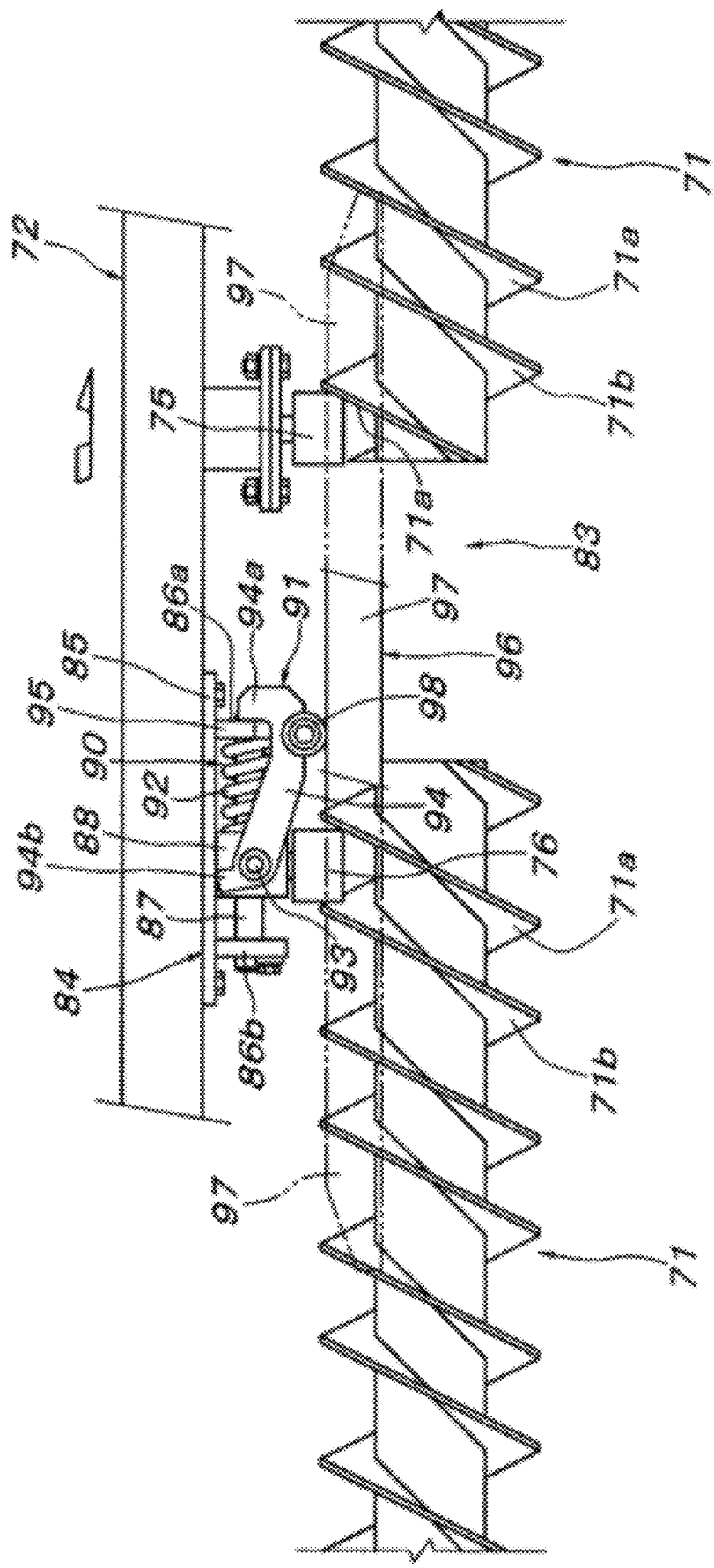
FIG. 26 is a partially cutaway side view of relevant parts showing a state in the middle of passing through the air space between the screw shafts of the fourth embodiment.

When the front-side position-fixed follower roller 75 that has moved within the air space 83 as a result of the conveyance carriage 72 further traveling forward reaches a position introduced between the helical vanes 71a and 71b of the downstream screw shaft 71 of the air space 83, as shown in FIG. 26, the rear-side movable follower roller 76 has reached near the terminal end of the screw shaft 71 upstream of the air space 83. Thereafter, the front-side position-fixed follower roller 75 is drawn by the helical vane 71b of the screw shaft 71 downstream of the air space 83, and also the rear-side movable follower roller 76 is pushed out to within the air space 83 by the helical vane 71b of the screw shaft 71 upstream of the air space 83. Following this, the front-side position-fixed follower roller 75 receives the thrust force in the forward direction by the helical vane 71b of the screw shaft 71 downstream of the air space 83, and thereby, the conveyance carriage 72 continues traveling forward.

Figure 27:
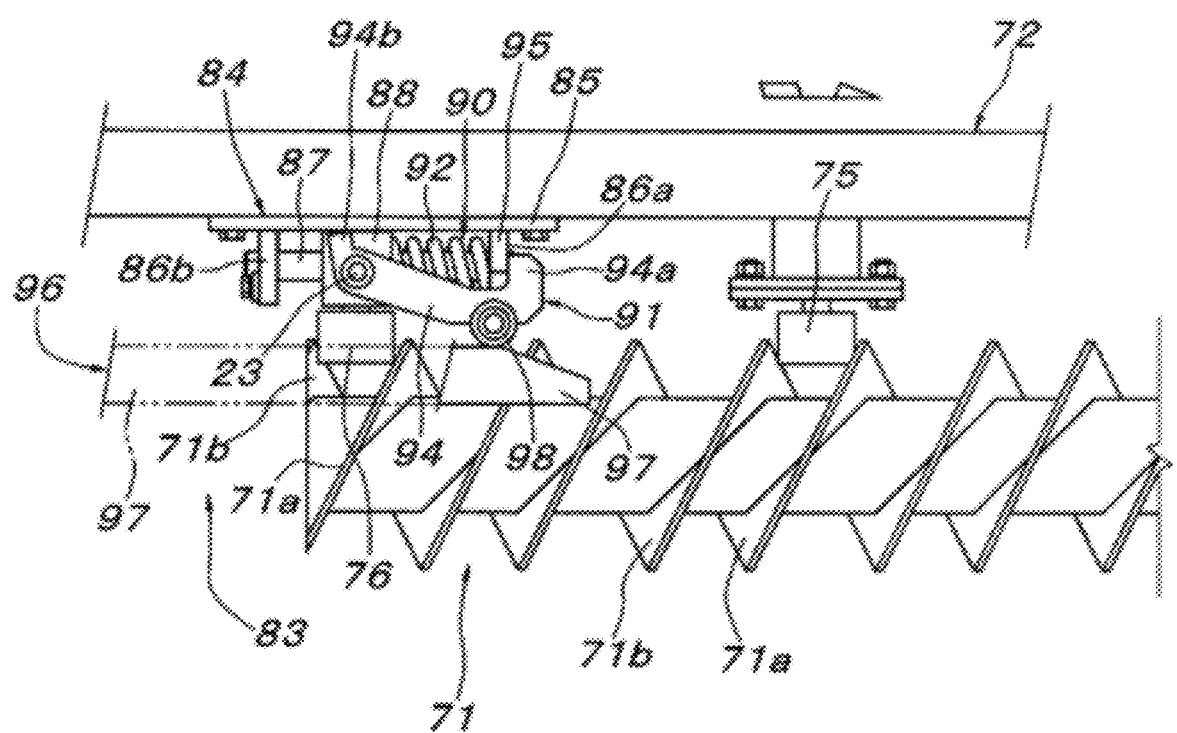
FIG. 27 is a partially cutaway side view of relevant parts showing a state immediately after passing through the air space between the screw shafts of the fourth embodiment.

As described above, the rear-side movable follower roller 76 that moves within the air space 83, together with the front-side position-fixed follower roller 75, is fitted between the helical vanes 71a and 71b of the screw shafts 71 by the lock member 94 that has been switched to the positioned state and the urging force of the urging means 90, and also is held at the expected active position that is substantially the same as the position when being press-contacted to the rear-side helical vane 71b by the urging force of the urging means 90. Therefore, when the conveyance carriage 72 further travels forward so that the rear-side movable follower roller 76 that has moved within the air space 83 reaches the position introduced between the helical vanes 71a and 71b of the downstream screw shaft 71 of the air space 83, as shown in FIG. 27, the movable follower roller 76 is smoothly and reliably introduced between the helical vanes 71a and 71b of the screw shaft 71 while being drawn forward by slightly resisting the urging force of the urging means 90 (compressed coil spring 92) by the rear-side helical vane 71b of the screw shaft 71.

As described above, when the both pair of front and rear follower rollers 75 and 76 are transferred between the helical vanes 71a and 71b of the screw shaft 1 downstream of the air space 83, the conveyance carriage 72 is brought into a state where it is again propelled by the screw shaft 71 as the expected action would dictate. In this state, the cam follower roller 98 on the lock member 94 side is pulled off from above the cam rail 97. At this time, there is a slight gap between the locked portion 95, and the hook portion 94a of the lock member 94 that is in the positioned state, and thus, the lock member 94 is reliably swung downward by gravity and restored to the original non-positioned state.

As understood from the above description, the conveyance carriage 72 is continuously propelled by the screw shafts 71 that are concentrically placed in series and are rotation-driven in the same direction at constant speed, and travels on the traveling route at a predetermined speed. At this time, the conveyance carriage 72 travels while receiving the thrust force from the rear-side movable follower roller 76 in a state of being positioned by the pair of front and rear follower rollers 75 and 76 fitted to the screw shafts 71. In this case, only while passing through the air space 83 between the screw shafts 71 from the upstream to the downstream, the conveyance carriage 72 is positioned only by the position-fixed follower roller 75 fitted to the screw shaft 71 upstream or downstream of the air space 83, or the movable follower roller 76 fitted to the screw shaft 71 upstream or downstream of the air space 83 in a state of being positioned at the expected active position, and also is traveled by receiving the thrust force.

In addition, when the traveling route of the conveyance carriage 2 is configured to be a rectangular endless circulating route by a turntable-equipped traverser for laterally forwarding the conveyance carriage 72 and inverting the back-and-forth orientation thereof between a going route and a returning route provided respectively with the screw shafts 71 and between the terminal ends and the start ends of the both routes, the traveling direction of the conveyance carriage 72 on the respective screw shafts 71 can be rendered constant. When the conveyance carriage 72 is reciprocated on a single straight route, the screw shafts 71 may be reversely rotated. In this case also, in consideration of the position of the both ends of the cam rail 97 of the second switching means 96, it may be configured so that while the pair of front and rear follower rollers 75 and 76 are transferred from the upstream to the downstream of the air space 83 between the screw shafts 71, the movable follower roller 76 is positioned at the expected active position by the second holding means 91. In other words, the before-and-after positional relationship between the position-fixed follower roller 75 and the movable follower roller 76 may be configured opposite to that in the embodiment.

Moreover, this type of screw driven conveyance device is capable of changing the traveling speed of the conveyance carriage 72 by changing the pitches, i.e., the forwarding pitches, of the helical vanes 71a and 71b of the screw shafts 71 while keeping the rotation speed of the screw shafts 71 constant. Therefore, there is a case where it is desired that the conveyance carriage driving route configured by a plurality of screw shafts 71 that are concentrically placed in series and are operably coupled to each other are divided in a plurality of regions different in forwarding pitch of the screw shafts 71 and the traveling speed of the conveyance carriage 72 is changed for each region. In such a case, the screw shafts 71 may be configured so that although the forwarding pitches differ, the interval between the pair of front and rear follower rollers 75 and 76 (interval when the movable follower roller 76 is at the expected active position) is substantially constant, and also the forwarding pitch is rendered identical before and after the air space 83 between the screw shafts 71. In this case, when the follower roller moves over the regions different in forwarding pitch on a single screw shaft 71, the interval between the pair of front and rear follower rollers 75 and 76 fluctuates temporarily. To solve this, it may be configured so that the fluctuation of the interval between the pair of front and rear follower rollers 75 and 76 is absorbed by the movement of the movable follower roller 76 in the axial direction of the screw shaft.

In addition, the configuration of the second holding means 91 for positioning the movable follower roller 76 at the expected active position, or the configuration of the second switching means 96 is not limited to that shown in the embodiment. Moreover, in the embodiment, the movable follower roller 76 is urged by the urging means 90 in a direction to keep away from the position-fixed follower roller 75. However, it may also be possible to configure so that the movable follower roller 76 is urged in a direction to come closer to the position-fixed follower roller 75. In this case, the pair of front and rear follower rollers 75 and 76 are to press-contact the helical vanes 71b and 71a positioned inside these follower rollers 75 and 76 by the urging force of the urging means. Further, it is configured so that the lock member 94 configuring the second holding means 91 is urged and held in a non-positioned state by gravity. However, it may also be configured so that the lock member 94 is urged and held in a non-positioned state by the urging force of a spring.

Further, the screw shaft in the screw driven conveyance device according to the fourth invention cannot only be utilized as means for driving and propelling the conveyance carriage of a carriage type conveyor traveling on the guide rails laid on the floor surface but also be utilized as means for driving and propelling the conveyance carriage of an overhead conveyor traveling and being supported on a guide rail bridged at an appropriate height above the floor surface. Moreover, the position of the screw shaft relative to these types of conveyance carriages is not limited to a lower side of the conveyance carriage, and can be arbitrarily set at a lateral side and on an upper side, for example, of the conveyance carriage, according to a support structure of the conveyance carriage, a loading structure of a load, or a similar structure. Further, also the position-fixed follower roller and the movable follower roller can be supported pivotally so that their shaft centers are not orientated toward the (up and down) vertical direction but toward the (right and left) horizontal direction. Therefore, in a case of an embodiment in which the lock member 94 is adopted as holding means, the moving direction of the lock member 94 cannot be the up and down direction but the horizontal direction, and a spring can be provided as urging means for the lock member 94.

Fifth Embodiment

Figure 28:
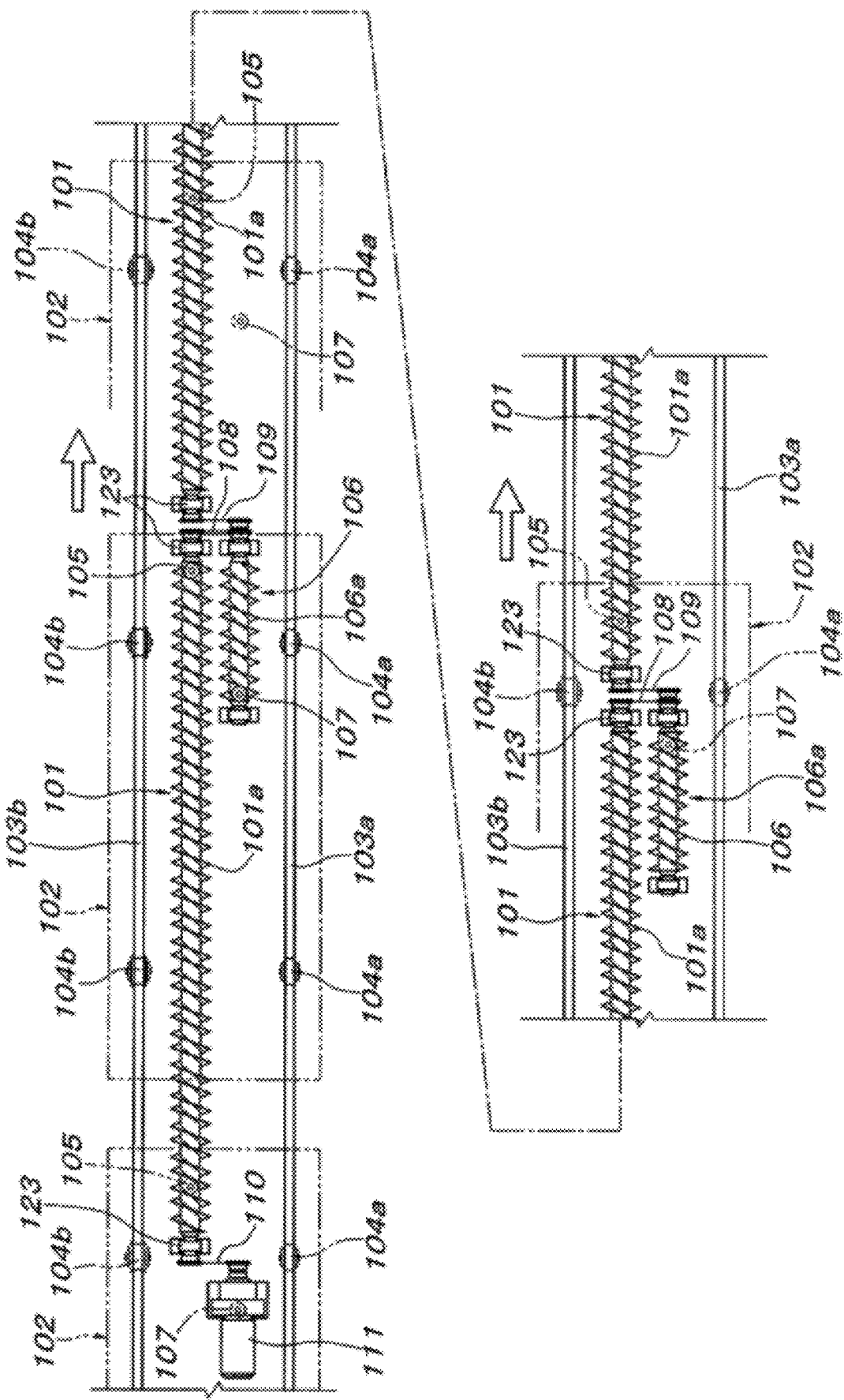
FIG. 28 is a schematic plain view of relevant parts, showing a fifth embodiment according to the fifth invention.
Figure 29:
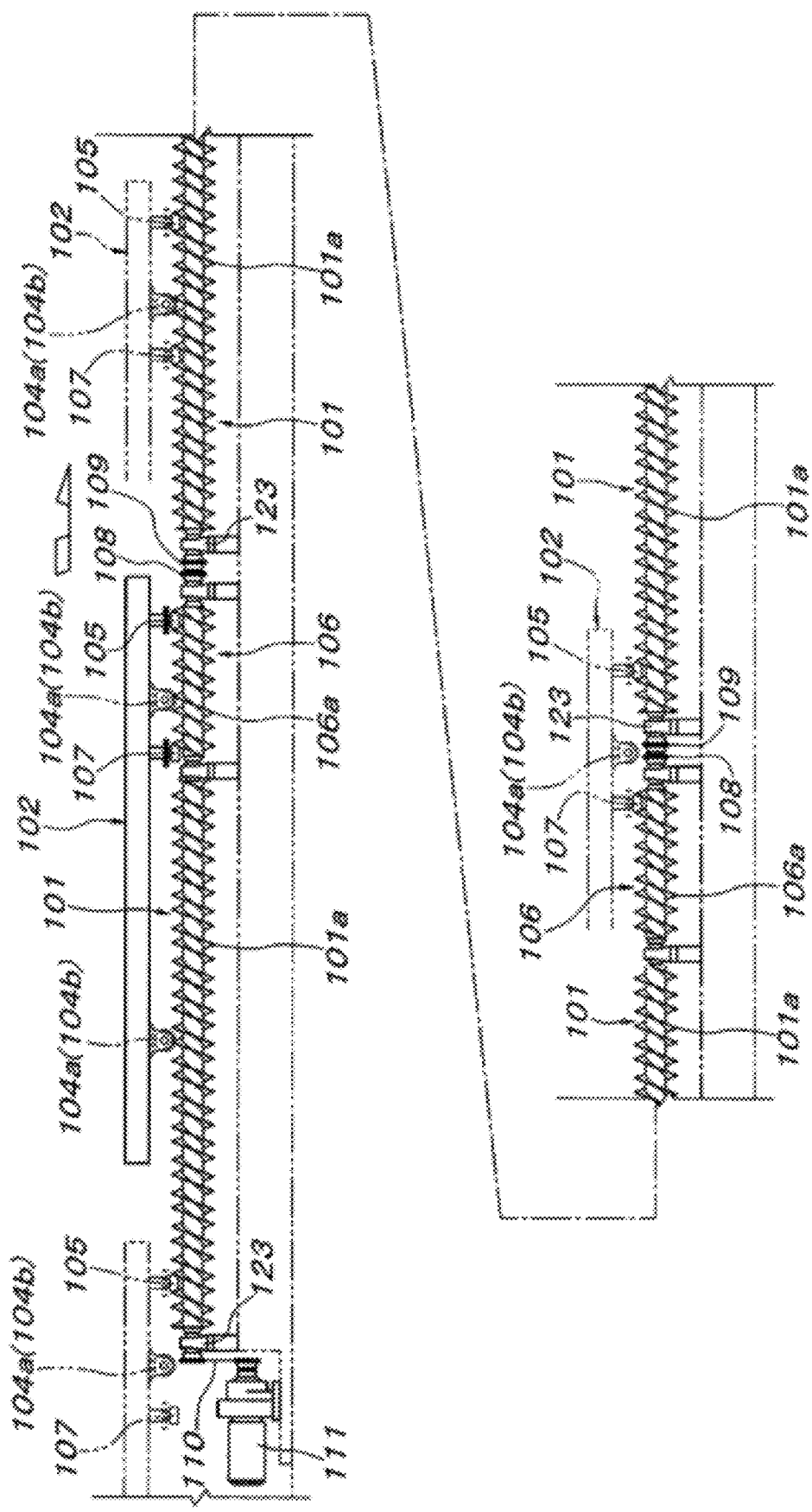
FIG. 29 is a schematic side view of the relevant parts.

FIG. 28 and FIG. 29 are views each showing a part of a screw driven conveyance device. A conveyance carriage 102 driven and propelled by screw shafts 101 is provided with: a pair of front and rear flangeless wheels 104a rolling on one guide rail 103a, out of a pair of right and left guide rails 103a and 103b; a pair of front and rear flanged wheels 104b rolling on the other guide rail 103b and sandwiching the guide rail 103b from both right and left sides. A required number of screw shafts 101 are disposed concentrically in series parallel to the guide rails 103a and 103b at an intermediate position of the pair of right and left guide rails 103a and 103b. At the bottom of the conveyance carriage 102, there is arranged a follower roller 105 capable of revolution about a vertical support shaft at a position freely fitted between helical vanes 101a of the screw shafts 101. Further, at a lateral-side position of one end of the respective screw shafts 101, auxiliary screw shafts 106 are disposed parallel to each screw shaft 101. At the bottom of the conveyance carriage 101, there is arranged an auxiliary follower roller 107 capable of revolution about a vertical support shaft at a position freely fitted between the helical vanes 106a of the auxiliary screw shaft 106. In addition, the helical vanes 101a of the screw shafts 101 and the helical vanes 106a of the auxiliary screw shafts 106 are configured of a double-blade system in which the follower roller 105 and the auxiliary follower roller 107 are sandwiched from both sides of the axial direction of the screw shaft.

Ends concentrically adjacent to one another of the respective screw shafts 101 are operably coupled so as to operably rotate in the same direction at mutually constant speed via one end of the auxiliary screw shafts 106 positioned at the lateral side of the ends and transmission means 108 and 109 that utilize a chain (or a gear), and also a reducer-equipped motor 111 is arranged which is for rotation-driving the screw shafts 101 positioned at one end of the traveling route of the conveyance carriage 102 in an arbitrary direction (positive or negative direction) via transmission means 110 utilizing a chain (or a gear). As a matter of course, it may also be configured so that the screw shafts 101 at the intermediate appropriate position of the traveling route of the conveyance carriage 102 or the auxiliary screw shafts 106 interlocked with the screw shafts 101 are driven by the reducer-equipped motor.

According to the above-described configuration, when the reducer-equipped motor 111 is run to operably rotate all the screw shafts 101 operably coupled to each other and the auxiliary screw shafts 106 via the transmission means 108 and 109 in the same direction at constant speed, and the rotating screw shafts 101 or the rotating auxiliary screw shafts 106 can drive and propel the conveyance carriage 102 in the forwarding direction of the helical vanes 101a and 106a via the auxiliary follower roller 107 or the follower roller 105 freely fitted between the helical vanes 101a and 106a of the respective screw shaft 101 and auxiliary screw shaft 106. At this time, a relative positional relationship of the respective screw shafts 101, auxiliary screw shafts 106, the follower roller 105, and the auxiliary follower roller 107, and a phase relationship of the helical vanes 101a and 106a of the respective screw shafts 101 and 106 are set so that the conveyance carriage 102 can be driven and propelled as described below.

That is, when the screw shafts 101 and the auxiliary screw shafts 106 are normal-rotation driven so that the conveyance carriage 102 travels forward in a direction of arrows shown in FIG. 28 and FIG. 29, before the follower roller 105 is pulled off from the end of a single screw shaft 101, the auxiliary follower roller 107 is fitted in between the helical vanes 106a of the auxiliary screw shafts 106 juxtaposed with the screw shaft 101, and the follower roller 105 that has moved between the front and rear screw shafts 101 can be fitted in between the helical vanes 101a of the downstream screw shafts 101 before the auxiliary follower roller 107 is pulled off from the end of this auxiliary screw shaft 106. Therefore, when the screw shafts 101 and the auxiliary screw shafts 106 are reversely driven so that the conveyance carriage 2 travels in a backward direction opposite to the arrows, before the follower roller 105 is pulled off from the end of a single screw shaft 101, the auxiliary follower roller 107 is fitted in between the helical vanes 106a of the auxiliary screw shafts 106 juxtaposed with the screw shafts 101 downstream of the screw shaft 101, and the follower roller 105 that has moved between the front and rear screw shafts 101 is to be fitted in between the helical vanes 101*a* of the downstream screw shafts 101 before the auxiliary follower roller 107 is pulled off from the end of this auxiliary screw shaft 106.

The fifth invention relates to the screw shafts 101 for driving a conveyance carriage, utilized for the screw driven conveyance device, as described above. The details of the screw shaft 101 used in the fifth embodiment according to the fifth invention will be described based on FIG. 30 to FIG. 32. The illustrated screw shaft 101 is configured by a single center shaft rod 112 and a required number of (eight, in the illustrated example) cylindrical screw single bodies 113. The center shaft rod 112 is a solid columnar axial body, and is composed of a spindle 114 to which the cylindrical screw single body 113 is fixed in an externally fitted manner, and a small-radius protruded shaft 115 protruding concentrically from both ends of this spindle 114. The both ends of the spindle 114 are formed with helical shafts 114*a* and 114*b* for respectively fitting by screwing fastening nuts 116*a* and 116*b*.

The respective cylindrical screw single bodies 113 are the same in structure and size, each composed of a cylindrical main body 117 and a helical vane 118 protrudingly arranged outside of the cylindrical main body 117. At one end of the cylindrical main body 117, a protruded cylinder shaft 117*a* is concentrically arranged protrudingly. Inside of the other end of the cylindrical main body 117, an annular recess 117*b* having an inner radius and a depth capable of nicely fitting internally to the protruded cylinder shaft 117*a* of the other cylindrical screw single body 113 is concentrically formed. Through holes 119 and 120 in a radial direction are arranged on peripheral walls of the protruded cylinder shaft 117*a* and the annular recess 117*b*, respectively, so as to form one through hole in a radial direction that concentrically continues with each other. This through hole is formed when the both cylindrical screw single bodies 113 are relatively rotated about the shaft center so as to permit continuation of the helical vanes 118 of the both cylindrical screw single bodies 113 in order to form one helical vane in a state where the protruded cylinder shaft 117*a* of one cylindrical screw single body 113 is internally fitted to the annular recess 117*b* of the other cylindrical screw single body 113. In addition, reference numeral 121 denotes an end cap. The end cap 121 is provided with: the protruded cylinder shaft 117*a* internally fitted to the annular recess 117*b* of a cylindrical screw single body 113 on a side to which the annular recess 17*b* is exposed (in this case, the cylindrical screw single body 113 is selected out of the cylindrical screw single bodies 113 positioned at the both ends of a line of a required number of cylindrical screw single bodies 113 concentrically in series); and a through hole 119 communicated with the through hole 120 on the peripheral wall of the annular recess 117*b*. In addition, the helical vane 118 is configured of a double-blade system in which the follower roller 105 is sandwiched from both sides of the axial direction of the screw shaft.

Figure 31:
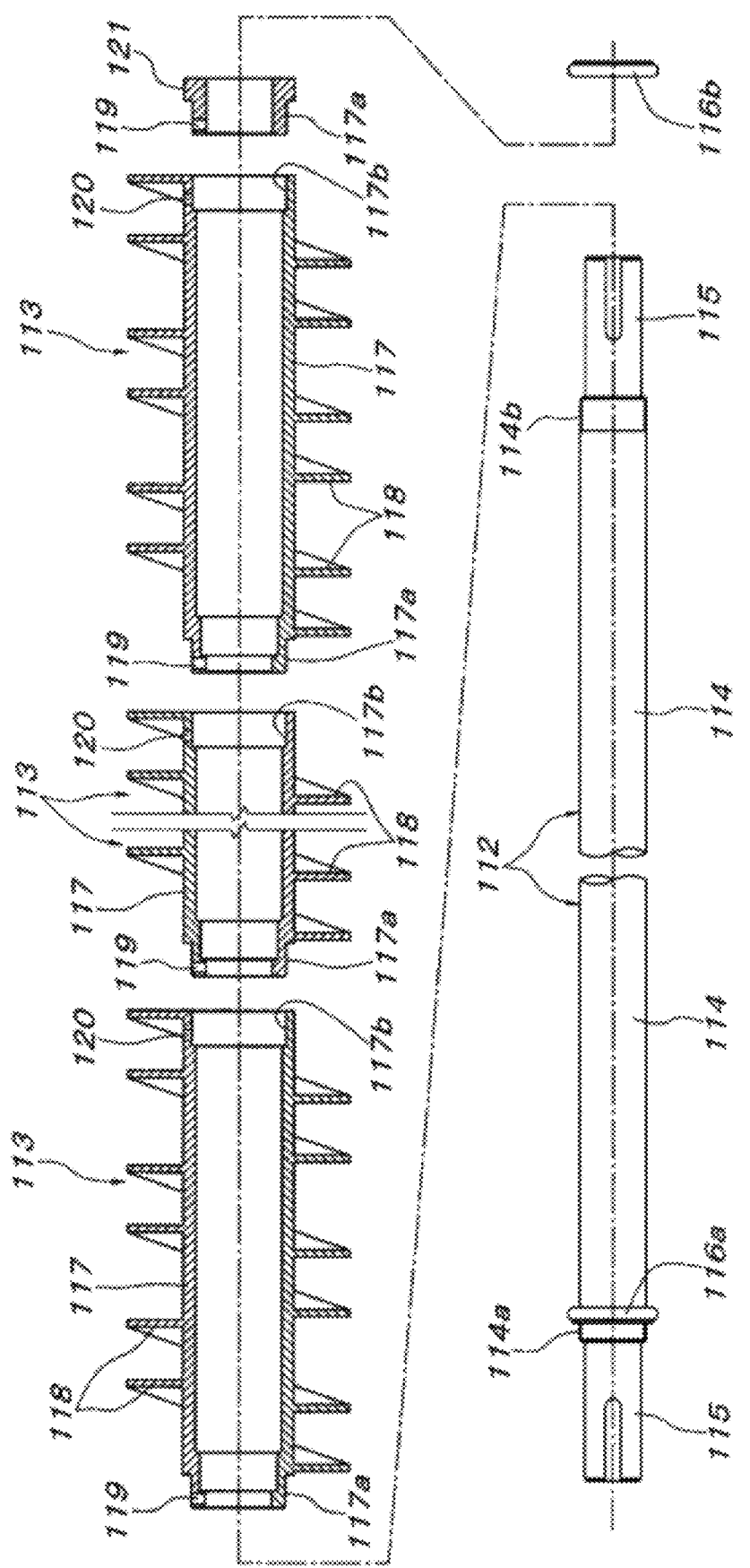
FIG. 31 is a partially cutaway side view showing a center shaft rod of the screw shaft and a fastening nut and a partially cutaway longitudinal side view showing a cylindrical screw single body and an end cap.
Figure 32:
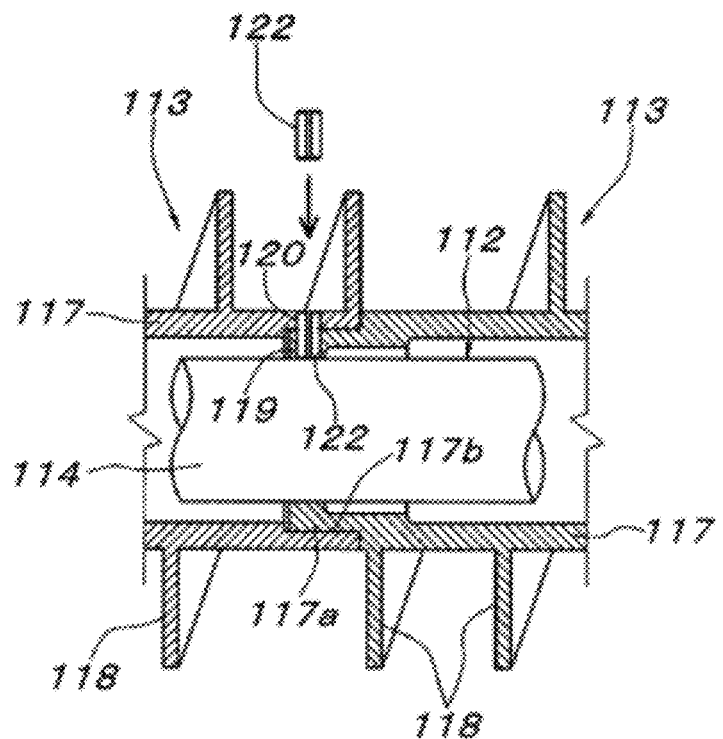
FIG. 32 is an enlarged longitudinal side view of relevant parts of the screw shaft.

When the screw shaft 101 is assembled, the protruded cylinder shafts 117*a* of the respective cylindrical screw single bodies 113 are internally fitted to the annular recesses 117*b* of other respective cylindrical screw single bodies 113, as shown in FIG. 31, and also the two cylindrical screw single bodies 113 adjacent in the axial direction are relatively rotated about its shaft center to place the through holes 119 of the mutually fitted protruded cylinder shafts 117*a* in alignment with the through holes 120 on the peripheral wall of the annular recesses 117*b*. In this state, a coupling tool (for example, a spring pin) 122 is press-fitted into the both through holes 119 and 120 continued concentrically in this radial direction, as shown in FIG. 32, thereby linking mutually the two cylindrical screw single bodies 113 adjacent in the axial direction for integration. When a required number of cylindrical screw single bodies 113 have been thus concentrically connected in series, the cylindrical screw single body 113 on a side to which the annular recess 117*b* is exposed, out of the cylindrical screw single bodies 113 positioned at the both ends, is to be fitted with the end cap 121 (which is attached by the coupling tool 122) according to the same procedure as that for connecting the cylindrical screw single bodies 113 to each other. The center shaft rod 112 is inserted to a line of the required number of cylindrical screw single bodies 113 thus integrated, and by means of fastening of the fastening nuts 116*a* and 116*b* fitted by screwing to the helical shafts 114*a* and 114*b* at the both ends of the center shaft rod 112, the required number of cylindrical screw single bodies 113 externally fitted to the center shaft rod 112 to be concentrically arranged in series are sandwiched in the axial direction and fixed to the center shaft rod 112.

The above-described assembly work completes the screw shaft 101, having the small-radius protruded shafts 115 at the both ends of the center shaft rod 112 being concentrically protruded from the both ends in the axial direction, and being provided with the helical vanes 101*a* that are formed by the respective helical vanes 118 of the required number of cylindrical screw single bodies 113 fixed by being externally fitted to the center shaft rod 112 and that are continued over the entire length. In addition, it may be possible to perform work in which while sequentially externally fitting the cylindrical screw single bodies 113 to the center shaft rod 112, the protruded cylinder shafts 117*a* of the two cylindrical screw single bodies 113 adjacent in the axial direction and the annular recess 117*b* are fitted on this center shaft rod 112 and coupled by the coupling tool 122 for integration.

Figure 30:
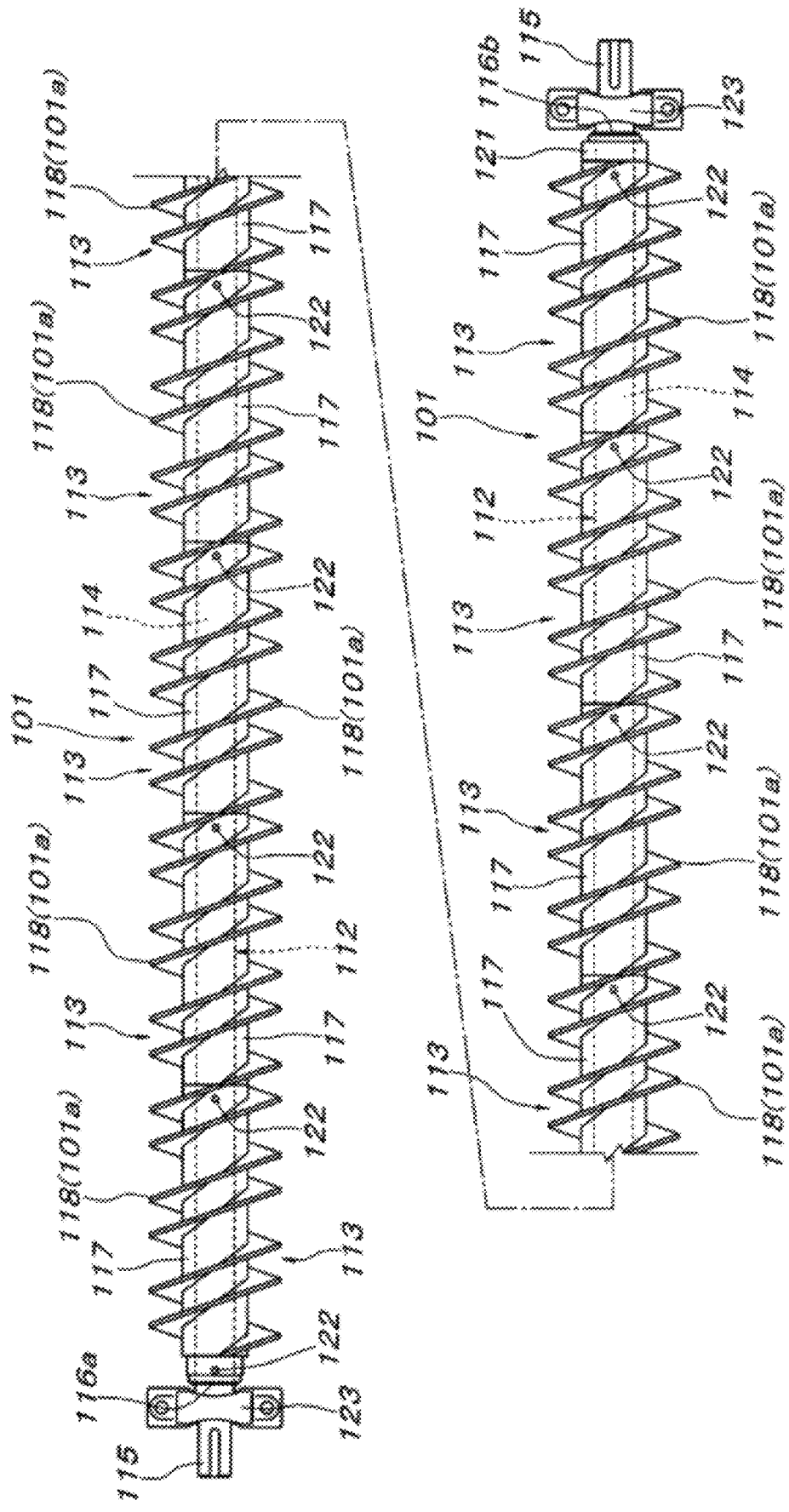
FIG. 30 is a plain view showing screw shafts of the fifth embodiment.

The screw shaft 101 thus assembled can be supported by the bearing 123 as shown in FIG. 28 to FIG. 30 by utilizing the small-radius protruded shafts 115 at both ends, and can also be attached with a sprocket wheel or a gear configuring the transmission means 108 to 110 in the small-radius protruded shafts 115 protruded from the bearing 123. Moreover, the rotating force transmitted from the small-radius protruded shaft 115 at one end to the center shaft rod 112 undergoes: friction occurring between the end surface of the fastening nuts 116*a* and 116*b* and the protruded cylinder shaft 117*a* of one cylindrical screw single body 113 press-contacted by these nuts 116*a* and 116*b* and the end surface of the end cap 121; and the coupling tool 122 for coupling the respective cylindrical screw single bodies 113 to each other. In this way, the rotating is transmitted to all the cylindrical screw single bodies 113. As a result, the helical vanes 101*a* that are formed by the helical vanes 118 of the respective cylindrical screw single bodies 113 and that are continued over the entire length are rotated integrally, thereby making it possible to drive and propel the conveyance carriage 102 via the follower roller 105 freely fitted between the helical vanes 101*a*.

In addition, the annular recesses 117*b* of the cylindrical screw single bodies 113 are not particularly essential. When the protruded cylindrical shafts 117*a* are redesigned as having an outer radius nicely fitted to the center hole of the cylindrical main body 117, the annular recesses 117*b* can be abolished. Further, as shown in FIG. 28 and FIG. 29, when the auxiliary screw shafts 106 are used in combination, its structure may be arbitrarily configured. Depending on the length of the auxiliary screw shafts 106, the auxiliary screw shafts 106 may be configured similar to the screw shafts 101 by a single shorter center shaft rod 112 and one or a plurality of cylindrical screw single bodies 113.

Figure 33:
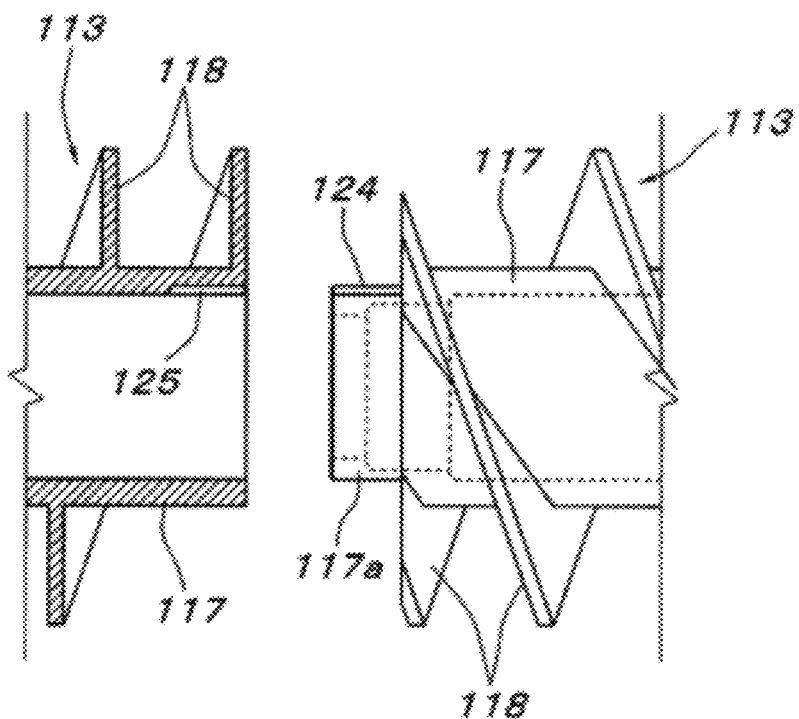
FIG. 33 is a partial longitudinal side view of relevant parts showing a first modified example of the fifth embodiment.
Figure 34:
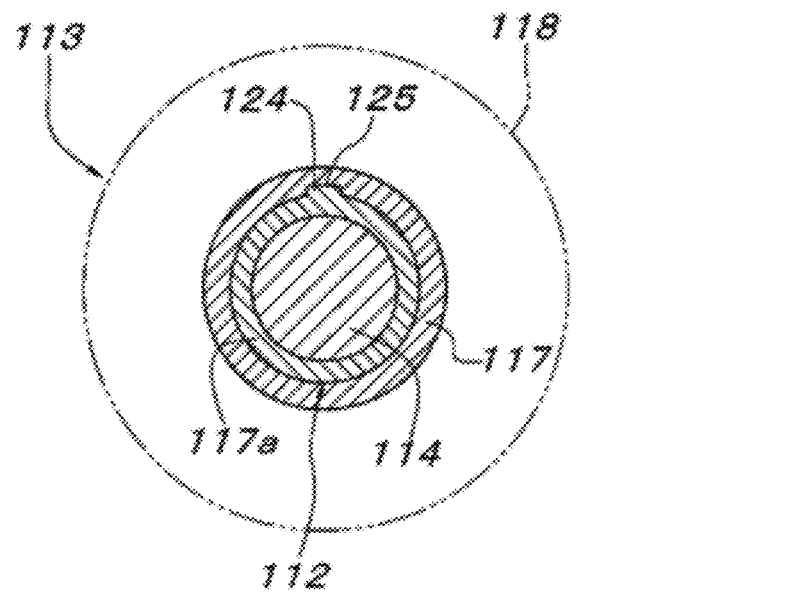
FIG. 34 is a longitudinal front view of the relevant parts.
Figure 35:
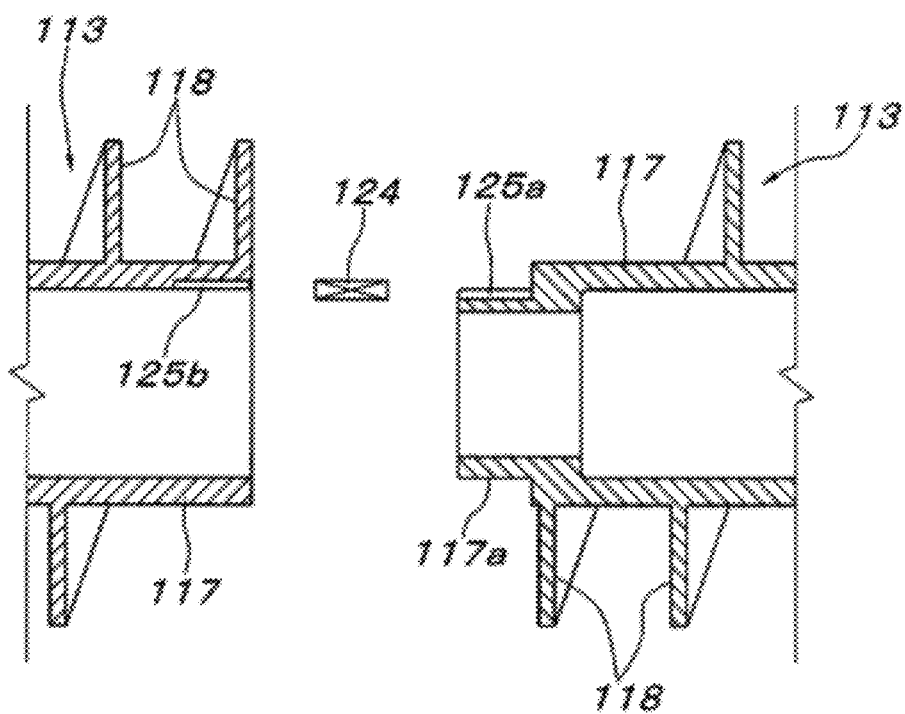
FIG. 35 is a longitudinal side view of relevant parts showing a second modified example of the fifth embodiment.

In addition, in the embodiment, the rotating force between the cylindrical screw single bodies 113 adjacent in the axial direction is transmitted by the coupling tool 122 for connecting these cylindrical screw single bodies 113 to each other. However, as shown in FIG. 33 to FIG. 35, by a shaft-direction key 124 set between the protruded cylinder shaft 117a of one cylindrical screw single body 113 and the cylindrical end of the other cylindrical screw single body 113 externally fitted to the protruded cylinder shaft 117a, the rotating force between the both cylindrical screw single bodies 113 adjacent in the axial direction can be transmitted. In this case, the key 124 may be molded integrally to the protruded cylinder shaft 117a as shown in FIG. 33 and FIG. 34, and a key groove 125 may be arranged on the inside of the cylindrical end of the other cylindrical screw single body 113. As shown in FIG. 35, key grooves 125a and 125b may be arranged in the both protruded cylinder shaft 117a of one cylindrical screw single body 113 and inside of the cylindrical end of the other cylindrical screw single body 113, and a key 124, which is a separate component, fitted between the both key grooves 125a and 125b may also be used.

Figure 36:
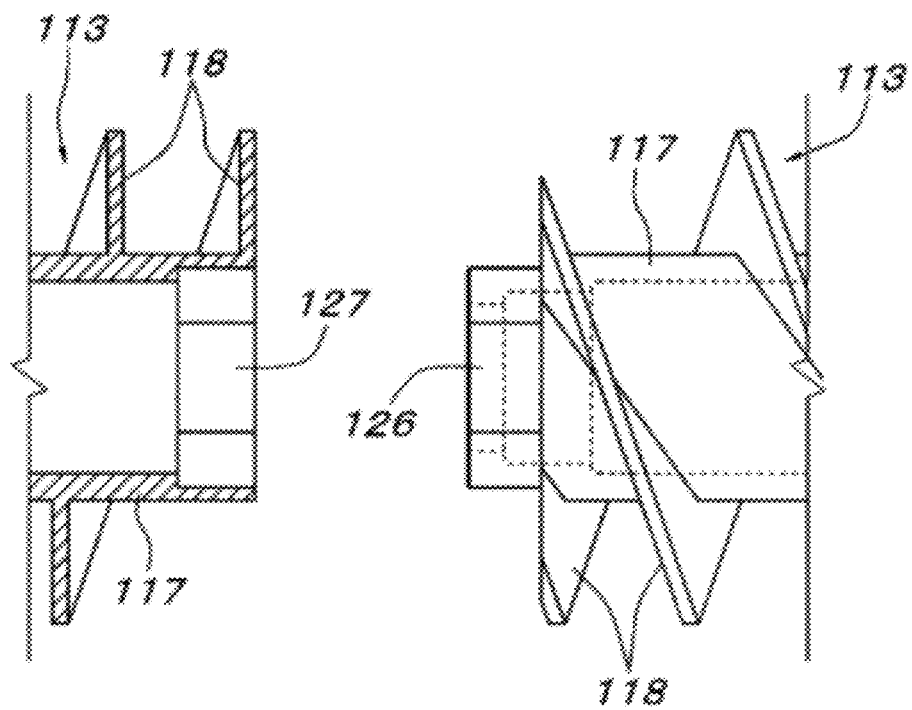
FIG. 36 is a partial longitudinal side view of relevant parts showing a third modified example of the fifth embodiment.

Further, as means for transmitting the rotating force between the cylindrical screw single bodies 113 adjacent in the axial direction, as shown in FIG. 36, the respective cylindrical screw single bodies 113 may be arranged with a protruded square shaft 126 arranged in a manner to concentrically protrude from the one end and a square hole 127 concentrically formed at the other end. When the protruded square shaft 126 of one cylindrical screw single body 113 and the square hole 127 of the other cylindrical screw single body 113 are fitted, the cylindrical screw single bodies 113 adjacent in the axial direction may also be connected in a state to prevent the relative rotation in a circumferential direction. The protruded square shaft 126 and the square hole 127 may be formed hexagonally, for example.

Figure 37:
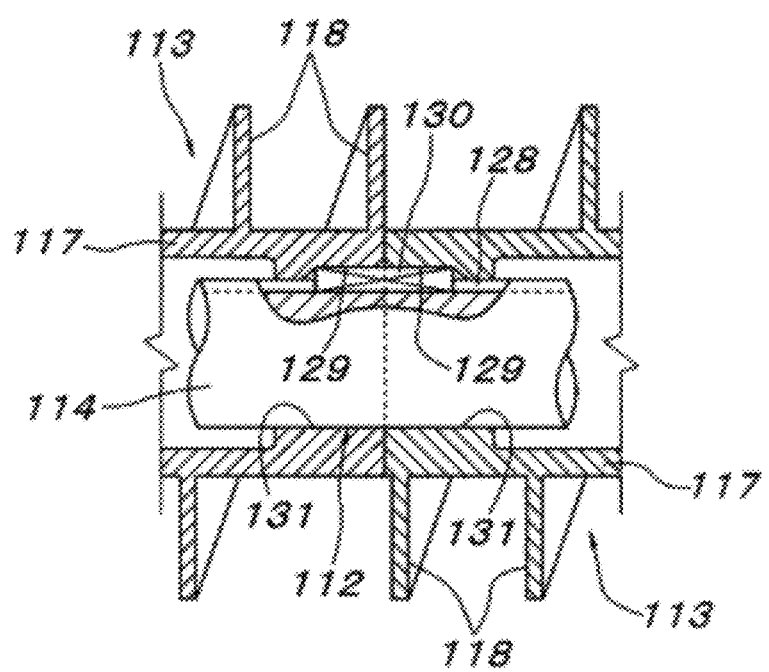
FIG. 37 is a longitudinal side view of relevant parts showing a fourth modified example of the fifth embodiment.

Further, as shown in FIG. 37, the spindle 114 of the center shaft rod 112 may be arranged with the key groove 128 that is continued over the entire length of the spindle 114, and the key 130 is interposed between the key groove 129 formed at least on the inner circumferential surface at one end of the respective cylindrical screw single bodies 113 and the key groove 128 on the center shaft rod 112 side. In this way, it may be configured so that the rotating force is directly transmitted to the respective cylindrical screw single bodies 113 via the key 130 from center shaft rod 112. In this case, as illustrated, at the both ends of the respective cylindrical screw single bodies 113 (cylindrical main body 117), the through hole portion 131 with its inner radius nicely externally fitted to the spindle 114 of the center shaft rod 112 is arranged, and on the inner circumferential surface of the through hole portion 131, the key groove 129 that releases only to outside relative to the axial direction is formed. As a result, between the two cylindrical screw single bodies 113 adjacent in the axial direction, the single key 130 fitted to the key groove 128 on the center shaft rod 112 side can be fitted across between the key grooves 129 of the both cylindrical screw single bodies 113. In this case, the key grooves 129 on the outer end side of the cylindrical screw single bodies 113 at the both ends are not assembled with the key 130 or are fitted with a key having a half length thereto, and the fastening nuts 116a and 116b may be fastened from the outside of the key groove 129. As a matter of course, also in a configuration such that the protruded cylinder shaft 117a is protrudingly arranged at one end of the cylindrical screw single body 113 (cylindrical main body 117) and the end cap 121 is used in combination, the key groove 129 with the both ends in the axial direction being closed toward the inner circumferential surface of the protruded cylinder shaft 117a is arranged. In this way, the configuration shown in FIG. 37 can be implemented.

The cylindrical screw single body 113 may be manufactured by welding the helical vane 118 composed of a metal plate into the cylindrical main body 117 made of metal. Besides, it is possible to adopt methods, such as synthetic resin molding, casting, and lost-wax processing, for integrally molding the cylindrical main body 117 and the helical vane 118.

In addition, the screw shaft for driving a conveyance carriage according to the fifth invention cannot only be utilized as means for driving and propelling the conveyance carriage of a carriage type conveyor traveling on the guide rails laid on the floor surface but also be utilized as means for driving and propelling the conveyance carriage of an overhead conveyor traveling and being supported on a guide rail bridged at an appropriate height above the floor surface. Alternatively, the position of the screw shaft relative to these types of conveyance carriages is not limited to a lower side of the conveyance carriage, and can be arbitrarily set at a lateral side and on an upper side, for example, of the conveyance carriage, according to a support structure of the conveyance carriage, a loading structure of a load, or a similar structure. Therefore, as shown in the embodiment, when the auxiliary screw shaft 6 is used in combination, the juxtaposing direction of the screw shaft 101 and the auxiliary screw shaft 106 is not limited to the (right and left) horizontal lateral direction. These components may also be juxtaposed in the (up and down) vertical direction.

What is claimed is:

1. A screw driven conveyance device comprising:
   a conveyance carriage;
   a plurality of screw shafts that are rotation-driven are placed along a traveling route of the conveyance carriage;
   the conveyance carriage being propelled by rotation-driving of the screw shafts,
   the conveyance carriage having a pair of front and rear follower rollers fitted between helical vanes of a screw shaft at two locations, which are front and rear locations, in the axial direction of the screw shaft,
   one follower roller is a position-fixed follower roller,
   the other follower roller is a movable follower roller supported movably within a certain range in the axial direction of the screw shafts,
   urging means for urging the movable follower roller in one orientation of a moving direction of the movable follower roller,
   the pair of front and rear follower rollers are press-contacted in an opposite orientation to each other, against the helical vanes of the screw shaft to position the conveyance carriage relative to the screw shaft,
   the plurality of screw shafts are concentrically placed in series with an air space therebetween not wider than an interval between the pair of front and rear follower rollers,
   second holding means for positioning the movable follower roller at a position when the pair of front and rear follower rollers are fitted between the helical vanes of a single screw shaft so as to be respectively press-contacted to the helical vane on one side,
   second switching means for switching the second holding means from a non-positioned state to a positioned state upstream of the air space and for returning the holding means from the positioned state back to the non-positioned state downstream of the air space, and while the pair of front and rear follower rollers are transferred from upstream to downstream of the air space between the screw shafts, the movable follower roller being positioned by the second holding means.

2. The screw driven conveyance device according to claim 1, wherein the movable follower roller is pivotally supported by a movable body supported movably within a certain range in the axial direction of the screw shaft, the urging means comprises a spring for urging the movable body in one direction, the second holding means comprises a locked portion arranged on a conveyance carriage side, and a lock member that is pivotally supported by the movable body in a manner to be releasably engaged with the locked portion and that is urged and held in a non-positioned state pulled off from the locked portion, the lock member has a cam follower roller and the second switching means comprises a cam rail arranged on a side of the traveling route of the conveyance carriage so as to act on the cam follower roller of the lock member, and while the pair of front and rear follower rollers are transferred from upstream to downstream of the air space between the screw shafts, the cam rail is operable to holds the lock member via the cam follower roller in a positioned state engaged with the locked portion.

* * * * *